United States Patent
Noh et al.

(10) Patent No.: US 11,991,746 B2
(45) Date of Patent: *May 21, 2024

(54) CHANNEL ACCESS METHOD, DEVICE AND SYSTEM IN UNLICENSED BAND

(71) Applicant: WILUS INSTITUTE OF STANDARDS AND TECHNOLOGY INC., Gyeonggi-do (KR)

(72) Inventors: Minseok Noh, Seoul (KR); Jinsam Kwak, Gyeonggi-do (KR); Juhyung Son, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/548,442

(22) Filed: Dec. 10, 2021

(65) Prior Publication Data

US 2022/0167405 A1 May 26, 2022

Related U.S. Application Data

(63) Continuation of application No. 16/924,142, filed on Jul. 8, 2020, now Pat. No. 11,234,270, which is a
(Continued)

(30) Foreign Application Priority Data

Mar. 30, 2016 (KR) ........................ 10-2016-0038771
Mar. 31, 2016 (KR) ........................ 10-2016-0039811
(Continued)

(51) Int. Cl.
*H04W 72/04* (2023.01)
*H04L 1/1812* (2023.01)
(Continued)

(52) U.S. Cl.
CPC ....... *H04W 74/0808* (2013.01); *H04L 1/1812* (2013.01); *H04L 1/1887* (2013.01);
(Continued)

(58) Field of Classification Search
CPC ......... H04W 74/0808; H04W 72/0413; H04W 72/0446; H04W 16/14; H04W 84/12;
(Continued)

(56) References Cited

U.S. PATENT DOCUMENTS 10,757,717 B2   8/2020   Noh et al.
11,330,609 B2   5/2022   Noh et al.
(Continued)

FOREIGN PATENT DOCUMENTS

AU   2014268767   12/2015
CN   102415187    4/2012
(Continued)

OTHER PUBLICATIONS

Yerramalli et al. U.S. Appl. No. 62/312,862, filed Mar. 2016.*
(Continued)

*Primary Examiner* — Lakeram Jangbahadur
(74) *Attorney, Agent, or Firm* — Ladas & Parry, LLP

(57) ABSTRACT

The present invention provides a method, device, and system for adjusting a contention window size for performing channel access. The method includes: receiving uplink scheduling information on the uplink transmission including a new data indicator (NDI) associated with a specific subframe in a first uplink transmission burst; determining a contention window size based on the NDI; generating a random number N (N≥0) in the determined contention window size based on the NDI associated with the specific subframe; and performing the uplink transmission on the specific cell after sensing a channel on the specific cell at least for N slots while the channel on the specific cell is idle.

(Continued)

If the NDI is toggled, the contention window size is reset to a minimum value, and if the NDI is not toggled, the contention window size is increased to a next higher allowed value.

12 Claims, 29 Drawing Sheets

Related U.S. Application Data continuation of application No. 16/147,577, filed on Sep. 29, 2018, now Pat. No. 10,743,344, which is a continuation of application No. PCT/KR2017/003529, filed on Mar. 30, 2017.

(30) Foreign Application Priority Data

| Apr. 11, 2016 | (KR) | 10-2016-0044470 |
|---|---|---|
| Apr. 13, 2016 | (KR) | 10-2016-0045238 |
| May 10, 2016 | (KR) | 10-2016-0057025 |
| May 27, 2016 | (KR) | 10-2016-0065156 |
| Jun. 24, 2016 | (KR) | 10-2016-0079634 |
| Jul. 12, 2016 | (KR) | 10-2016-0088279 |

(51) Int. Cl.

| H04L 1/1867 | (2023.01) |
|---|---|
| H04L 5/00 | (2006.01) |
| H04L 27/00 | (2006.01) |
| H04L 27/26 | (2006.01) |
| H04W 72/0446 | (2023.01) |
| H04W 72/21 | (2023.01) |
| H04W 74/0808 | (2024.01) |
| H04W 16/14 | (2009.01) |
| H04W 84/12 | (2009.01) |

(52) U.S. Cl.
CPC ........ *H04L 5/0078* (2013.01); *H04L 27/0006* (2013.01); *H04L 27/26* (2013.01); *H04W 72/0446* (2013.01); *H04W 72/21* (2023.01); *H04L 27/2613* (2013.01); *H04W 16/14* (2013.01); *H04W 84/12* (2013.01)

(58) Field of Classification Search
CPC ... H04L 1/1812; H04L 1/1887; H04L 5/0078; H04L 27/0006; H04L 27/26; H04L 27/2613

See application file for complete search history.

(56) References Cited

U.S. PATENT DOCUMENTS

| 2002/0163933 | A1 | 11/2002 | Benveniste | |
|---|---|---|---|---|
| 2007/0206547 | A1 | 9/2007 | Gong et al. | |
| 2010/0103913 | A1 | 4/2010 | Sung et al. | |
| 2010/0135319 | A1 | 6/2010 | Wang et al. | |
| 2012/0184265 | A1 | 7/2012 | Love et al. | |
| 2013/0107116 | A1 | 5/2013 | Charbit et al. | |
| 2013/0329625 | A1 | 12/2013 | Lee et al. | |
| 2014/0036881 | A1 | 2/2014 | Kim et al. | |
| 2014/0044000 | A1 | 2/2014 | Charbit et al. | |
| 2014/0050130 | A1 | 2/2014 | Kim et al. | |
| 2014/0105158 | A1 | 4/2014 | Kim et al. | |
| 2014/0112280 | A1 | 4/2014 | Lee et al. | |
| 2014/0348094 | A1 | 11/2014 | Charbit et al. | |
| 2014/0362780 | A1 | 12/2014 | Malladi et al. | |
| 2015/0085797 | A1 | 3/2015 | Ji et al. | |
| 2015/0092703 | A1 | 4/2015 | Xu et al. | |
| 2015/0245232 | A1 | 8/2015 | Luo et al. | |
| 2015/0319701 | A1 | 11/2015 | Ng et al. | |
| 2016/0057770 | A1 | 2/2016 | Yerramalli et al. | |
| 2016/0073344 | A1 | 3/2016 | Vutukuri et al. | |
| 2016/0143014 | A1* | 5/2016 | Mukherjee | H04L 5/0007 370/330 |
| 2017/0048879 | A1 | 2/2017 | Zhang et al. | |
| 2017/0188387 | A1 | 6/2017 | Mukherjee et al. | |
| 2017/0251464 | A1 | 8/2017 | Mukherjee | |
| 2017/0280475 | A1* | 9/2017 | Yerramalli | H04W 16/14 |
| 2017/0280476 | A1 | 9/2017 | Yerramalli et al. | |
| 2017/0332245 | A1 | 11/2017 | Huang et al. | |
| 2018/0124611 | A1 | 5/2018 | Moon et al. | |
| 2018/0206269 | A1 | 7/2018 | Bhorkar et al. | |
| 2019/0037601 | A1 | 1/2019 | Noh et al. | |
| 2019/0313450 | A1* | 10/2019 | Mukherjee | H04W 16/14 |
| 2020/0344803 | A1 | 10/2020 | Noh et al. | |
| 2021/0168770 | A1 | 6/2021 | Oh et al. | |
| 2021/0378010 | A1 | 12/2021 | Luo et al. | |

FOREIGN PATENT DOCUMENTS

| CN | 102870366 | 1/2013 |
|---|---|---|
| CN | 102986281 | 3/2013 |
| CN | 103270714 | 8/2013 |
| CN | 103518415 | 1/2014 |
| CN | 103548409 | 1/2014 |
| CN | 104540158 | 4/2015 |
| CN | 104662994 | 5/2015 |
| CN | 105101446 | 11/2015 |
| CN | 105230102 | 1/2016 |
| CN | 105282858 | 1/2016 |
| CN | 105409138 | 3/2016 |
| CN | 114499807 | 5/2022 |
| EP | 3 435 725 | 1/2019 |
| JP | 2015-515160 | 5/2015 |
| JP | 5746364 | 7/2015 |
| JP | 2015-149723 | 8/2015 |
| KR | 10-2007-0095774 | 10/2007 |
| KR | 10-2013-0009959 | 1/2013 |
| KR | 10-2013-0097586 | 9/2013 |
| KR | 10-2016-0010587 | 1/2016 |
| KR | 10-2016-0013508 | 2/2016 |
| KR | 10-2016-0026555 | 3/2016 |
| KR | 10-2018-0120201 | 11/2018 |
| WO | 2012/078565 | 6/2012 |
| WO | 2013/116662 | 8/2013 |
| WO | 2013/149387 | 10/2013 |
| WO | 2016/003674 | 1/2016 |
| WO | 2016/013781 | 1/2016 |
| WO | 2016/043523 | 3/2016 |
| WO | 2017/074638 | 5/2017 |
| WO | 2017/171456 | 10/2017 |

OTHER PUBLICATIONS

Office Action dated Oct. 19, 2021 for Korean Patent Application No. 10-2021-7023691 and its English translation provided by Applicant's foreign counsel.

Office Action dated Jul. 19, 2022 for Korean Patent Application No. 10-2022-7021156 and its English translation provided by Applicant's foreign counsel.

International Search Report for PCT/KR2017/003529 dated Jul. 13, 2017 and its English translation from WIPO (published as WO 2017/171456).

Written Opinion of the International Searching Authority for PCT/KR2017/003529 dated Jul. 13, 2017 and its English machine translation by Google Translate (published as WO 2017/171456).

"3GPP; TSG RAN; E-UTRA; Medium Access Control (MAC) Protocol Specification (Release 13)", 3GPP TS 36.321 V13.0.0, Jan. 14, 2016, See section 3.1, 5.3.1, 5.4.1.

Extended European Search Report dated Sep. 17, 2019 for EP Patent Application No. 17770689.2.

Extended European Search Report dated Sep. 30, 2019 for EP Patent Application No. 17770617.3.

Non-Final Office Action dated Dec. 2, 2019 for U.S. Appl. No. 16/138,927.

LG Electronics: "LBT schemes in LAA UL", 3GPP TSG RAN WG1 Meeting #84, St Julian's, Malta, Feb. 15-19, 2016; Draft:

(56) References Cited

OTHER PUBLICATIONS

R1-160630; 3rd Generation Partnership Project (3GPP), Mobile Competence Centre; 650, Route Des Lucioles; F-06921 Sophia-Antipolis Cedes, France; Feb. 6, 2016, XP051064267, Agenda Item: 7.3.1.5, pp. 1-10.
Zte: "UL framework for LAA". 3GPP TSG RAN WG1 Meeting #83, Anaheim, USA, Nov. 15-22, 2015; Document for: Discussion and Decision; Draft: R1-156994 UL; 3rd Generation Partnership Project (3GPP), Mobile Competence Centre; 650. Route Des Lucioles; F-06921 Sophia-Antipolis Cedes, France; Nov. 7, 2015, XP051022611, Agenda Item: 6.2.3.1, pp. 1-6.
Mediatek Inc.: "Uplink channel access in LAA", 3GPP TSG RAN WG1 Meeting #84, St Julian's, Malta, Feb. 15-19, 2016; Draft: R1-160976; 3rd Generation Partnership Project (3GPP), Mobile Competence Centre; 650. Route Des Lucioles; F-06921 Sophia-Antipolis Cedes, France; Feb. 24, 2016, XP051079075, Agenda Item: 7.3.1.5, pp. 1-11.
LG Electronics: "PUSCH transmission in LAA", 3GPP TSG RAN WG1 Meeting #84, St Julian's, Malta, Feb. 15-19, 2016; Draft: R1-160625 LAA PUSCH; 3rd Generation Partnership Project (3GPP), Mobile Competence Centre; 650, Route Des Lucioles; F-06921 Sophia-Antipolis Cedes, France; Feb. 14, 2016, XP051053954, Agenda Item: 7.3.1.1, pp. 1-5.
Ericsson: "On Coordinated UL Channel Access for Enhanced LAA", 3GPP TSG RAN WG1 Meeting #84, St Julian's, Malta, Feb. 15-19, 2016; Draft: R1-161000; 3rd Generation Partnership Project (3GPP), Mobile Competence Centre; 650, Route Des Lucioles; F-06921 Sophia-Antipolis Cedes, France; Feb. 6, 2016, XP051064484, Agenda Item: 7.3.1.5, pp. 1-3.
Non-Final Office Action dated Jan. 16, 2020 for U.S. Appl. No. 16/138,936.
Advisory Action dated Mar. 23, 2020 for U.S. Appl. No. 16/138,927.
Final Office Action dated Mar. 6, 2020 for U.S. Appl. No. 16/138,927.
Notice of Allowance dated Apr. 9, 2020 for U.S. Appl. No. 16/138,927.
Notice of Allowance dated May 29, 2020 for U.S. Appl. No. 16/138,936.
Supplemental Notice of Allowability dated Jul. 6, 2020 for U.S. Appl. No. 16/147,577 (now published as U.S. 2019/0037601).
Supplemental Notice of Allowability dated Apr. 17, 2020 for U.S. Appl. No. 16/147,577 (now published as U.S. 2019/0037601).
Notice of Allowance dated Mar. 27, 2020 for U.S. Appl. No. 16/147,577 (now published as U.S. 2019/0037601).
Non-Final Office Action dated Nov. 22, 2019 for U.S. Appl. No. 16/147,577 (now published as U.S. 2019/0037601).
Office Action for Indian Patent Application No. 201827040249 dated Nov. 4, 2020.
Office Action for Korean Patent Application No. 10-2018-7027541 dated Jan. 21, 2021 and its English translation provided by Applicant's foreign counsel.
Ericsson: "On UL Cannel Access Procedures for Enhanced LAA", R1-161001, 3GPP TSG RAN WG1 Meeting #84, St. Julian', Malta, Feb. 15-19, 2016, pp. 1-8.
Office Action for Korean Patent Application No. 10-2018-7028131 dated Jan. 26, 2021 and its English translation provided by Applicant's foreign counsel.
Broadcom Corporation: "Discussion on Triggering Mechanisms to Adapt LBT Contention Window Size", R1-155548, 3GPP TSG WAN WG1 Meeting #82-BIS, Malmo, Sweden, Oct. 5-9, 2015, pp. 1-14.
Office Action for Indian Patent Application No. 201827038794 dated Mar. 23, 2021.
Office Action for European Patent Application No. 17 770 617.3 dated Feb. 15, 2021.
Office Action for European Patent Application No. 17 770 689.2 dated Feb. 8, 2021.
Office Action for Chinese Patent Application No. 201780030922.9 dated Apr. 30, 2021 and its English translation provided by Applicant's foreign counsel.
Office Action for Korean Patent Application No. 10-2018-7027545 dated Jun. 8, 2021 and its English translation provided by Applicant's foreign counsel.
Office Action dated Aug. 25, 2021 for U.S. Appl. No. 16/929,058.
Office Action dated Sep. 9, 2021 for Korean Patent Application No. 10-2021-7024472 and its English translation provided by the Applicant's foreign counsel.
Office Action dated Sep. 17, 2021 for Korean Patent Application No. 10-2021-7023122 and its English translation provided by the Applicant's foreign counsel.
Office Action dated Aug. 13, 2021 for Chinese Patent Application No. 201780018454.3 and its English translation provided by the Applicant's foreign counsel.
Notice of Allowance dated Oct. 28, 2021 for Chinese Patent Application No. 201780030922.9 and its English translation provided by the Applicant's foreign counsel.
Supplemental Notice of Allowability dated Nov. 17, 2021 for U.S. Appl. No. 16/924,142 (now published as U.S. 2020/0344803).
Supplemental Notice of Allowability dated Oct. 18, 2021 for U.S. Appl. No. 16/924,142 (now published as U.S. 2020/0344803).
Notice of Allowability dated Sep. 10, 2021 for U.S. Appl. No. 16/924,142 (now published as U.S. 2020/0344803).
Notice of Allowance dated Mar. 21, 2022 for Korean Patent Application No. 10-2021-7023691 and its English translation provided by Applicant's foreign counsel.
Office Action dated Mar. 21, 2022 for Korean Patent Application No. 10-2021-7023122 and its English translation provided by Applicant's foreign counsel.
Office Action dated Mar. 23, 2022 for Korean Patent Application No. 10-2021-7024472 and its English translation provided by Applicant's foreign counsel.
Notice of Allowance dated Nov. 25, 2022 for European Patent Application No. 17 770 617.3.
Notice of Allowance dated Dec. 14, 2022 for Korean Patent Application No. 10-2021-7023122 and its English translation provided by Applicant's foreign counsel.
Office Action dated Jan. 17, 2023 for U.S. Appl. No. 17/712,071.
Notice of Allowance dated Jan. 25, 2023 for Korean Patent Application No. 10-2022-7021156 and its English translation provided by Applicant's foreign counsel.
Notice of Allowance dated Feb. 7, 2023 for Korean Patent Application No. 10-2022-7042370 and its English translation provided by Applicant's foreign counsel.
Notice of Allowance dated Sep. 1, 2022 for Korean Patent Application No. 10-2021-7023122 and its English translation from Global Dossier.
Notice of Allowance dated Sep. 16, 2022 for Korean Patent Application No. 10-2021-7024472 and its English translation provided by Applicant's foreign counsel.
Office Action dated Nov. 4, 2022 for European Patent Application No. 17 770 689.2.
Notice of Hearing dated Apr. 18, 2023 for Indian Patent Application No. 201827038794.
Notice of Allowance dated May 3, 2023 for U.S. Appl. No. 17/712,071.
Notice of Allowance dated Jul. 4, 2023 for Korean Patent Application No. 10-2023-7012743 and its English translation provided by Applicant's foreign counsel.
Office Action dated Jul. 21, 2023 for Korean Patent Application No. 10-2022-7044161 and its English translation provided by Applicant's foreign counsel.
Notice of Allowance dated Jul. 25, 2023 for Korean Patent Application No. 10-2023-7015610 and its English translation provided by Applicant's foreign counsel.
Notice of Allowance dated Aug. 9, 2023 for U.S. Appl. No. 17/548,442.
Extended European Search Report dated Jun. 9, 2023 for EP Patent Application No. 23164463.4.
Sony Corporation: "UL Channel access mechanism design in eLAA", R1-160674, 3GPP TSG RAN WG1 Meeting #84, St. Julian', Malta, Feb. 6, 2016, pp. 1-3.

(56) References Cited

OTHER PUBLICATIONS

Huawei, HiSilicon: "Ul LBT to enable UE multiplexing of uplink transmissions", R1- 160280, 3GPP TSG RAN WG1 Meeting #84, St. Julian', Malta, Feb. 6, 2016, pp. 1-6.
Notice of Hearing dated Sep. 13, 2023 for Indian Patent Application No. 201827040249.
Notice of Allowance dated Oct. 26, 2023 for U.S. Appl. No. 17/015,055.
Notice of Allowance dated Nov. 14, 2023 for Korean Patent Application No. 10-2023-7015610 and its English translation provided by the Applicant's foreign counsel.
Office Action dated Nov. 15, 2023 for Korean Patent Application No. 10-2023-7036841 and its English translation provided by the Applicant's foreign counsel.
Office Action dated Dec. 27, 2023 for Korean Patent Application No. 10-2023-7033915 and its English translation provided by the Applicant's foreign counsel.
Notice of Allowance dated Jan. 23, 2024 for U.S. Appl. No. 17/712,071.
Notice of Allowance dated Jan. 23, 2024 for Korean Patent Application No. 10-2022-7044161 and its English translation provided by the Applicant's foreign counsel.
Office Action dated Jan. 25, 2024 for Chinese Patent Application No. 202210031992.9 and its English translation provided by the Applicant's foreign counsel.
Office Action dated Feb. 5, 2024 for Chinese Patent Application No. 202210031169.8 and its English translation provided by Applicant's foreign counsel.
Notice of Allowance dated Feb. 8, 2024 for Chinese Patent Application No. 202210031956.2 and its English translation provided by Applicant's foreign counsel.
Notice of Allowance dated Feb. 13, 2024 for European Patent Application No. 17 770 689.2.
Office Actions dated Mar. 6, 2024 for U.S. Appl. No. 18/233,884.

\* cited by examiner

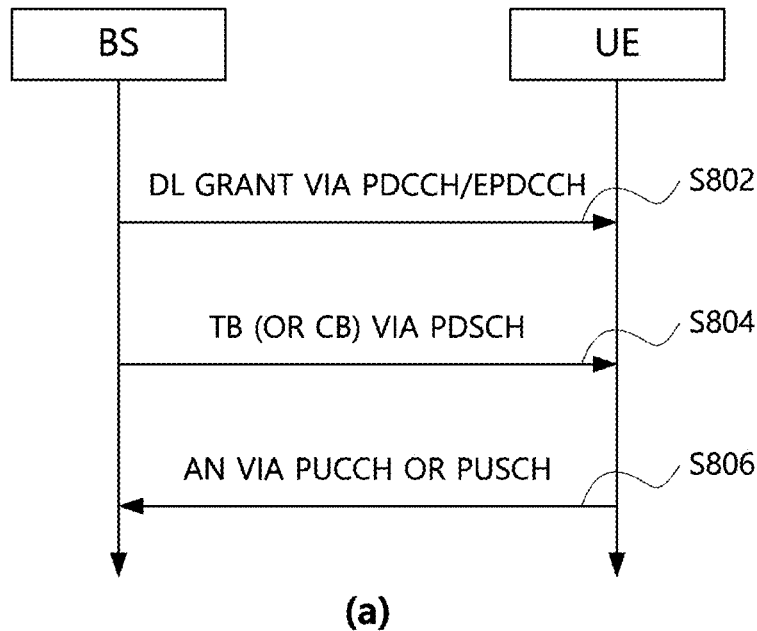
(a)
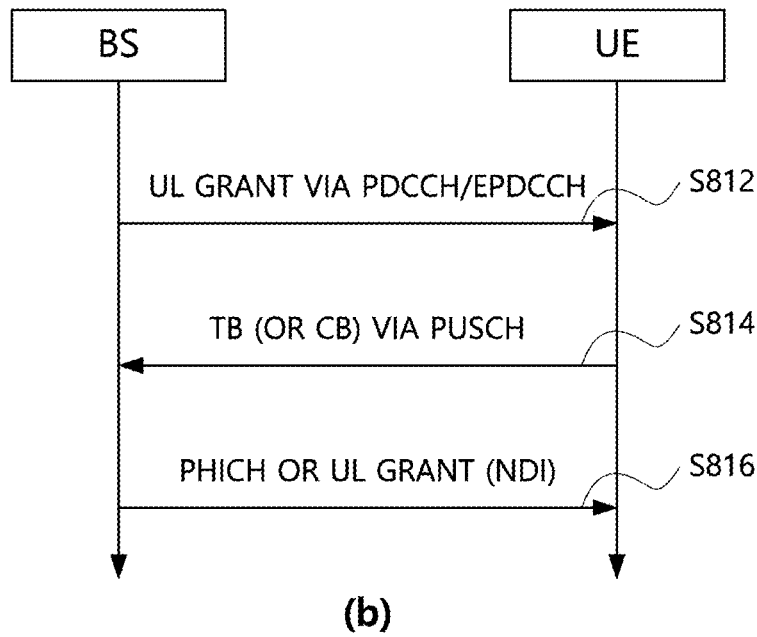
(b)
*FIG. 8*

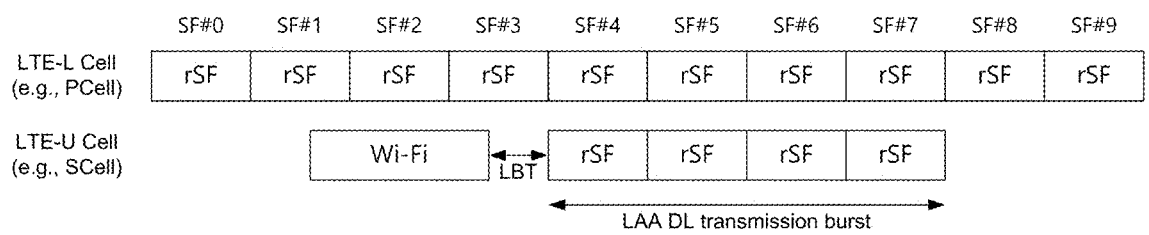
(a) LAA DL transmission burst starting with a regular subframe
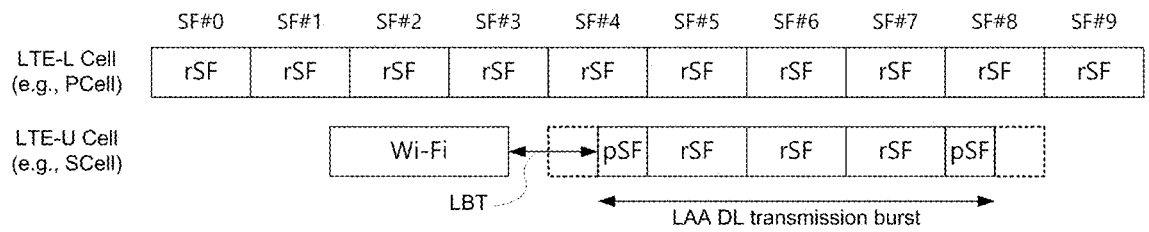
(b) LAA DL transmission burst starting with a partial subframe
*FIG. 14*

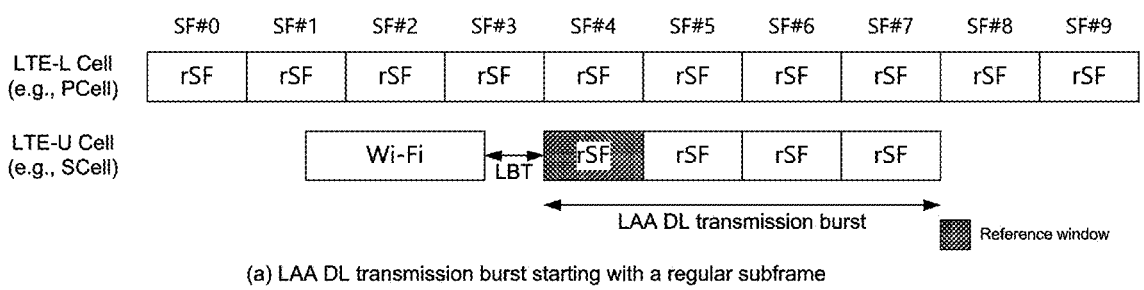
(a) LAA DL transmission burst starting with a regular subframe
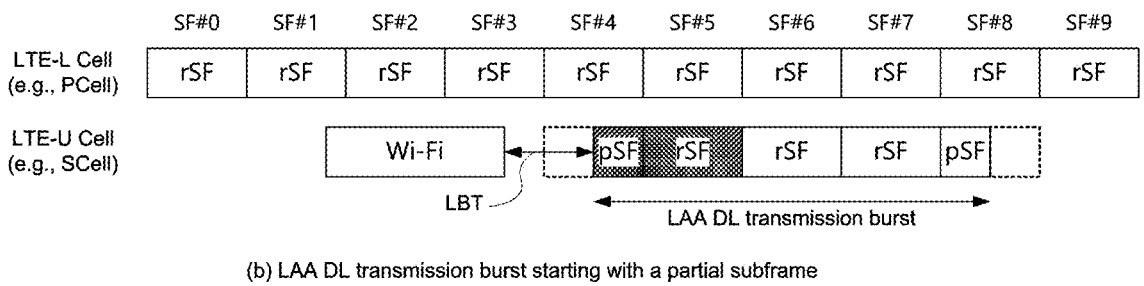
(b) LAA DL transmission burst starting with a partial subframe
*FIG. 16*

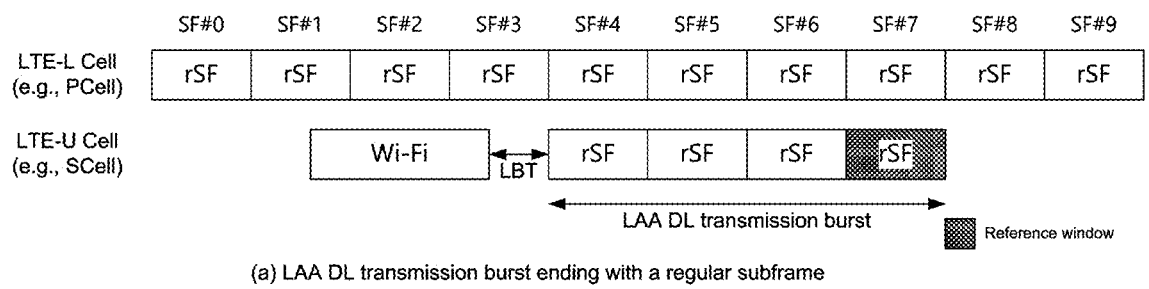
(a) LAA DL transmission burst ending with a regular subframe
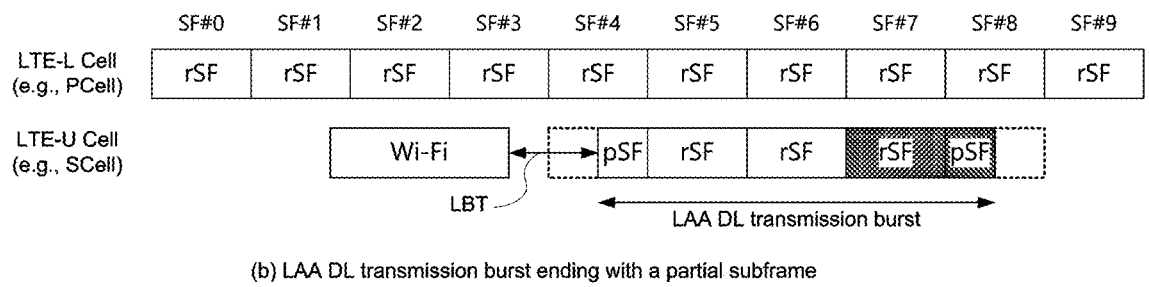
(b) LAA DL transmission burst ending with a partial subframe
*FIG. 17*

FIG. 19

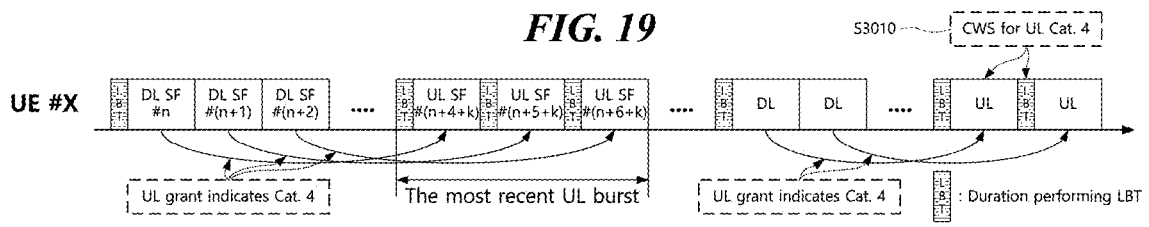

(a) each UL scheduled subframe in UL transmission burst are scheduled by each UL grant without gap between UL subframes

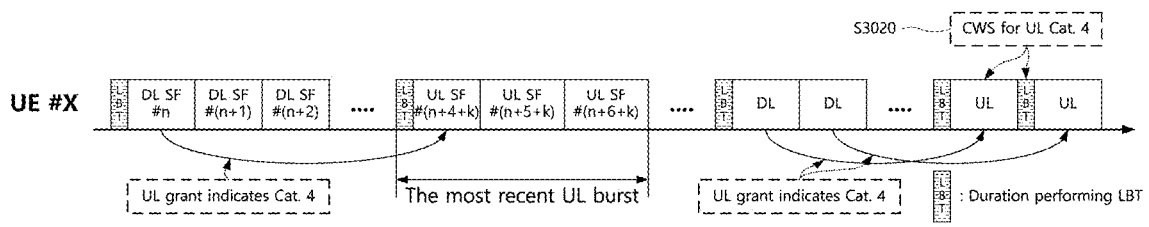

(b) Case 2) UL transmission burst is scheduled by single UL grant for scheduling multiple subframe without gap between UL subframes

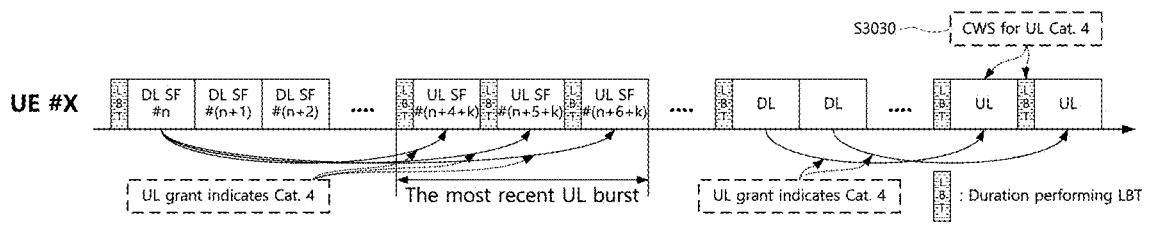

© Case 3) each UL scheduled subframe in UL transmission burst are scheduled by each UL grant without gap between UL subframes

FIG. 20

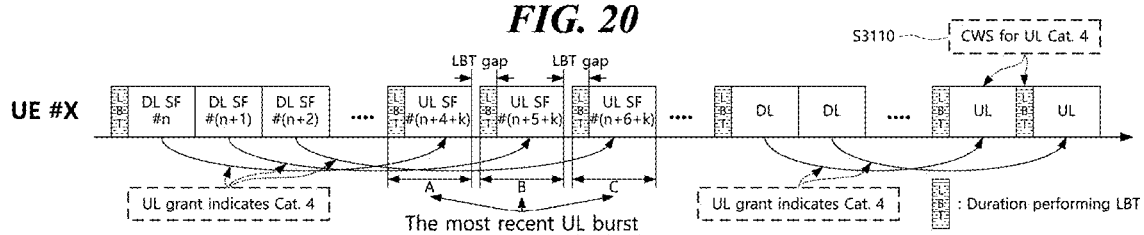

(a) each UL scheduled subframe in UL transmission burst are scheduled by each UL grant with gap between UL subframes

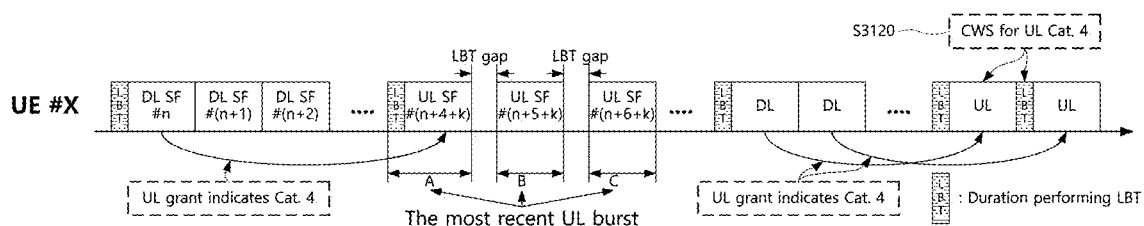

(b) Case 2) UL transmission burst is scheduled by single UL grant for scheduling multiple subframe with gap between UL subframes

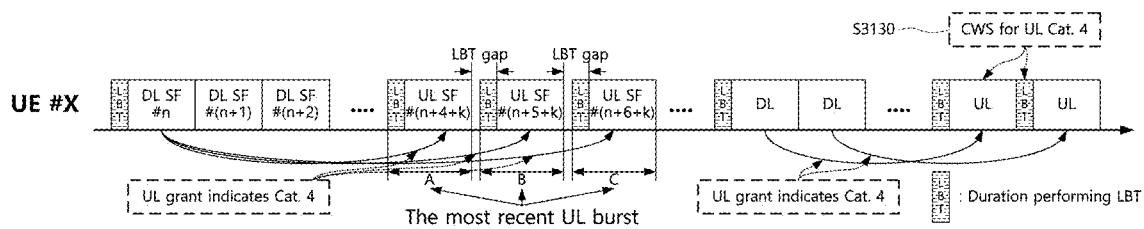

(c) Case 3) each UL scheduled subframe in UL transmission burst are scheduled by UL grant(s) from single DL subframe with gap between UL subframes <frame structure of UL radio frame, UL subframe, UL slot in a subframe>

FIG. 22
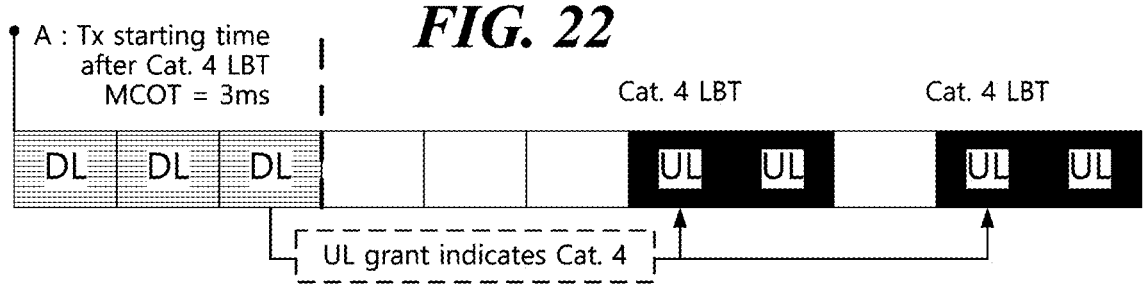
(a) Receive Cat. 4 LBT signaling by signaling of UL grant
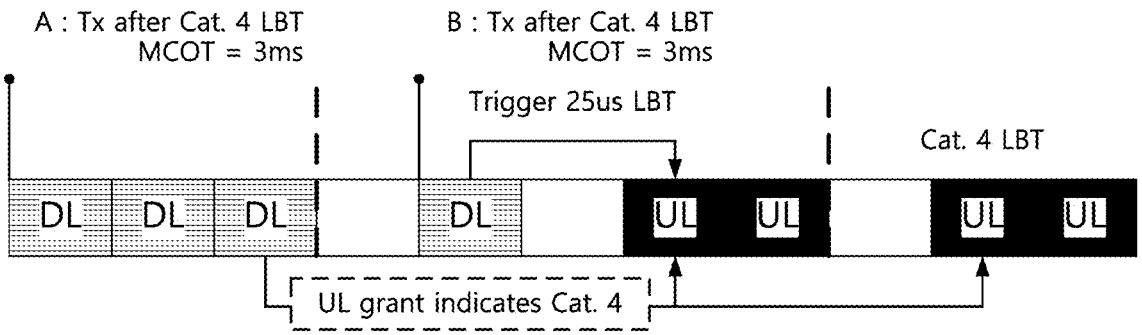
(b) Receive Cat. 4 LBT signaling by signaling of UL grant, and signaling related change of LBT type through recent DL

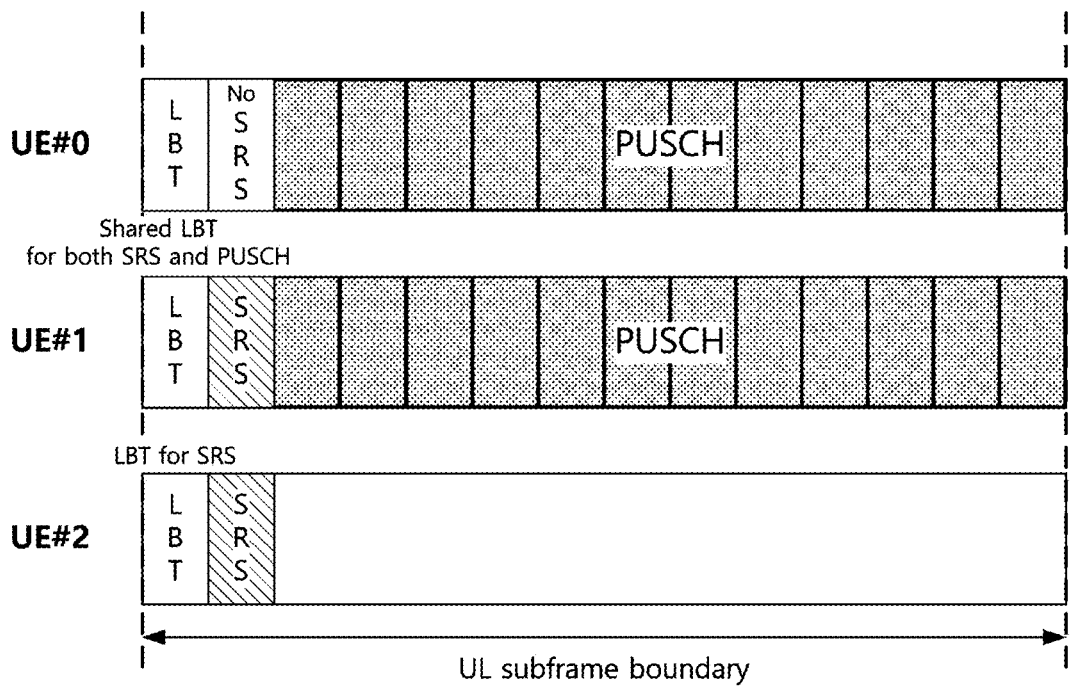
(a)
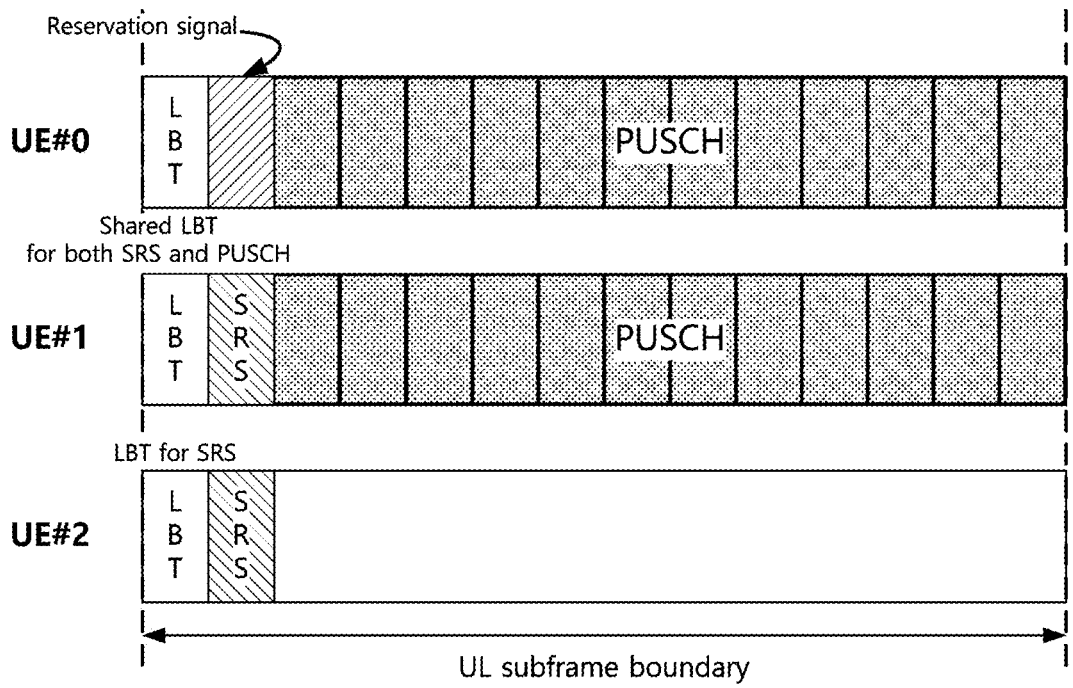
(b)
FIG. 25

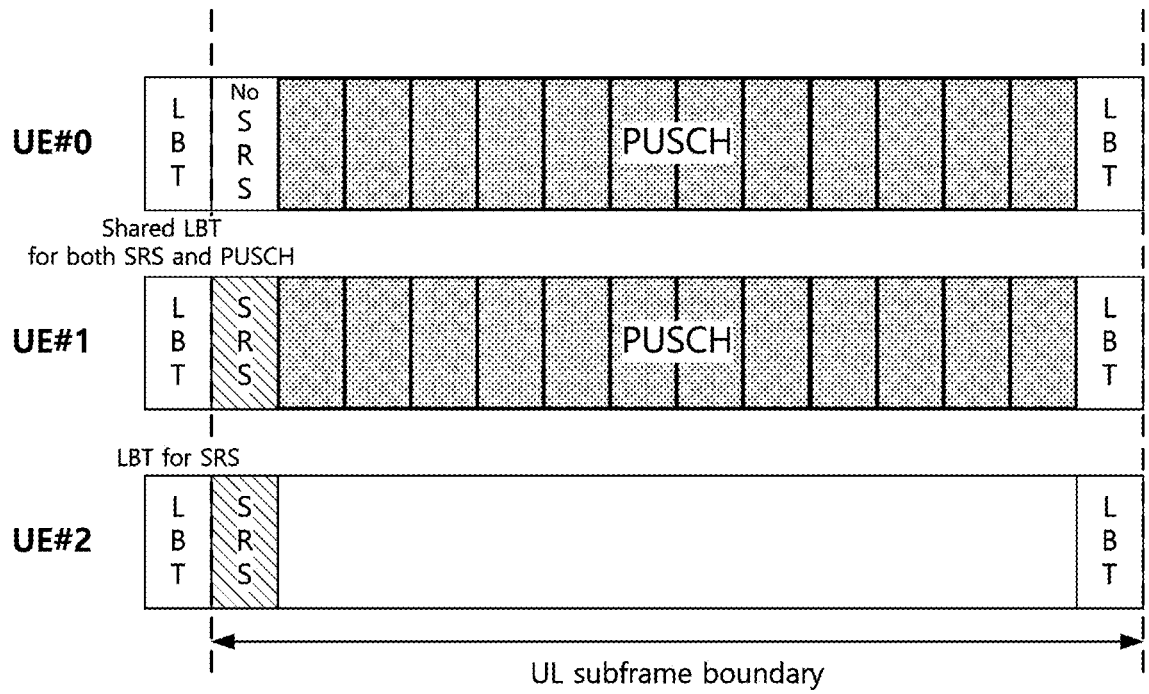
(a)
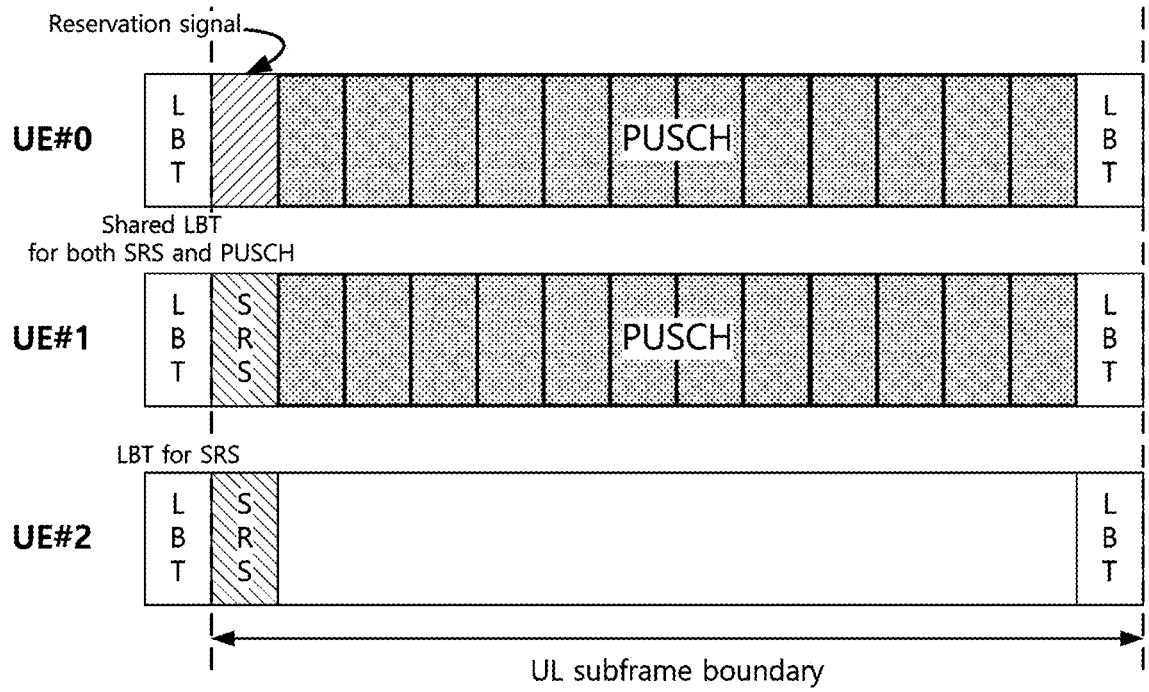
(b)
FIG. 26

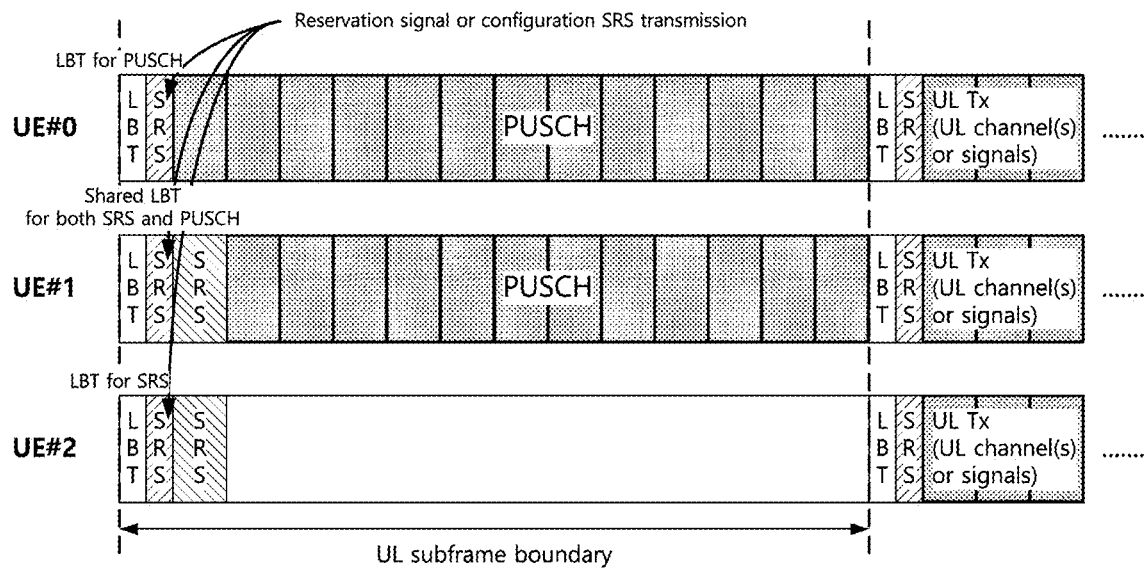
(a)
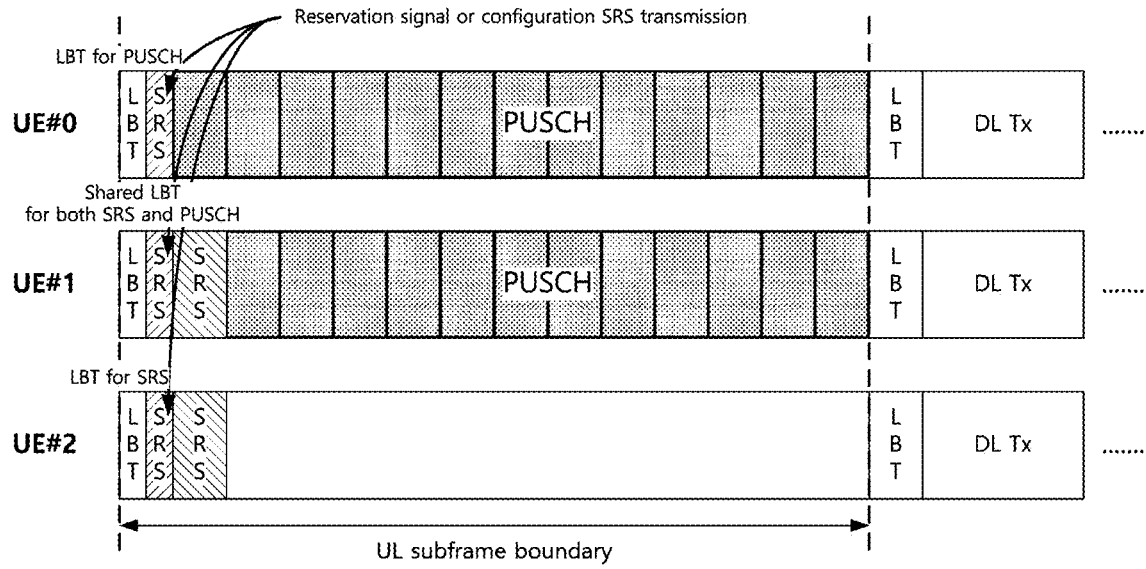
(b)
FIG. 27

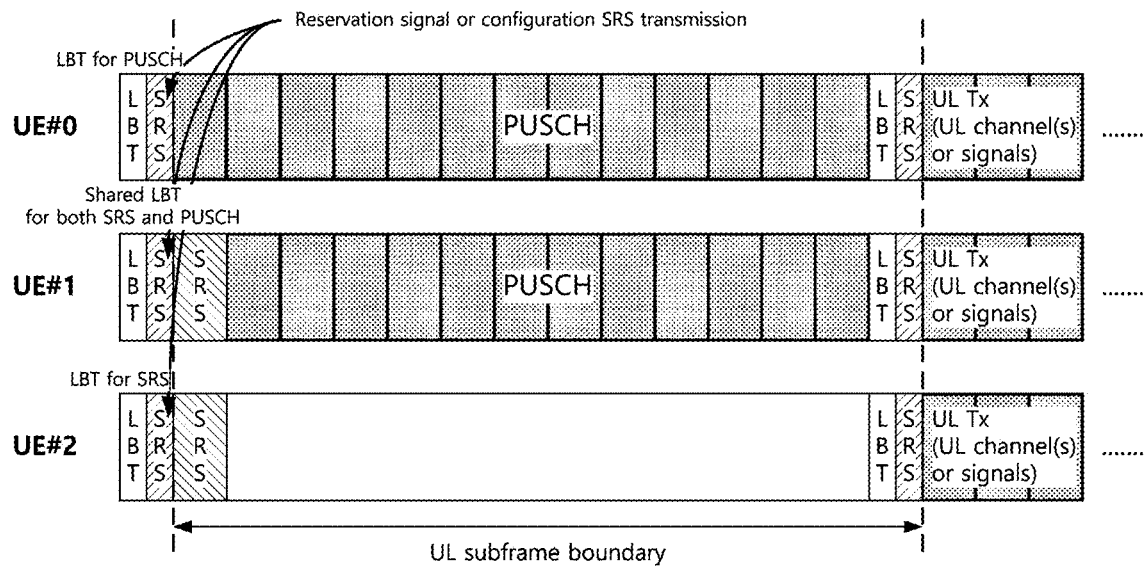
(a)
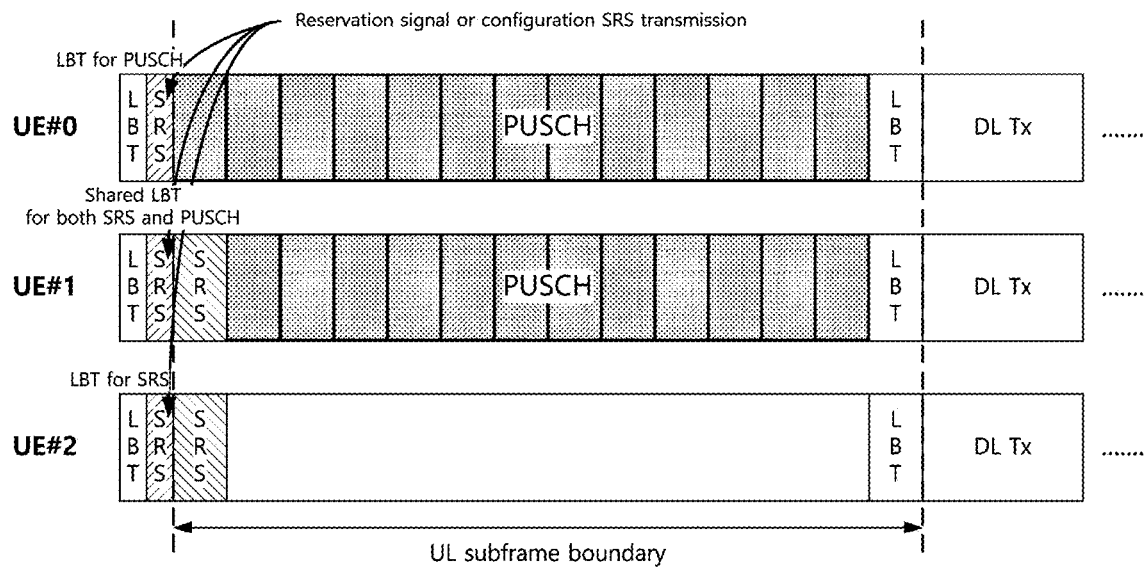
(b)
FIG. 28

CHANNEL ACCESS METHOD, DEVICE AND SYSTEM IN UNLICENSED BAND

CROSS-REFERENCE TO RELATED APPLICATIONS

This application is a continuation of U.S. patent application Ser. No. 16/924,142 filed on Jul. 8, 2020, which is a continuation of U.S. patent application Ser. No. 16/147,577 filed on Sep. 29, 2018, now issued as U.S. Pat. No. 10,743,344 dated Aug. 11, 2020, which is a continuation of International Patent Application No. PCT/KR2017/003529 filed on Mar. 30, 2017, which claims the priority to Korean Patent Application No. 10-2016-0038771 filed in the Korean Intellectual Property Office on Mar. 30, 2016, Korean Patent Application No. 10-2016-0039811 filed in the Korean Intellectual Property Office on Mar. 31, 2016, Korean Patent Application No. 10-2016-0044470 filed in the Korean Intellectual Property Office on Apr. 11, 2016, Korean Patent Application No. 10-2016-0045238 filed in the Korean Intellectual Property Office on Apr. 13, 2016, Korean Patent Application No. 10-2016-0057025 filed in the Korean Intellectual Property Office on May 10, 2016, Korean Patent Application No. 10-2016-0065156 filed in the Korean Intellectual Property Office on May 27, 2016, Korean Patent Application No. 10-2016-0079634 filed in the Korean Intellectual Property Office on Jun. 24, 2016, and Korean Patent Application No. 10-2016-0088279 filed in the Korean Intellectual Property Office on Jul. 12, 2016, the entire contents of which are incorporated herein by reference.

TECHNICAL FIELD

The present invention relates to a wireless communication system. More specifically, the present invention relates to a method, device, and system for performing channel access in an unlicensed band.

BACKGROUND ART

In recent years, with an explosive increase of mobile traffic due to the spread of smart devices, it has been difficult to cope with data usage which increases for providing a cellular communication service only by a conventional licensed frequency spectrum or LTE-licensed frequency band.

In such a situation, a scheme that uses an unlicensed (alternatively, unauthorized, non-licensed, or license unnecessary) frequency spectrum or LTE-Unlicensed frequency band (e.g., 2.4 GHz band, 5 GHz band, or the like) for providing the cellular communication service has been devised as a solution for a spectrum shortage problem.

However, unlike the licensed band in which a communication service provider secures an exclusive frequency use right through a procedure such as auction, or the like, in the unlicensed band, multiple communication facilities can be used simultaneously without limit when only a predetermined level of adjacent band protection regulation is observed. As a result, when the unlicensed band is used in the cellular communication service, it is difficult to guarantee communication quality at a level provided in the licensed band and an interference problem with a conventional wireless communication device (e.g., wireless LAN device) using the unlicensed band may occur.

Therefore, a research into a coexistence scheme with the conventional unlicensed band device and a scheme for efficiently sharing a radio channel needs to be preferentially made in order to settle an LTE technology in the unlicensed band. That is, a robust coexistence mechanism (RCM) needs to be developed in order to prevent a device using the LTE technology in the unlicensed band from influencing the conventional unlicensed band device.

DISCLOSURE OF THE INVENTION

Technical Problem

The present invention has been made in an effort to provide a method for efficiently transmitting a signal in a wireless communication system, in particular, a cellular wireless communication system and an apparatus therefor. Further, the present invention has been made in an effort to provide a method for efficiently transmitting a signal in a specific frequency band (e.g., unlicensed band) and an apparatus therefor.

Technical objects desired to be achieved in the present invention are not limited to the aforementioned objects, and other technical objects not described above will be apparently understood by those skilled in the art from the following disclosure.

Technical Solution

According to one aspect of the present invention, provided is a method for a user equipment to perform uplink transmission in a specific cell in a cellular wireless communication system, the method including: receiving uplink scheduling information on the uplink transmission including a new data indicator (NDI) associated with a specific subframe in a first uplink transmission burst; determining a contention window size based on the NDI; generating a random number N (N 0) in the determined contention window size; and performing the uplink transmission on the specific cell after sensing a channel on the specific cell at least for N slots while the channel on the specific cell is idle, wherein when the NDI is toggled, the contention window size is reset to a minimum value, and when the NDI is not toggled, the contention window size is increased to a next higher allowed value.

According to another aspect of the present invention, provided is a user equipment used in a cellular wireless communication system, the user equipment including: a wireless communication module; and a processor, wherein the processor is configured to receive uplink scheduling information on the uplink transmission including a new data indicator (NDI) associated with a specific subframe in a first uplink transmission burst; determine a contention window size based on the NDI; generate a random number N (N 0) in the determined contention window size; and perform the uplink transmission on the specific cell after sensing a channel on the specific cell at least for N slots while the channel on the specific cell is idle, wherein when the NDI indicates a new data transmission, the contention window size is reset to a minimum value, and when the NDI is not toggled, the contention window size is increased to a next higher allowed value.

The first uplink transmission burst may include one or more subframes, and the specific subframe is a starting in the first uplink transmission burst.

The uplink scheduling information may include a plurality of NDIs associated with the specific subframe, and if at least one of the plurality of NDIs may indicate a new data transmission, the contention window size is reset to a minimum value. The toggled NDI indicates a new data transmission.

The contention window size is determined independently for each of every channel access priority class. When the NDI is toggled, each of a contention window size for every channel access priority classes is reset to a minimum value for each of every channel access priority classes, and when the NDI is not toggled, each of the contention window size for every channel access priority classes is increased to a next higher allowed value for each of every channel access priority classes.

A hybrid automatic repeat request (HARQ)-process Identity (ID) corresponding to the specific subframe is same as a HARQ-process ID included in the uplink scheduling information.

When a HARQ-process ID corresponding to the specific subframe and a HARQ-process ID included in the uplink scheduling information are not same, the contention window size is increased to a next higher allowed value.

The first uplink transmission burst may be an uplink transmission burst that is the most recently transmitted before receiving the uplink scheduling information.

The first uplink transmission burst may be an uplink transmission burst that is the most recently transmitted after performing Type 1 channel access and before receiving the uplink scheduling information.

The specific subframe corresponds to a subframe transmitted before at least three subframes than a subframe in which the uplink scheduling information is received.

The specific cell may be an unlicensed cell.

Advantageous Effects

According to exemplary embodiments of the present invention, provided are a method for efficiently transmitting a signal in a wireless communication system, in particular, a cellular wireless communication system and an apparatus therefor. In addition, there are also provided a method and device for efficiently transmitting a signal in a specific frequency band (e.g., unlicensed band).

Effects to be acquired in the present invention are not limited to the aforementioned effects, and other effects not described above will be apparently understood by those skilled in the art from the following disclosure.

BRIEF DESCRIPTION OF THE DRAWINGS

In order to help understand the present invention, the accompanying drawings which are included as a part of the Detailed Description provide embodiments of the present invention and describe the technical matters of the present invention together with the Detailed Description.

FIG. 8 illustrates a DL/UL (Hybrid Automatic Repeat request) HARQ procedure for a single cell situation.

FIG. 14 illustrates downlink transmission in unlicensed band.

FIGS. 15 to 17 illustrate a DL transmission process in the unlicensed band according to the present invention.

FIGS. 18 to 28 illustrate a UL transmission process in the unlicensed band according to the present invention.

MODE FOR CARRYING OUT THE INVENTION

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "equal to or more than" or "equal to or less than" based on a specific threshold may be appropriately substituted with "more than" or "less than", respectively in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a radio technology such as universal terrestrial radio access (UTRA) or CDMA2000. The TDMA may be implemented by a radio technology such as global system for mobile communications (GSM)/general packet radio service (GPRS)/enhanced data rates for GSM evolution (EDGE). The OFDMA may be implemented by a radio technology such as IEEE 802.11 (Wi-Fi), IEEE 802.16 (WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP LTE/LTE-A is primarily described for clear description, but technical spirit of the present invention is not limited thereto.

Figure 1:
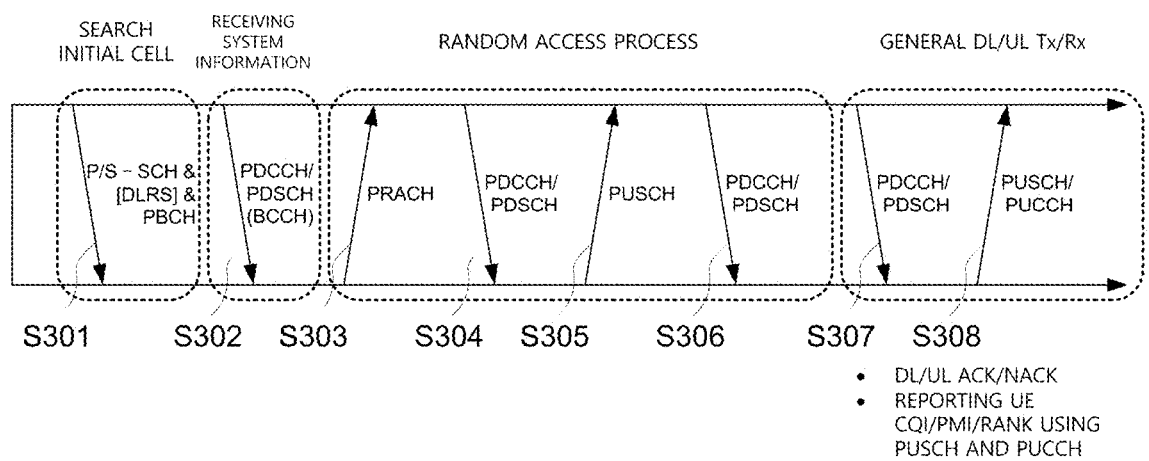
FIG. 1 illustrates physical channels used in a 3rd generation partnership project (3GPP) system and a general signal transmitting method using the physical channels.

FIG. 1 illustrates physical channels used in a 3GPP system and a general signal transmitting method using the physical channels. An user equipment receives information from a base station through downlink (DL) and the user equipment transmits information through uplink (UL) to the base station. The information transmitted/received between the base station and the user equipment includes data and various control information and various physical channels exist according to a type/purpose of the information transmitted/received between the base station and the user equipment.

When a power of the user equipment is turned on or the user equipment newly enters a cell, the user equipment performs an initial cell search operation including synchronization with the base station, and the like (S301). To this end, the user equipment receives a primary synchronization channel (P-SCH) and a secondary synchronization channel (S-SCH) from the base station to synchronize with the base station and obtain information including a cell ID, and the like. Thereafter, the user equipment receives a physical broadcast channel from the base station to obtain intra-cell broadcast information. The user equipment receives a downlink reference signal (DL RS) in an initial cell search step to verify a downlink channel state.

The user equipment that completes initial cell search receives a physical downlink control channel (PDCCH) and a physical downlink shared channel (PDSCH) depending on information loaded on the PDCCH to obtain more detailed system information (S302).

When there is no radio resource for initially accessing the base station or signal transmission, the user equipment may perform a random access procedure (RACH procedure) to the base station (S303 to S306). To this end, the user equipment may transmit a preamble through a physical random access channel (PRACH) (S303) and receive a response message to the preamble through the PDCCH and the PDSCH corresponding thereto (S304). In the case of a contention based RACH, a contention resolution procedure may be additionally performed.

Thereafter, the user equipment may receive the PDCCH/PDSCH (S307) and transmit a physical uplink shared channel (PUSCH)/physical uplink control channel (PUCCH) (S308) as a general procedure. The user equipment receives downlink control information (DCI) through the PDCCH. The DCI includes control information such as resource allocation information to the user equipment and a format varies depending on a use purpose. The control information which the user equipment transmits to the base station is designated as uplink control information (UCI). The UCI includes an acknowledgement/negative acknowledgement (ACK/NACK), a channel quality indicator (CQI), a precoding matrix index (PMI), a rank indicator (RI), and the like. The UCI may be transmitted through the PUSCH and/or PUCCH.

Figure 2:
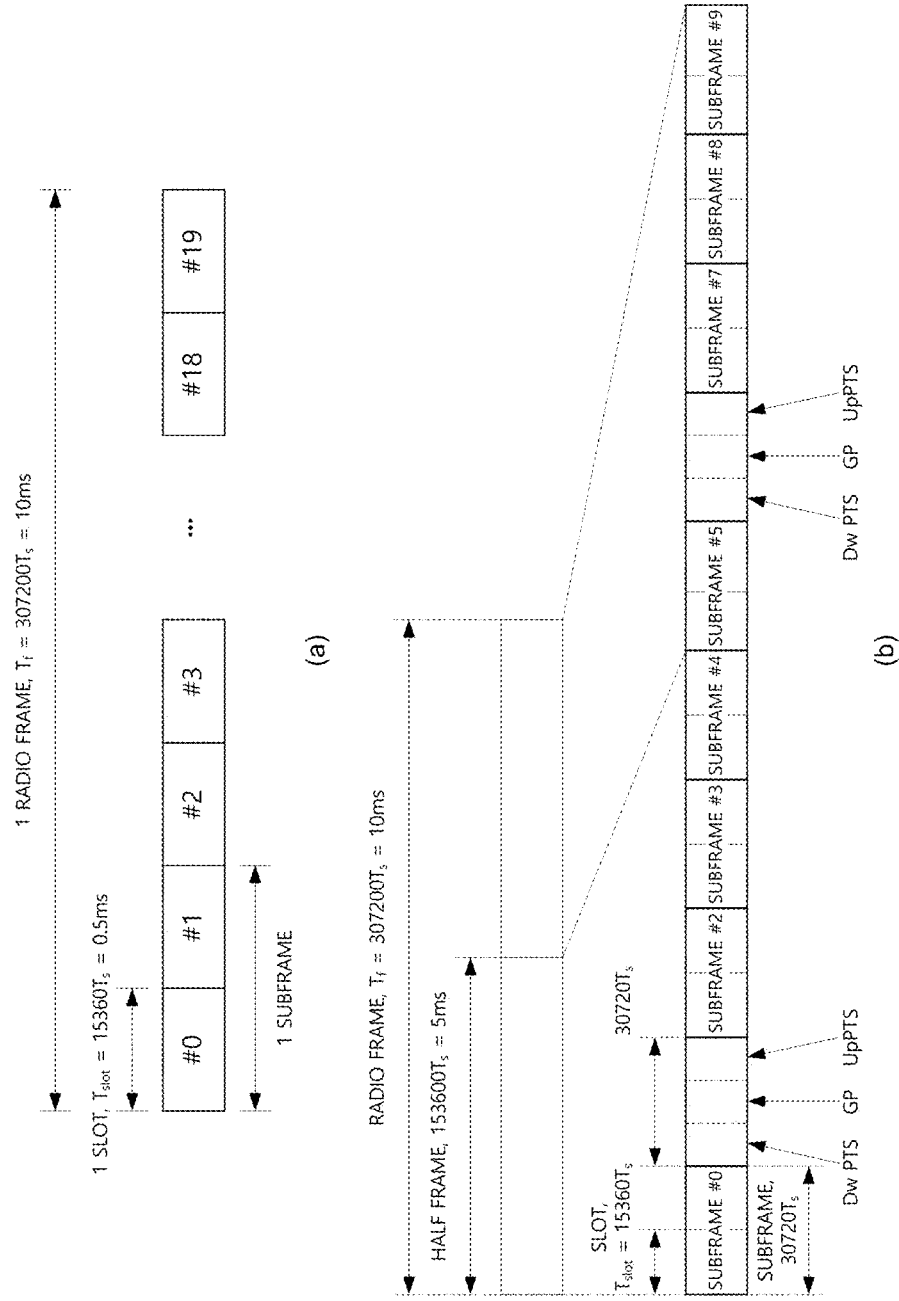
FIG. 2 illustrates one example of a radio frame structure used in a wireless communication system.

FIG. 2 illustrates one example of a radio frame structure used in a wireless communication system. (a) in FIG. 2 illustrates a frame structure for frequency division duplex (FDD) and (b) in FIG. 2 illustrates a frame structure for time division duplex (TDD).

Referring to FIG. 2, a radio frame may have a length of 10 ms (307200 Ts) and be constituted by 10 subframes (SFs). Ts represents a sampling time and is expressed as Ts=1/(2048*15 kHz). Each subframe may have a length of 1 ms and be constituted by 2 slots. Each slot has a length of 0.5 ms. A time for transmitting one subframe is defined as a transmission time interval (TTI). A time resource may be distinguished by radio frame numbers/indexes, subframe numbers/indexes #0 to #9, and slot numbers/indexes #0 to #19.

The radio frame may be configured differently according to a duplex mode. In an FDD mode, downlink transmission and uplink transmission are distinguished by a frequency and the radio frame includes only one of a downlink subframe and an uplink subframe with respect to a specific frequency band. In a TDD mode, the downlink transmission and the uplink transmission are distinguished by a time and the radio frame includes both the downlink subframe and the uplink subframe with respect to a specific frequency band.

Figure 3:
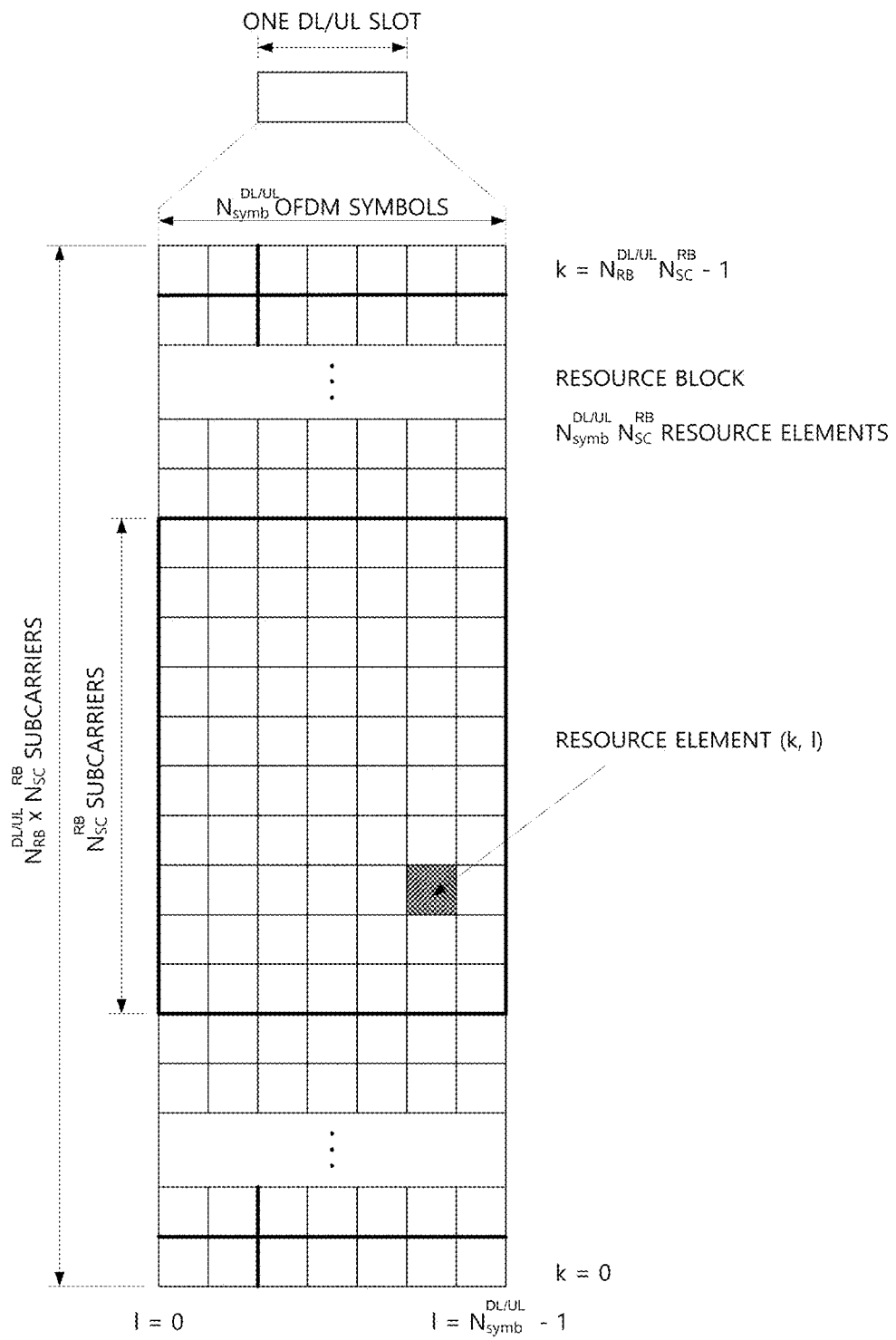
FIG. 3 illustrates one example of a downlink (DL)/uplink (UL) slot structure in the wireless communication system.

FIG. 3 illustrates a structure of a downlink/uplink slot.

Referring to FIG. 3, the slot includes a plurality of orthogonal frequency divisional multiplexing (OFDM) symbols in a time domain and a plurality of resource blocks (RBs) in a frequency domain. The OFDM symbol also means one symbol period. The OFDM symbol may be called an OFDMA symbol, a single carrier frequency division multiple access (SC-FDMA) symbol, or the like according to a multi-access scheme. The number of OFDM symbols included in one slot may be variously modified according to the length of a cyclic prefix (CP). For example, in the case of a normal CP, one slot includes 7 OFDM symbols and in the case of an extended CP, one slot includes 6 OFDM symbols. The RB is defined as $N^{DL/UL}_{synth}$ (e.g., 7) continuous OFDM symbols in the time domain and $N^{RB}_{sc}$ (e.g., 12) continuous subcarriers in the frequency domain. A resource constituted by one OFDM symbol and one subcarrier is referred to as a resource element (RE) or a tone. One RB is constituted by $N^{DL/UL}_{symb}*N^{RB}_{sc}$ resource elements.

The resource of the slot may be expressed as a resource grid constituted by $N^{DL/UL}_{sc}*N^{RB}_{sc}$ subcarriers and $N^{DL/UL}_{symb}$ OFDM symbols. Each RE in the resource grid is uniquely defined by an index pair (k, 1) for each slot. k represents an index given with 0 to $N^{DL/UL}_{RB}*N^{RB}_{sc}-1$ in the frequency domain and 1 represents an index given with 0 to $N^{DL/UL}_{symb}-1$ in the time domain. Herein, $N^{DL}_{RB}$ represents the number of resource blocks (RBs) in the downlink slot and $N^{UL}_{RB}$ represents the number of RBs in the UL slot. $N^{DL}_{RB}$ and $N^{UL}_{RB}$ depend on a Downlink transmission bandwidth and a Uplink transmission bandwidth, respectively. $N^{DL}_{symb}$ represents the number of symbols in the downlink slot and $N^{UL}_{symb}$ represents the number of symbols in the UL slot. $N^{RB}_{sc}$ represents the number of subcarriers constituting one RB. One resource grid is provided per antenna port.

Figure 4:
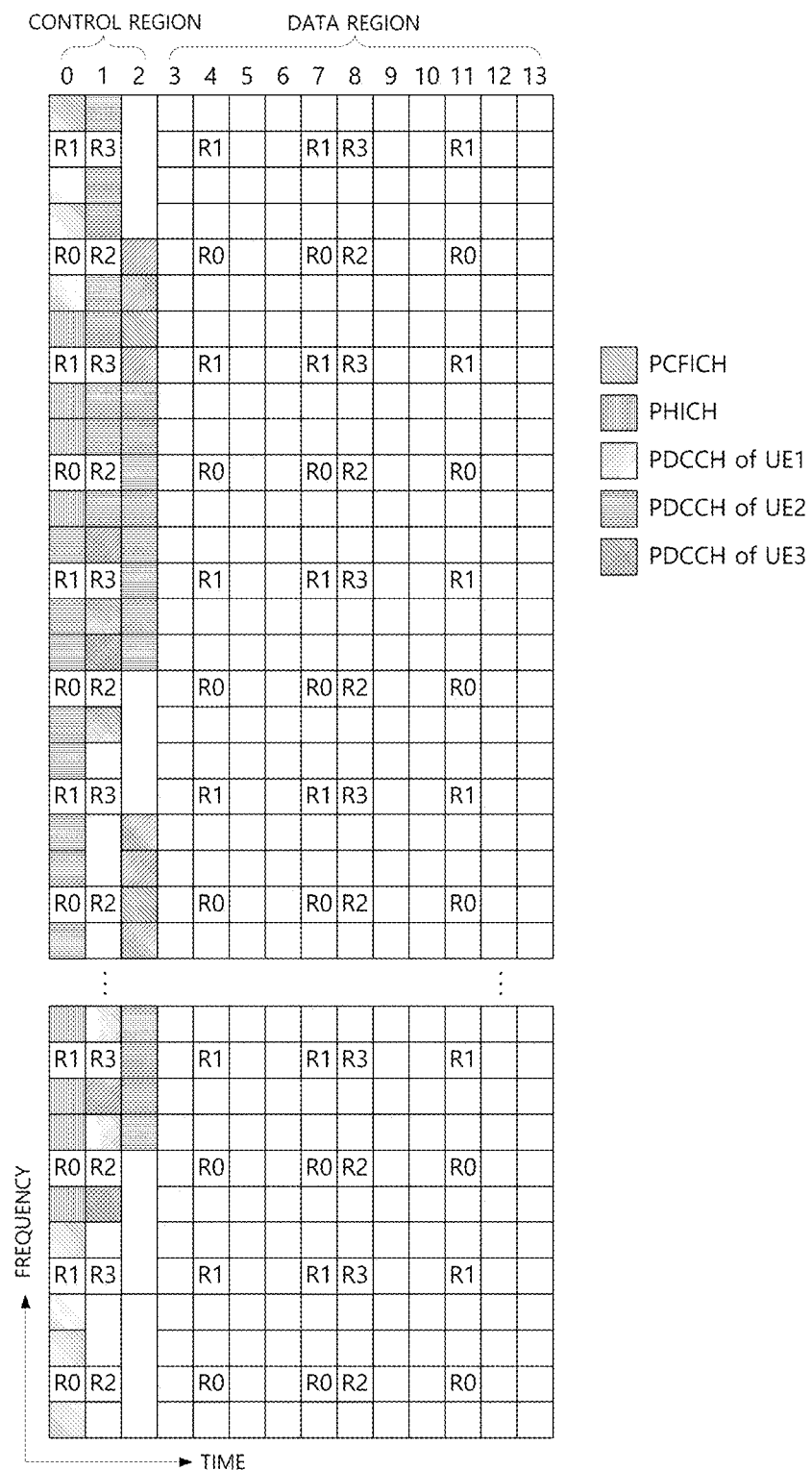
FIG. 4 illustrates a structure of a downlink subframe (SF).

FIG. 4 illustrates a structure of a downlink subframe.

Referring to FIG. 4, the subframe may be constituted by 14 OFDM symbols. First 1 to 3 (alternatively, 2 to 4) OFDM symbols are used as a control region and the remaining 13 to 11 (alternatively, 12 to 10) OFDM symbols are used as a data region according to subframe setting. R1 to R4 represent reference signals for antenna ports 0 to 3. Control channels allocated to the control region include a physical control format indicator channel (PCFICH), a physical hybrid-ARQ indicator channel (PHICH), a physical downlink control channel (PDCCH), and the like. Data channels allocated to the data region include the PDSCH, and the like. When an enhanced PDCCH (EPDCCH) is set, the PDSCH and the EPDCCH are multiplexed by frequency division multiplexing (FDM) in the data region.

The PDCCH as the physical downlink control channel is allocated to first n OFDM symbols of the subframe. n as an integer of 1 (alternatively, 2) or more is indicated by the PCFICH. The PDCCH announces information associated with resource allocation of a paging channel (PCH) and a downlink-shared channel (DL-SCH) as transmission channels, an uplink scheduling grant, HARQ information, and the like to each user equipment or user equipment group. Data (that is, transport block) of the PCH and the DL-SCH are transmitted through the PDSCH. Each of the base station and the user equipment generally transmit and receive data through the PDSCH except for specific control information or specific service data.

Information indicating to which user equipment (one or a plurality of user equipments) the data of the PDSCH is transmitted, information indicating how the user equipments receive and decode the PDSCH data, and the like are transmitted while being included in the PDCCH/EPDCCH. For example, it is assumed that the PDCCH/EPDCCH is CRC-masked with a radio network temporary identity (RNTI) called "A" and information regarding data transmitted by using a radio resource (e.g., frequency location) called "B" and a DCI format called "C", that is, transmission format information (e.g., transport block size, modulation scheme, coding information, and the like) is transmitted through a specific subframe. In this case, a user equipment in the cell monitors the PDCCH/EPDCCH by using the RNTI information thereof and when one or more user equipments having the "A" RNTI are provided, the user equipments receive the PDCCH/EPDCCH and receive the PDSCH indicated by "B" and "C" through information on the received PDCCH/EPDCCH.

Figure 5:
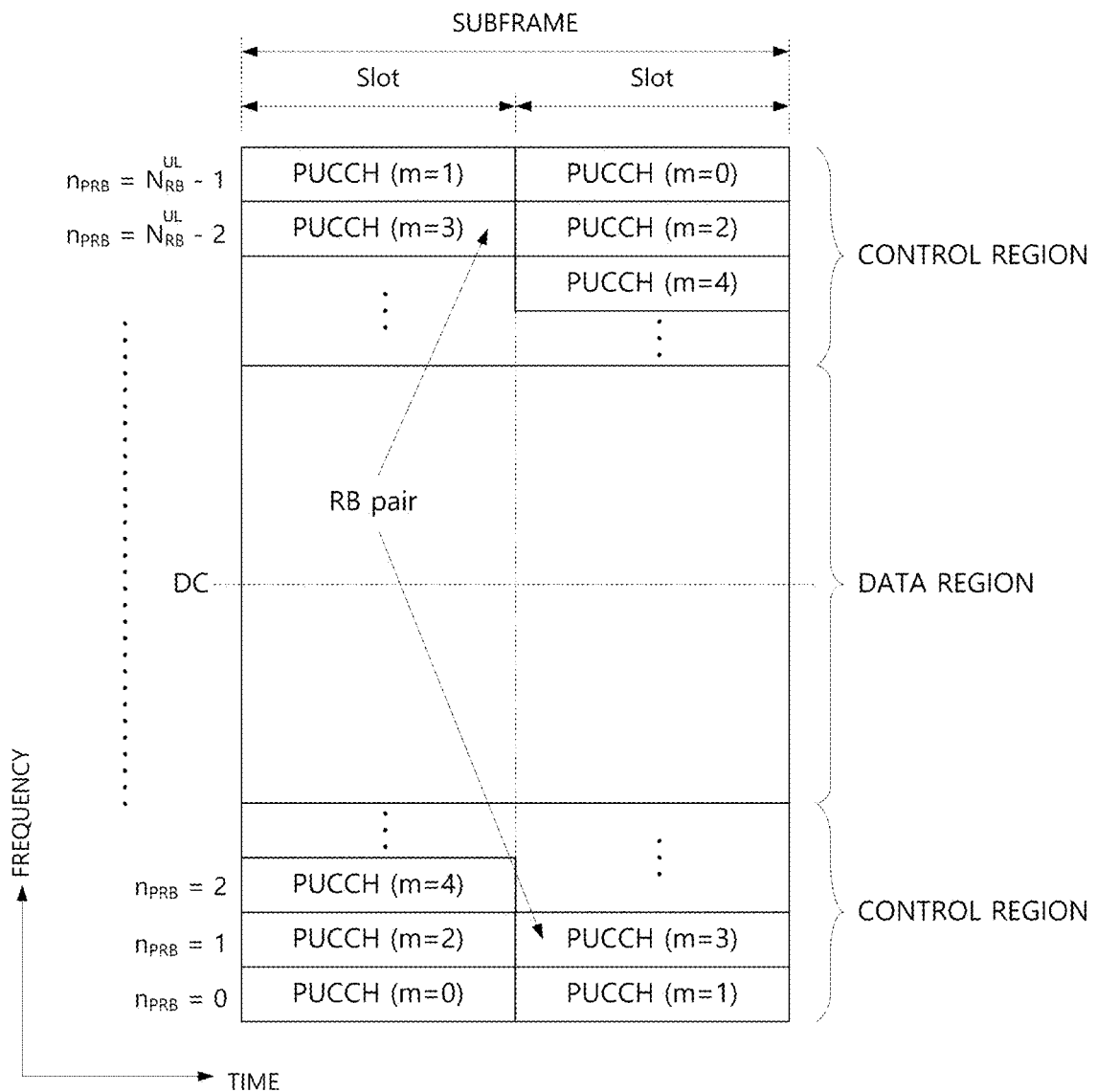
FIG. 5 illustrates a structure of an uplink subframe.

FIG. 5 illustrates a structure of an uplink subframe.

Referring to FIG. 5, the subframe may be divided into the control region and the data region in the frequency domain. The PUCCH is allocated to the control region and carries the UCI. The PUSCH is allocated to the data region and carries user data.

The PUCCH may be used to transmit the following control information.

Scheduling Request (SR): Information used to request a UL-SCH resource. The SR is transmitted by using an on-off keying (OOK) scheme.

HARQ-ACK: Response to the PDCCH and/or response to a downlink data packet (e.g., codeword) on the PDSCH. The codeword is an encoded format of the transport block. The HARQ-ACK indicates whether the PDCCH or PDSCH is successfully received. The HARQ-ACK response includes a positive ACK (simply, ACK), a negative ACK (NACK), discontinuous transmission (DTX), or the NACK/DTX. The DTX represents a case in which the user equipment misses the PDCCH (alternatively, semi-persistent scheduling (SPS) PDSCH) and the NACK/DTX means the NACK or DTX. The HARQ-ACK is mixedly used with the HARQ-ACK/NACK and the ACK/NACK.

Channel State Information (CSI): Feed-back information regarding the downlink channel. Multiple input multiple output (MIMO) related feed-back information includes the RI and the PMI.

Table 1 shows the relationship between the PUCCH format (format) and the UCI.

TABLE 1

| PUCCH format | UPLINK CONTROL INFORMATION (UCI) |
| --- | --- |
| format 1 | SR(SCHEDULING REQUEST) (non-modulated waveform) |

TABLE 1-continued

| PUCCH format | UPLINK CONTROL INFORMATION (UCI) |
| --- | --- |
| format 1a | 1-bit HARQ ACK/NACK (with/without SR) |
| format 1b | 2-bit HARQ ACK/NACK (with/without SR) |
| format 2 | CSI (20 coded bits) |
| format 2 | CSI and 1-bit or 2-bit HARQ ACK/NACK (20 bits) (extended CP only) |
| format 2a | CSI and 1-bit HARQ ACK/NACK (20 + 1 coded bits) |
| format 2b | CSI and 2-bit HARQ ACK/NACK (20 + 2 coded bits) |
| format 3 (LTE-A) | HARQ ACK/NACK + SR (48 coded bits) |

Hereinafter, carrier aggregation will be described. The carrier aggregation means a method in which the wireless communication system uses a plurality of frequency blocks as one large logical frequency band in order to use a wider frequency band. When a whole system band is extended by the carrier aggregation, a frequency band used for communication with each user equipment is defined by a component carrier (CC) unit.

Figure 6:
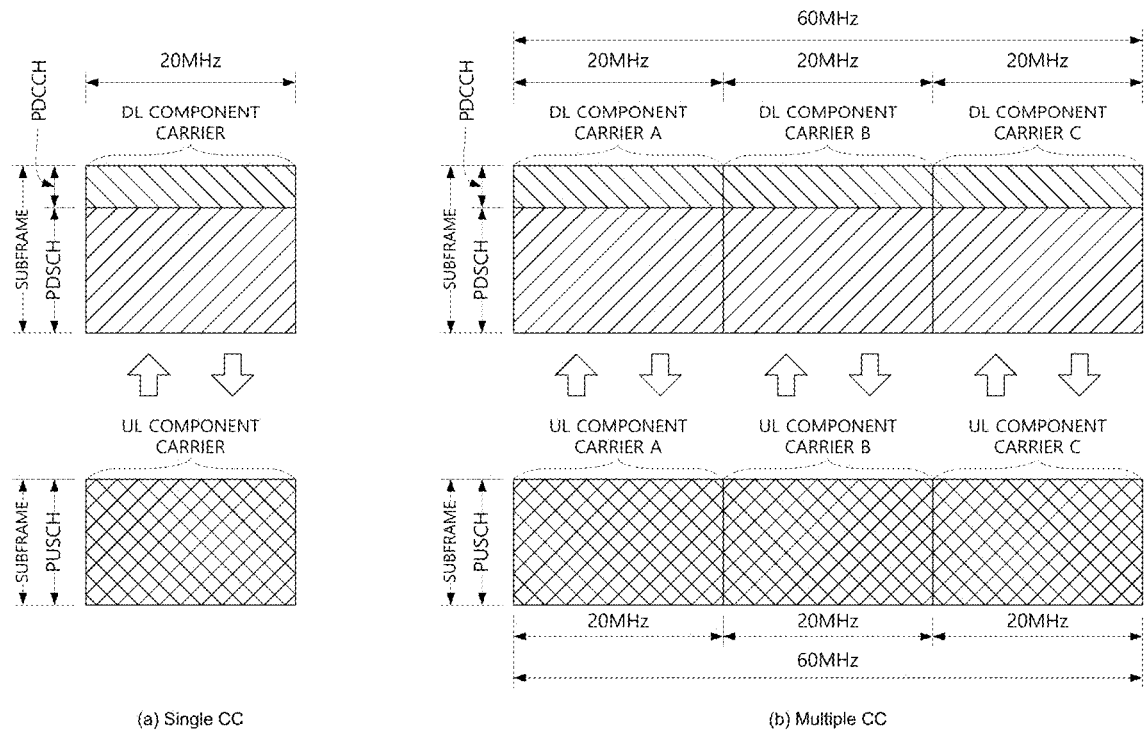
FIG. 6 is a diagram for describing single carrier communication and multi-carrier communication.

FIG. 6 is a diagram for describing single carrier communication and multi-carrier communication. (a) in FIG. 6 illustrates a subframe structure of a single carrier and (b) in FIG. 6 illustrates a subframe structure of multi-carriers which are carrier-aggregated.

Referring to (a) in FIG. 6, in a single carrier system, the base station and the user equipment perform data communication through one DL band and one UL band corresponding thereto. The DL/UL band is divided into a plurality of orthogonal subcarriers and each frequency band operates at one carrier frequency. In the FDD, the DL and UL bands operate at different carrier frequencies, respectively and in the TDD, the DL and UL bands operate at the same carrier frequency. The carrier frequency means a center frequency of the frequency band.

Referring to (b) in FIG. 6, the carrier aggregation is distinguished from an OFDM system that performs DL/UL communication in a base frequency band divided into a plurality of subcarriers by using one carrier frequency, in that the carrier aggregation performs DL/UL communication by using a plurality of carrier frequencies. Referring to (b) in FIG. 6, three 20 MHz CCs are gathered in each of the UL and the DL to support a bandwidth of 60 MHz. The CCs may be adjacent to each other or non-adjacent to each other in the frequency domain. For convenience, (b) in FIG. 6 illustrates a case in which a bandwidth of a UL CC and a bandwidth of a DL CC are the same as each other and symmetric to each other, but the bandwidths of the respective CCs may be independently decided. Further, asymmetric carrier aggregation in which the number of UL CCs and the number of DL CCs are different from each other is also available. The DL/UL CC(s) are independently allocated/configured for each user equipment and the DL/UL CC(s) allocated/configured to the user equipment are designated as serving UL/DL CC(s) of the corresponding user equipment.

The base station may activate some or all of serving CCs of the user equipment or deactivate some CCs. When the base station allocates the CC(s) to the user equipment, if the CC allocation to the user equipment is wholly reconfigured or if the user equipment does not hand over, at least one specific CC among the CC(s) configured with respect to the corresponding user equipment is not deactivated. A specific CC which is always activated is referred to as a primary CC (PCC) and a CC which the base station may arbitrarily activate/deactivate is referred to as a secondary CC (SCC). The PCC and the SCC may be distinguished based on the control information. For example, specific control information may be set to be transmitted/received only through a specific CC and the specific CC may be referred to as the PCC and remaining CC(s) may be referred to as SCC(s). The PUCCH is transmitted only on the PCC.

In 3GPP, a concept of the cell is used in order to manage the radio resource. The cell is defined as a combination of the DL resource and the UL resource, that is, a combination of the DL CC and the UL CC. The cell may be configured by the DL resource only or the combination of the DL resource and the UL resource. When the carrier aggregation is supported, a linkage between the carrier frequency of the DL resource (alternatively, DL CC) and the carrier frequency of the UL resource (alternatively, UL CC) may be indicated by system information. For example, the combination of the DL resource and the UL resource may be indicated by a system information block type 2 (SIB2) linkage. The carrier frequency means a center frequency of each cell or CC. A cell corresponding to the PCC is referred to as the primary cell (PCell) and a cell corresponding to the SCC is referred to as the secondary cell (SCell). A carrier corresponding to the PCell is a DL PCC in the downlink and a carrier corresponding to the PCell is a UL PCC in the uplink. Similarly, a carrier corresponding to the SCell is a DL SCC in the downlink and a carrier corresponding to the SCell is a UL SCC in the uplink. According to a user equipment capability, the serving cell(s) may be constituted by one PCell and 0 or more SCells. For a user equipment which is in an RRC_CONNECTED state, but does not have any configuration for the carrier aggregation or does not support the carrier aggregation, only one serving cell constituted by only the PCell is present.

Figure 7:
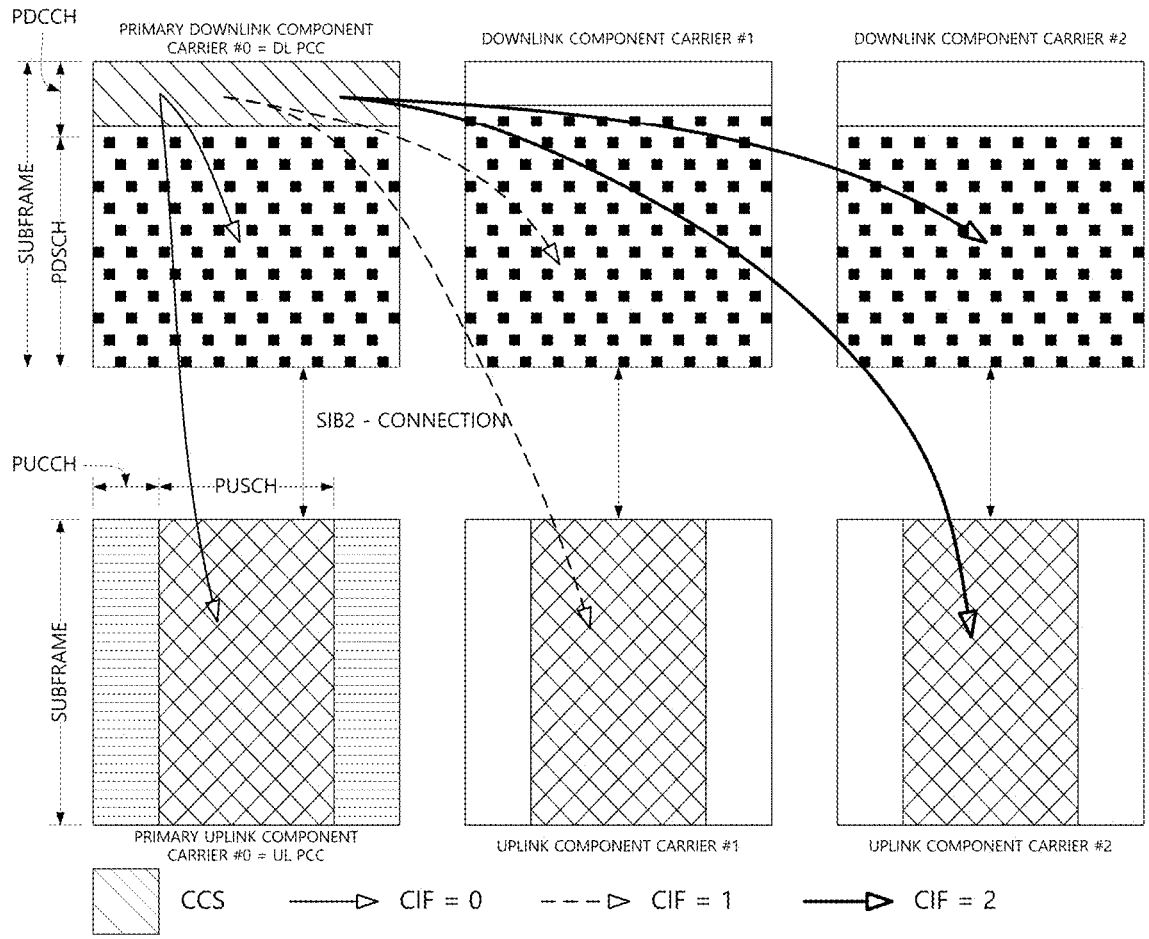
FIG. 7 illustrates an example in which a cross carrier scheduling technique is applied.

FIG. 7 illustrates an example in which cross carrier scheduling is applied. When the cross carrier scheduling is configured, a control channel transmitted through a first CC may schedule a data channel transmitted through the first CC or a second CC by using a carrier indicator field (CIF). The CIF is included in the DCI. In other words, a scheduling cell is configured, and a DL grant/UL grant transmitted in a PDCCH area of the scheduling cell schedules the PDSCH/PUSCH of a scheduled cell. That is, a search space for a plurality of component carriers is present in the PDCCH area of the scheduling cell. The PCell may be basically the scheduling cell and a specific SCell may be designated as the scheduling cell by an upper layer.

In FIG. 7, it is assumed that three DL CCs are aggregated. Herein, DL component carrier #0 is assumed as the DL PCC (alternatively, PCell) and DL component carrier #1 and DL component carrier #2 are assumed as the DL SCC (alternatively, SCell). Further, it is assumed that the DL PCC is set as a PDCCH monitoring CC. When the CIF is disabled, the respective DL CCs may transmit only the PDCCH that schedules the PDSCH thereof without the CIF according to an LTE PDCCH rule (non-cross carrier scheduling or self-carrier scheduling). On the contrary, when the CIF is enabled by UE-specific (alternatively, UE-group-specific or cell-specific) upper layer signaling, a specific CC (e.g., DL PCC) may transmit the PDCCH scheduling the PDSCH of DL CC A and the PDCCH scheduling the PDSCH of another CC by using the CIF (cross-carrier scheduling). On the contrary, in another DL CC, the PDCCH is not transmitted.

FIG. 8 illustrates a DL/UL HARQ procedure for a single cell situation. (a) of FIG. 8 illustrates a DL HARQ procedure, and (a) of FIG. 8 illustrates a UL HARQ procedure. For the DL HARQ procedure, ACK/NACK (A/N) for (i) a PDSCH scheduled by a PDCCH, (ii) a PDSCH (i.e., SPS PDSCH) without a corresponding PDCCH, and (iii) a PDCCH instructing the SPS release is fed back. For the UL HARQ procedure, ACK/NACK (A/N) for (i) a PUSCH scheduled by the PDCCH and (ii) a PUSCH (i.e., SPS PUSCH) without a corresponding PDCCH is fed back. A PDCCH includes an EPDCCH.

Referring to (a) in FIG. 8, a user equipment receives a PDCCH (or EPDCCH) in a subframe #n-k (S802) and receives a PDSCH indicated by the PDCCH in the same subframe (S804). The PDCCH transmits scheduling information (i.e., DL grant), and the PDSCH transmits one or a plurality (e.g., two) of transmission blocks TB (or codewords CW) according to a transmission mode. Thereafter, the user equipment may transmit an ACK/NACK for the PDSCH (i.e., the transmission block) in the subframe #n (S806). In response to a single transmission block, one bit of ACK/NACK may be transmitted and two bits of ACK/NACK may be transmitted in response to two transmission blocks. The ACK/NACK is basically transmitted via the PUCCH, but when there is a PUSCH transmission in subframe #n, the ACK/NACK is transmitted via the PUSCH. k denotes the time interval between the DL subframe and the UL subframe. K=4 in the FDD, and k in the TDD may be given by the Downlink Association Set Index (DASI). ACK/NACK represents HARQ-ACK. The HARQ-ACK response includes ACK, NACK, DTX, and NACK/DTX.

Referring to (b) in FIG. 8, the user equipment receives a PDCCH (or EPDCCH) in a subframe #n−k1 (S812) and transmits a PUSCH indicated by the PDCCH in the subframe #n (S814). The PDCCH transmits scheduling information (i.e., UL grant), and the PUSCH transmits one or a plurality (e.g., two) of transport blocks TB (or codewords CW) according to a transmission mode. Then, the user equipment may receive the reception response information for the PUSCH (i.e., the transport block) in the subframe #n+k2 through the PHICH or UL grant (S816). The UL grant includes NDI (New Data Indicator) for each TB, and the NDI indicates a new data transmission according to the toggle, or indicates retransmission of the TB of the previous PUSCH. For example, if the NDI is toggled from the NDI value of the previous UL grant, the NDI indicates the new data transmission, and otherwise the NDI indicates retransmission for the TB of the previous PUSCH. k1/k2 represents a time interval between the DL subframe and the UL subframe. In the FDD, k1=k2=4, and in the TDD, k1/k2 depends on the TDD UL-DL configuration.

When a plurality of cells is configured to a user equipment, ACK/NACK information may be transmitted using PUCCH format 3, or may be transmitted using a channel selection scheme based on PUCCH format 1b.

A ACK/NACK payload for PUCCH format 3 is configured per cell and concatenated according to the cell index order. The ACK/NACK payload is configured for all cells configured for the user equipment regardless of whether actual data is transmitted in each cell. Each bit in the ACK/NACK payload represents HARQ-ACK feedback for transmission block (or codeword). The HARQ-ACK feedback indicates ACK or NACK, and DTX is processed as NACK. NACK and DTX have the same HARQ-ACK feedback value. If necessary, the base station may distinguish the NACK from the DTX by using information on the control channel that the base station has transmitted to the user equipment.

The channel selection scheme based on PUCCH format 1b may be configured for ACK/NACK transmission when two cells are aggregated. In the channel selection scheme based on the PUCCH format 1b, ACK/NACK responses for a plurality of transmission blocks (or codewords) are identified by a combination of a PUCCH resource index and a bit value.

Table 2 shows the mapping between the HARQ-ACK(j) and the transport block (TB) of each cell in the channel selection scheme based on the PUCCH format 1b. Tables 3 to 5 show the mapping of ACK, NACK, DTX, and NACK/DTX when A=2 to 4, respectively. The user equipment selects a PUCCH resource corresponding to a set of HARQ-ACK from A of PUCCH resources and transmits the 2-bit value corresponding to the set of HARQ-ACK by using the selected PUCCH resource. The DTX may be transmitted alone or as NACK/DTX. If NACK/DTX is transmitted, the base station may distinguish the NACK and the DTX by using information on the control channel that the base station has transmitted to the user equipment, if necessary.

TABLE 2

| | HARQ-ACK(j) | | | |
|---|---|---|---|---|
| A | HARQ-ACK(0) | HARQ-ACK(1) | HARQ-ACK(2) | HARQ-ACK(3) |
| 2 | TB1 PRIMARY CELL | TB1 SECONDARY CELL | NA | NA |
| 3 | TB1 SERVING CELL1 | TB2 SERVING CELL1 | TB1 SERVING CELL2 | NA |
| 4 | TB1 PRIMARY CELL | TB2 PRIMARY CELL | TB1 SECONDARY CELL | TB2 SECONDARY CELL |

TABLE 3

| HARQ-ACK(0) | HARQ-ACK(1) | $n_{PUCCH}^{(1)}$ | b(0)b(1) |
|---|---|---|---|
| ACK | ACK | $n_{PUCCH,1}^{(1)}$ | 1, 1 |
| ACK | NACK/DTX | $n_{PUCCH,0}^{(1)}$ | 1, 1 |
| NACK/DTX | ACK | $n_{PUCCH,1}^{(1)}$ | 0, 0 |
| NACK | NACK/DTX | $n_{PUCCH,0}^{(1)}$ | 0, 0 |
| DTX | NACK/DTX | NO TRANSMISSION | |

TABLE 4

| HARQ-ACK(0) | HARQ-ACK(1) | HARQ-ACK(2) | $n_{PUCCH}^{(1)}$ | b(0)b(1) |
|---|---|---|---|---|
| ACK | ACK | ACK | $n_{PUCCH,1}^{(1)}$ | 1, 1 |
| ACK | NACK/DTX | ACK | $n_{PUCCH,1}^{(1)}$ | 1, 0 |
| NACK/DTX | ACK | ACK | $n_{PUCCH,1}^{(1)}$ | 0, 1 |
| NACK/DTX | NACK/DTX | ACK | $n_{PUCCH,2}^{(1)}$ | 1, 1 |
| ACK | ACK | NACK/DTX | $n_{PUCCH,0}^{(1)}$ | 1, 1 |
| ACK | NACK/DTX | NACK/DTX | $n_{PUCCH,0}^{(1)}$ | 1, 0 |
| NACK/DTX | ACK | NACK/DTX | $n_{PUCCH,0}^{(1)}$ | 0, 1 |
| NACK/DTX | NACK/DTX | NACK | $n_{PUCCH,2}^{(1)}$ | 0, 0 |
| NACK | NACK/DTX | DTX | $n_{PUCCH,0}^{(1)}$ | 0, 0 |
| NACK/DTX | NACK | DTX | $n_{PUCCH,0}^{(1)}$ | 0, 0 |
| DTX | DTX | DTX | NO TRANSMISSION | |

TABLE 5

| HARQ-ACK(0) | HARQ-ACK(1) | HARQ-ACK(2) | HARQ-ACK(3) | $n_{PUCCH}^{(1)}$ | b(0)b(1) |
|---|---|---|---|---|---|
| ACK | ACK | ACK | ACK | $n_{PUCCH,1}^{(1)}$ | 1, 1 |
| ACK | NACK/DTX | ACK | ACK | $n_{PUCCH,2}^{(1)}$ | 0, 1 |
| NACK/DTX | ACK | ACK | ACK | $n_{PUCCH,1}^{(1)}$ | 0, 1 |
| NACK/DTX | NACK/DTX | ACK | ACK | $n_{PUCCH,3}^{(1)}$ | 1, 1 |
| ACK | ACK | ACK | NACK/DTX | $n_{PUCCH,1}^{(1)}$ | 1, 0 |
| ACK | NACK/DTX | ACK | NACK/DTX | $n_{PUCCH,2}^{(1)}$ | 0, 0 |
| NACK/DTX | ACK | ACK | NACK/DTX | $n_{PUCCH,1}^{(1)}$ | 0, 0 |
| NACK/DTX | NACK/DTX | ACK | NACK/DTX | $n_{PUCCH,3}^{(1)}$ | 1, 0 |
| ACK | ACK | NACK/DTX | ACK | $n_{PUCCH,2}^{(1)}$ | 1, 1 |
| ACK | NACK/DTX | NACK/DTX | ACK | $n_{PUCCH,2}^{(1)}$ | 1, 0 |
| NACK/DTX | ACK | NACK/DTX | ACK | $n_{PUCCH,3}^{(1)}$ | 0, 1 |
| NACK/DTX | NACK/DTX | NACK/DTX | ACK | $n_{PUCCH,3}^{(1)}$ | 0, 0 |
| ACK | ACK | NACK/DTX | NACK/DTX | $n_{PUCCH,0}^{(1)}$ | 1, 1 |
| ACK | NACK/DTX | NACK/DTX | NACK/DTX | $n_{PUCCH,0}^{(1)}$ | 1, 0 |
| NACK/DTX | ACK | NACK/DTX | NACK/DTX | $n_{PUCCH,0}^{(1)}$ | 0, 1 |
| NACK/DTX | NACK | NACK/DTX | NACK/DTX | $n_{PUCCH,0}^{(1)}$ | 0, 0 |
| NACK | NACK/DTX | NACK/DTX | NACK/DTX | $n_{PUCCH,0}^{(1)}$ | 0, 0 |
| DTX | DTX | NACK/DTX | NACK/DTX | NO TRANSMISSION | |

Embodiment: CWS Adjustment Scheme for Random Backoff in Unlicensed Band

Figure 9:
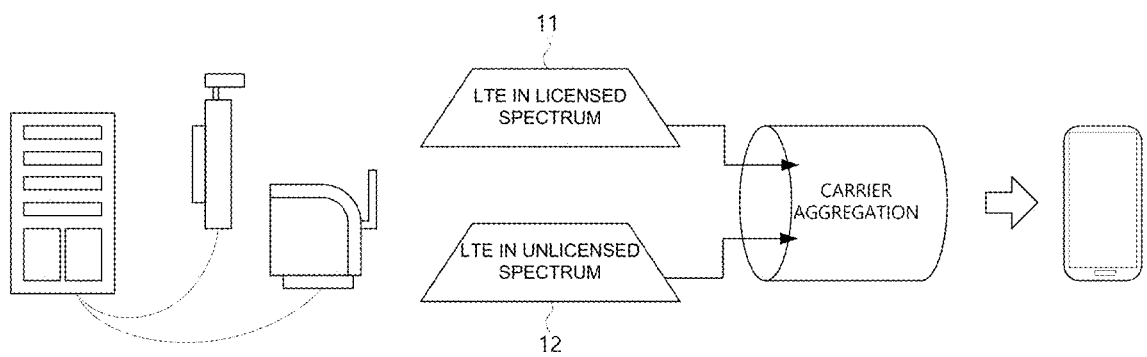
FIG. 9 illustrates a Licensed Assisted Access (LAA) service environment.

FIG. 9 illustrates a Licensed Assisted Access (LAA) service environment.

Referring to FIG. 9, a service environment may be provided to a user, in the service environment, an LTE technology (11) in a conventional licensed band and LTE-unlicensed (LTE-U) or LAA which is an LTE technology (12) in an unlicensed band, which has been actively discussed may be connected to each other. For example, the LTE technology (11) in the licensed band and the LTE technology (12) in the unlicensed band in the LAA environment may be integrated by using a technology such as carrier aggregation, or the like, which may contribute to extension of a network capacity. Further, in an asymmetric traffic structure in which the amount of downlink data is more than that of uplink data, the LAA may provide an optimized LTE service according to various requirements or environments. For convenience, the LTE technology in the licensed (alternatively, authorized or permitted) band is referred to as LTE-licensed (LTE-L) and the LTE technology in the unlicensed (alternatively, unauthorized, non-licensed, license-unnecessary) band is referred to as LTE-unlicensed (LTE-U) or LAA.

Figure 10:
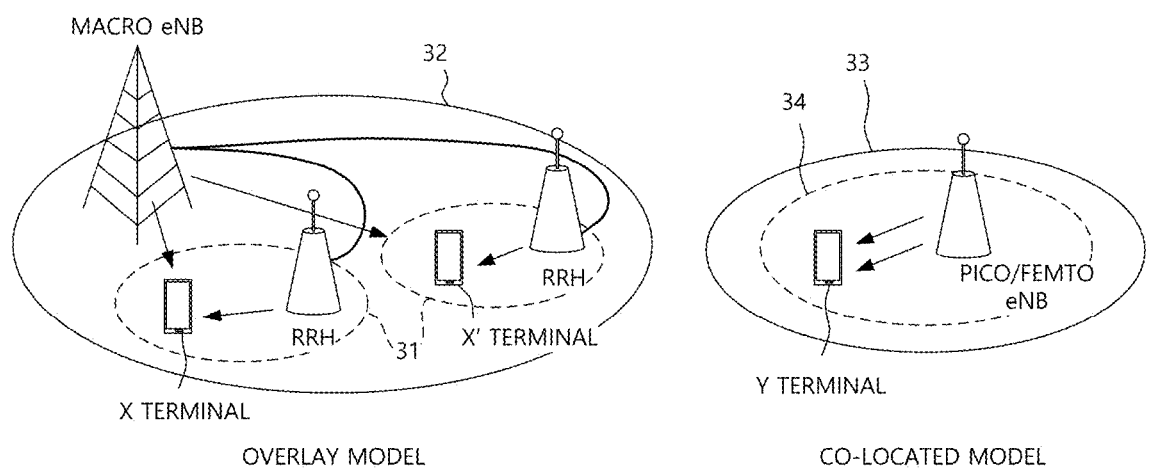
FIG. 10 illustrates a deployment scenario of a user equipment and a base station in an LAA service environment.

FIG. 10 illustrates a layout scenario of a user equipment and a base station in an LAA service environment. A frequency band targeted by the LAA service environment has a short wireless communication reach distance due to a high-frequency characteristic. By considering this, the layout scenario of the user equipment and the base station in an environment in which the conventional LTE-L service and the LAA service coexist may be an overlay model and a co-located model.

In the overlay model, a macro base station may perform wireless communication with an X user equipment and an X' user equipment in a macro area (32) by using a licensed carrier and be connected with multiple radio remote heads (RRHs) through an X2 interface. Each RRH may perform wireless communication with an X user equipment or an X' user equipment in a predetermined area (31) by using an unlicensed carrier. The frequency bands of the macro base station and the RRH are different from each other not to interfere with each other, but data needs to be rapidly exchanged between the macro base station and the RRH through the X2 interface in order to use the LAA service as an auxiliary downlink channel of the LTE-L service through the carrier aggregation.

In the co-located model, a pico/femto base station may perform the wireless communication with a Y user equipment by using both the licensed carrier and the unlicensed carrier. However, it may be limited that the pico/femto base station uses both the LTE-L service and the LAA service to downlink transmission. A coverage (33) of the LTE-L service and a coverage (34) of the LAA service may be different according to the frequency band, transmission power, and the like.

When LTE communication is performed in the unlicensed band, conventional equipments (e.g., wireless LAN (Wi-Fi) equipments) which perform communication in the corresponding unlicensed band may not demodulate an LTE-U message or data and determine the LTE-U message or data as a kind of energy to perform an interference avoidance operation by an energy detection technique. That is, if the energy corresponding to the LTE-U message or data is less than −62 dBm or less than a certain Energy Detection (ED) threshold, the WLAN devices may ignore the message or data and communicate. As a result, that user equipment which performs the LTE communication in the unlicensed band may be frequently interfered by the wireless LAN equipments.

Therefore, a specific frequency band needs to be allocated or reserved for a specific time in order to effectively implement an LTE-U technology/service. However, since peripheral equipments which perform communication through the unlicensed band attempt access based on the energy detection technique, there is a problem in that an efficient LTE-U service is difficult. Therefore, a research into a coexistence scheme with the conventional unlicensed band device and a scheme for efficiently sharing a radio channel needs to be preferentially made in order to settle the LTE-U technology. That is, a robust coexistence mechanism in which the LTE-U device does not influence the conventional unlicensed band device needs to be developed.

Figure 11:
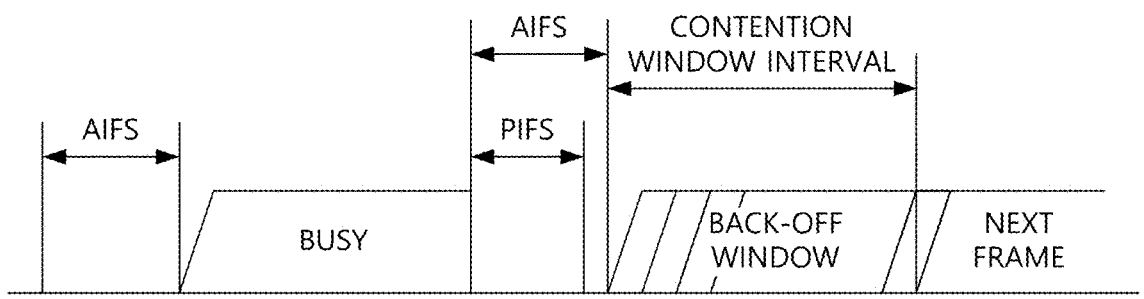
FIG. 11 illustrates a communication scheme (e.g., wireless LAN) that operates in an unlicensed band in the related art.

FIG. 11 illustrates a communication scheme (e.g., wireless LAN) that operates in an unlicensed band in the related art. Since most devices that operate in the unlicensed band operate based on listen-before-talk (LBT), a clear channel assessment (CCA) technique that senses a channel before data transmission is performed.

Referring to FIG. 11, a wireless LAN device (e.g., AP or STA) checks whether the channel is busy by performing carrier sensing before transmitting data. When a predetermined strength or more of radio signal is sensed in a channel to transmit data, it is determined that the corresponding channel is busy and the wireless LAN device delays the access to the corresponding channel. Such a process is referred to as clear channel evaluation and a signal level to decide whether the signal is sensed is referred to as a CCA threshold. Meanwhile, when the radio signal is not sensed in the corresponding channel or a radio signal having a strength smaller than the CCA threshold is sensed, it is determined that the channel is idle.

When it is determined that the channel is idle, a terminal having data to be transmitted performs a backoff procedure after a defer period (e.g., arbitration interframe space (AIFS), PCF IFS (PIFS), or the like). The defer period means a minimum time when the terminal needs to wait after the channel is idle. The backoff procedure allows the terminal to further wait for a predetermined time after the defer period. For example, the terminal stands by while decreasing a slot time for slot times corresponding to a random number allocated to the terminal in the contention window (CW) during the channel is in an idle state, and a terminal that completely exhausts the slot time may attempt to access the corresponding channel.

When the terminal successfully accesses the channel, the terminal may transmit data through the channel. When the data is successfully transmitted, a CW size (CWS) is reset to an initial value (CWmin). On the contrary, when the data is unsuccessfully transmitted, the CWS increases twice. As a result, the terminal is allocated with a new random number within a range which is twice larger than a previous random number range to perform the backoff procedure in a next CW. In the wireless LAN, only an ACK is defined as receiving response information to the data transmission. Therefore, when the ACK is received with respect to the data transmission, the CWS is reset to the initial value and when feed-back information is not received with respect to the data transmission, the CWS increases twice.

As described above, since most communications in the unlicensed band in the related art operate based on the LBT, the LTE also considers the LBT in the LAA for coexistence with the conventional device. In detail, in the LTE, the channel access method on the unlicensed band may be divided into 4 following categories according to the presence/an application scheme of the LBT.

Category 1 (Cat-1): No LBT
  An LBT procedure by a Tx entity is not performed.
Category 2 (Cat-2): LBT without Random Backoff
  A time interval in which the channel needs to be sensed in an idle state before the Tx entity performs a transmission on the channel is decided. The random backoff is not performed. This may be referred to as a Type 2 channel access.
Category 3 (Cat-3): LBT with Random Backoff with a CW of Fixed Size
  LBT method that performs random backoff by using a CW of a fixed size. The Tx entity has a random number N in the CW and the CW size is defined by a minimum/maximum value of N. The CW size is fixed. The random number N is used to decide the time interval in which the channel needs to be sensed in an idle state before the Tx entity performs a transmission on the channel.
Category 4 (Cat-4): LBT with Random Backoff with a CW of Variable size
  LBT method that performs the random backoff by using a CW of a variable size. The Tx entity has the random number N in the CW and the CW size is defined by the minimum/maximum value of N. The Tx entity may change the CW size at the time of generating the random number N. The random number N is used to decide the time interval in which the channel needs to be sensed in an idle state before the Tx entity performs a transmission on the channel. This may be referred to as a Type 1 channel access.

Figure 12:
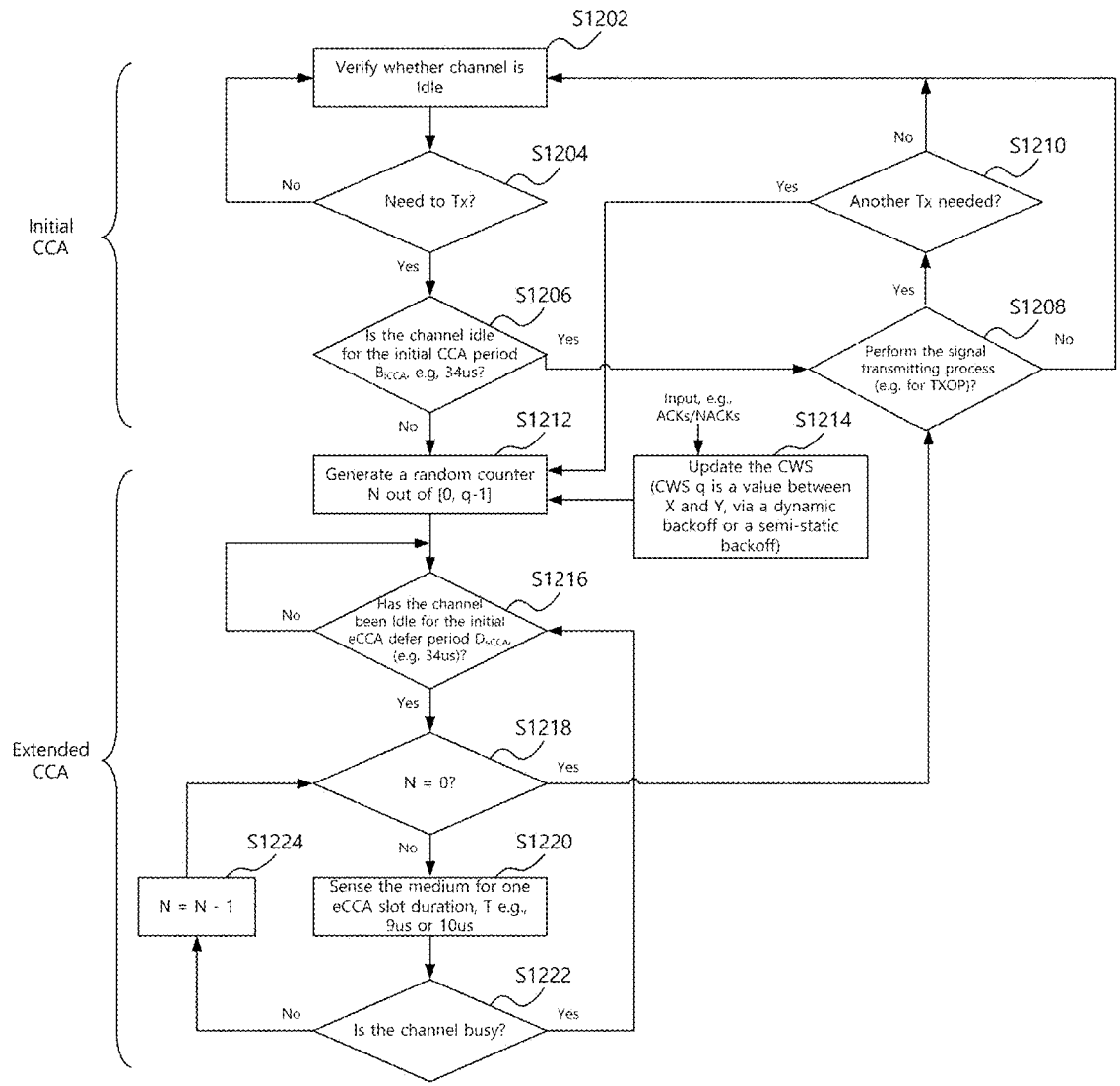
FIGS. 12 to 13 illustrate a Listen-Before-Talk (LBT) procedure for downlink transmission.
Figure 13:
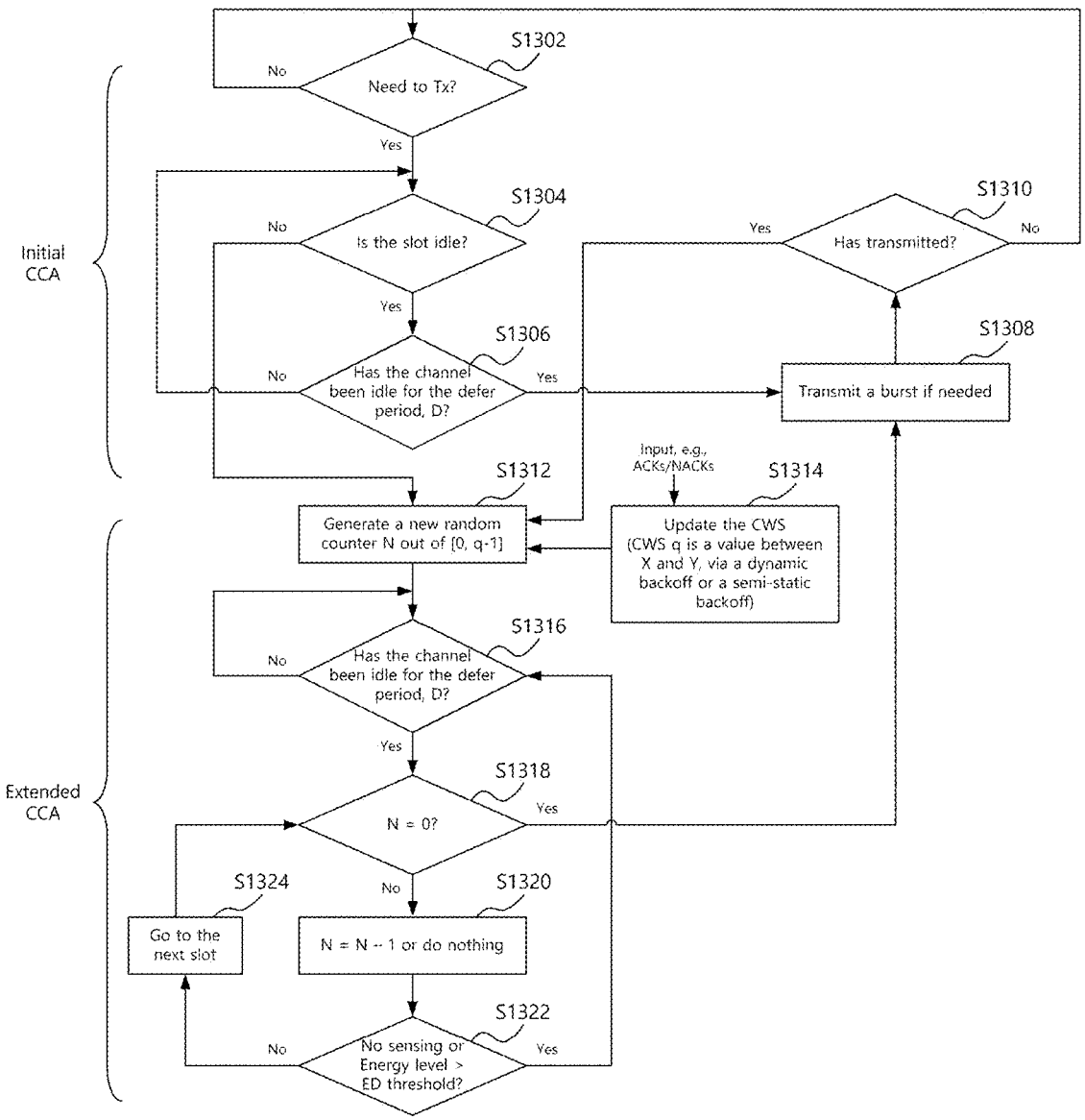

FIGS. 12 and 13 illustrate a downlink transmission process based on the category 4 LBT. The category 4 LBT may be used to guarantee fair channel access with Wi-Fi. Referring to FIGS. 12 and 13, the LBT process includes initial CCA (ICCA) and extended CCA (ECCA). In the ICCA, the random backoff is not performed and in the ECCA, the random backoff is performed by using the CW of the variable size. The ICCA is applied to the case in which the channel is idle when signal transmission is required and the ECCA is applied to the case in which the channel is busy when the downlink transmission is performed just before. Although the following description is based on the DL transmission, it is also applicable to the UL transmission. In the case of UL transmission, the base station is replaced with a user equipment in the following description.

Referring to FIG. 12, downlink transmitting process based on the category 4 LBT, the Type 1 channel access may be performed as follows.

Initial CCA

S1202: The base station verifies that the channel is idle.

S1204: The base station verifies whether the signal transmission is required. When the signal transmission is not required, the process returns to S1202 and when the signal transmission is required, the process proceeds to S1206.

S1206: The base station verifies whether the channel is idle for an ICCA defer period ($B_{CCA}$). The ICCA defer period is configurable. As an implementation example, the ICCA defer period may be constituted by an interval of 16 µs and n consecutive CCA slots. Herein, n may be a positive integer and one CCA slot interval may be 9 µs. The number of CCA slots may be configured differently according to a QoS class. The ICCA defer period may be set to an appropriate value by considering a defer period (e.g., DIFS or AIFS) of Wi-Fi. For example, the ICCA defer period may be 34 us. When the channel is idle for the ICCA defer period, the base station may perform the signal transmitting process (S1208). When it is determined that the channel is busy during the ICCA defer period, the process proceeds to S1212 (ECCA).

S1208: The base station may perform the signal transmitting process. When the signal transmission is not performed, the process proceeds to S1202 (ICCA) and when the signal transmission is performed, the process proceeds to S1210. Even in the case where a backoff counter N reaches 0 in S1218 and S1208 is performed, when the signal transmission is not performed, the process proceeds to S1202 (ICCA) and when the signal transmission is performed, the process proceeds to S1210.

S1210: When additional signal transmission is not required, the process proceeds to S1202 (ICCA) and when the additional signal transmission is required, the process proceeds to S1212 (ECCA).

Extended CCA

S1212: The base station generates the random number N in the CW. N is used as a counter during the backoff process and generated from [0, q−1]. The CW may be constituted by q ECCA slots and an ECCA slot size may be 9 µs or 10 µs. The CW size (CWS) may be defined as q and be variable in S1214. Thereafter, the base station proceeds to S1216.

S1214: The base station may update the CWS. The CWS q may be updated to a value between X and Y. The X and Y values are configurable parameters. CWS update/adjustment may be performed whenever N is generated (dynamic backoff) and semi-statically performed at a predetermined time interval (semi-static backoff). The CWS may be updated/adjusted based on exponential backoff or binary backoff. That is, the CWS may be updated/adjusted in the form of the square of 2 or the multiple of 2. In association with PDSCH transmission, the CWS may be updated/adjusted based on feed-back/report (e.g., HARQ ACK/NACK) of the user equipment or updated/adjusted based on base station sensing.

S1216: The base station verifies whether the channel is idle for an ECCA defer period (DeCCA). The ECCA defer period is configurable. As an implementation example, the ECCA defer period may be constituted by an interval of 16 µs and n consecutive CCA slots. Herein, n may be a positive integer and one CCA slot interval may be 9 µs. The number of CCA slots may be configured differently according to the QoS class. The ECCA defer period may be set to the appropriate value by considering the defer period (e.g., DIFS or AIFS) of Wi-Fi. For example, the ECCA defer period may be 34 us. When the channel is idle for the ECCA defer period, the base station proceeds to S1218. When it is determined that the channel is busy during the ECCA defer period, the base station repeats S1216.

S1218: The base station verifies whether N is 0. When N is 0, the base station may perform the signal transmitting process (S1208). In this case, (N=0), the base station may not immediately perform transmission and performs CCA check for at least one slot to continue the ECCA process. When N is not 0 (that is, N>0), the process proceeds to S1220.

S1220: The base station senses the channel during one ECCA slot interval (T). The ECCA slot size may be 9 µs or 10 µs and an actual sensing time may be at least 4 µs.

S1222: When it is determined that the channel is idle, the process proceeds to S1224. When it is determined that the channel is busy, the process returns to S1216. That is, one ECCA defer period is applied again after the channel is idle and N is not counted during the ECCA defer period.

S1224: N is decreased by 1 (ECCA countdown).

FIG. 13 is substantially the same as/similar to the transmitting process of FIG. 12 and is different from FIG. 12 according to an implementation scheme. Therefore, detailed matters may be described with reference to contents of FIG. 12.

S1302: The base station verifies whether the signal transmission is required. When the signal transmission is not required, S1302 is repeated and when the signal transmission is required, the process proceeds to S1304.

S1304: The base station verifies whether the slot is idle. When the slot is idle, the process proceeds to S1306 and when the slot is busy, the process proceeds to S1312 (ECCA). The slot may correspond to the CCA slot in FIG. 12.

S1306: The base station verifies whether the channel is idle for a defer period (D). D may correspond to the ICCA defer period in FIG. 12. When the channel is idle for the defer period, the base station may perform the signal transmitting process (S1308). When it is determined that the channel is busy during the defer period, the process proceeds to S1304.

S1308: The base station may perform the signal transmitting process if necessary.

S1310: When the signal transmission is not performed, the process proceeds to S1302 (ICCA) and when the signal transmission is performed, the process proceeds to S1312 (ECCA). Even in the case where the backoff counter N reaches 0 in S1318 and S1308 is performed, when the signal transmission is not performed, the process proceeds to S1302 (ICCA) and when the signal transmission is performed, the process proceeds to S1312 (ECCA).

Extended CCA

S1312: The base station generates the random number N in the CW. N is used as the counter during the backoff process and generated from [0, q−1]. The CW size (CWS) may be defined as q and be variable in S1314. Thereafter, the base station proceeds to S1316.

S1314: The base station may update the CWS. The CWS q may be updated to the value between X and Y. The X and Y values are configurable parameters. CWS update/adjustment may be performed whenever N is generated (dynamic backoff) and semi-statically performed at a predetermined time interval (semi-static backoff). The CWS may be updated/adjusted based on exponential backoff or binary backoff. That is, the CWS may be updated/adjusted in the form of the square of 2 or the multiple of 2. In association with PDSCH transmission, the CWS may be updated/adjusted based on feed-back/report (e.g., HARQ ACK/NACK) of the user equipment or updated/adjusted based on base station sensing.

S1316: The base station verifies whether the channel is idle for the defer period (D). D may correspond to the ECCA defer period in FIG. 12. D in S1306 and D in S1316 may be the same as each other. When the channel is idle for the defer period, the base station proceeds to S1318. When it is determined that the channel is busy during the defer period, the base station repeats S1316.

S1318: The base station verifies whether N is 0. When N is 0, the base station may perform the signal transmitting process (S1308). In this case, (N=0), the base station may not immediately perform transmission and performs CCA check during at least one slot to continue the ECCA process. When N is not 0 (that is, N>0), the process proceeds to S1320.

S1320: The base station selects one of an operation of decreasing N by 1 (ECCA count-down) and an operation of not decreasing N (self-defer). The self-defer operation may be performed according to implementation/selection of the base station and the base station does not perform sensing for energy detection and not perform even ECCA countdown in the self-defer.

S1322: The base station may select one of the operation not performing sensing for energy detection and the energy detecting operation. When the sensing for the energy detection is not performed, the process proceeds to S1324. When the energy detecting operation is performed, if an energy level is equal to or lower than an energy detection threshold (that is, idle), the process proceeds to S1324. If the energy level is higher than the energy detection threshold (that is, busy), the process returns to S1316. That is, one defer period is applied again after the channel is idle and N is not counted during the defer period.

S1324: The process proceeds to S1318.

CWS Adjustment for DL Transmission

FIG. 14 illustrates an example in which a base station performs downlink transmission in an unlicensed band. The base station may aggregate cells (for convenience, LTE-L cell) of one or more licensed bands and cells (for convenience, LTE-U cell, LAA cell) of one or more unlicensed bands. In FIG. 14, a case in which one LTE-L cell and one LTE-U cell are aggregated for communication with the user equipment is assumed. The LTE-L cell may be the PCell and the LTE-U cell may be the SCell. In the LTE-L cell, the base station may exclusively use the frequency resource and perform an operation depending on LTE in the related art. Therefore, all of the radio frames may be constituted by regular subframes (rSF) having a length of 1 ms (see FIG. 2) and the DL transmission (e.g., PDCCH and PDSCH) may be performed every subframe (see FIG. 1). Meanwhile, in the LTE-U cell, the downlink transmission is performed based on the LBT for coexistence with the conventional device (e.g., Wi-Fi device). Further, a specific frequency band needs to be allocated or reserved for a specific time in order to effectively implement the LTE-U technology/service. Therefore, in the LTE-U cell, the DL transmission may be performed through a set of one or more consecutive subframes (DL transmission burst) after the LBT. The downlink transmission burst may start as the regular subframe (rSF) or a partial subframe (pSF) according to an LBT situation. pSF may be a part of the subframe and may include a second slot of the subframe. Further, the downlink transmission burst may end as rSF or pSF.

Hereinafter, a method for adaptively adjusting a CWS in case of channel access in the unlicensed band is proposed. The CWS may be adjusted based on User Equipment (UE) feedback, and the user equipment feedback used for CWS adjustment may include a HARQ-ACK response, and CQI/PMI/RI. The present invention proposes a method for adaptively adjusting the CWS based on the HARQ-ACK response. The HARQ-ACK response includes ACK, NACK, and DTX.

For reference, as described with reference to FIG. 11, the CWS is also adjusted based on ACK in Wi-Fi. When ACK is fed back, the CWS is reset to the minimum value (CWmin), and if ACK is not fed back, the CWS is increased. However, while Wi-Fi is a peer-to-peer system, a cellular system (e.g., LTE) is a multiple access system so that applying the Wi-Fi method as it is inefficient, and there is a need for a CWS adjustment method considering multiple connections.

First, the following terms are defined for the description of the present invention.

Set of HARQ-ACK feedback values (HARQ-ACK feedback set): It represents the HARQ-ACK feedback value(s) used for CWS update/adjustment. The HARQ-ACK feedback set corresponds to the available HARQ-ACK feedback values decoded at the time the CWS is determined. The HARQ-ACK feedback set includes HARQ-ACK feedback value(s) for one or more DL (Channel) transmissions (e.g., PDSCH) in the unlicensed band (e.g., LTE-U cell). The HARQ-ACK feedback set may include HARQ-ACK feedback value(s) for DL (Channel) transmission (e.g., PDSCH), e.g., a plurality of HARQ-ACK feedback values fed back from a plurality of UEs. The HARQ-ACK feedback value indicates reception response information on a transport block or a PDSCH and may include ACK, NACK, DTX, and NACK/DTX. Depending on the context, the HARQ-ACK feedback value may be mixed with the HARQ-ACK value/bit/response/information and the like.

Reference window: a time interval during which a DL transmission (e.g., PDSCH) corresponding to the HARQ-ACK feedback set is performed in the unlicensed band (e.g., LTE-U cell). Reference window may be defined in an SF unit. This will be described/suggested in detail later.

According to a HARQ-ACK feedback scheme or a PUCCH format in the LTE, a HARQ-ACK value may indicate only ACK and NACK, or may further indicate DTX. For example, when the PUCCH format 3 is configured as the HARQ-ACK feedback method, the HARQ-ACK value may indicate only ACK and NACK. On the other hand, when the channel selection scheme using the PUCCH format 1b is configured as the HARQ-ACK feedback method, the HARQ-ACK value may indicate ACK, NACK, DTX, and NACK/DTX.

Therefore, in the present invention, with the HARQ-ACK response, description is divided into a case where only ACK and NACK are considered and a case where DTX is further considered. The basic matters are common to each other.

Case 1: When Considering Only ACK and NACK as the HARQ-ACK Response

The following methods may be considered as a method for adjusting a CWS based on a HARQ-ACK feedback set. Option 1 to 3 and Alt 1 to 3 may be combined.

Option 1: When all HARQ-ACK feedback value(s) for a reference window are determined as a NACK, a CWS may be increased, otherwise the CWS may be reset to its minimum value (i.e., if there is at least one ACK).

Option 2: When at least one of the HARQ-ACK feedback value(s) for the reference window is determined as the NACK, the CWS may be increased, otherwise the CWS may be reset to the minimum value (i.e., if all are ACK).

Option 3: When the NACK of the HARQ-ACK feedback value(s) for the reference window is determined as at least Z % (0<Z<100), the CWS may be increased, otherwise the CWS may be reset to the minimum value. In one embodiment, Z may be 50 or 80. That is, if the ratio of the NACK (hereinafter Y %) in the HARQ-ACK feedback is equal to or greater than a reference value, the CWS may be increased, and if the ratio of the NACK is less than the reference value, the CWS may be reset to the minimum value. The reference value may be 0<reference value <1 or 0%<reference value<100% depending on the unit. Equivalently, if the ACK of the HARQ-ACK feedback value(s) for the reference window is determined to be less than P % (P=100−Z), the CWS is increased, otherwise the CWS may be reset to the minimum value. In one embodiment, P may be 20 or 50.

When a CWS is increased, the CWS may be doubled or increased exponentially between the minimum value (CW_min) and the maximum value (CW_max) or increased to the maximum value.

In addition, if at least one of the following is satisfied, the CWS may be reset to CW_min.

Alt 1: When the maximum CWS (CW_max) is used during K consecutive ECCAs. Here, K may be fixed to 1, 2, or 3, or may be selected within {1, . . . , 8} by the base station.

Alt 2: There is no DL transmission by the base station for at least any T interval(s). Any T may be a pre-determined value or a configurable value.

Alt 3: When the maximum HARQ retransmission is used in K consecutive ECCAs. Here, K may be fixed to 1, 2, or 3, or may be selected within {1, . . . , 8} by the base station.

The reference window may be (1) a single subframe, (2) multi (e.g., 2) subframes, or (3) all subframes for which HARQ-ACK feedback is available in the last DL transmission burst (i.e., the most recent DL transmission burst on the unlicensed band)

Here, (1) a single subframe may be the first or last subframe of the last DL transmission burst. A single subframe may be a regular subframe (rSF) or a partial subframe (pSF). However, in the partial subframe, the number of user equipments that the base station can serve is limited. Thus, if the starting or the last subframe of the last DL transmission burst is a partial subframe, the base station configures an HARQ-ACK feedback set based on the HARQ-ACK feedback value of the user equipment(s) corresponding to the regular subframe, so that the base station may efficiently adjust the CWS according to channel collision or interference. For example, if the starting or the last subframe of the last DL transmission burst is a partial subframe, the reference window may be a multi-subframe.

Here, (2) the multi-subframe may be the starting multi-subframe or the last multi-subframe in the last DL transmission burst. For example, if the number of multi-subframes is 2, the multi-subframe may be the first two subframes of the last DL transmission burst, that is, a (first subframe) partial subframe or a regular subframe and a (second subframe) regular subframe. In addition, the multi-subframe may be the last two subframes, that is, a (first subframe) regular subframe and a (second subframe) partial subframe or a regular subframe.

Case 2-1: When DTX is Further Considered as the HARQ-ACK Response

Hereinafter, a method for adjusting a CWS in consideration of not only ACK and NACK but also DTX as HARQ-ACK responses transmitted from a user equipment will be described. During self-carrier scheduling, that is, in the case where the DL transmission (e.g., PDSCH) on a carrier in the unlicensed band is performed through a control channel (e.g., (E)PDCCH) transmitted on the same carrier in the unlicensed band, the HARQ feedback that the user equipment may transmit for DL transmission in the unlicensed band may include ACK, NACK, DTX, and NACK/DTX. Here, since DTX is a case where DL transmission is failed by a hidden node or the like in an unlicensed band carrier, the DTX may be used for adjusting the CWS with NACK. Additionally, the DTX herein is one of the methods which the user equipment informs the base station that the user equipment fails to decode a control channel even though the base station has transmitted the control channel (e.g., (E)PDCCH) including scheduling information to the user equipment. The DTX may be determined only by the HARQ-ACK feedback value, or may be determined based on the HARQ-ACK feedback value and the actual scheduling situation. For convenience, a self-carrier scheduling operation is assumed.

The following methods may be considered as a method for adjusting the CWS based on the HARQ-ACK feedback set. Methods A-1 to A-4 and Methods B-1 to B-3 may be combined.

Method A-1: When all HARQ-ACK feedback value(s) for the reference window is NACK, or when all the HARQ-ACK feedback value(s) are determined to be DTX, or when all the HARQ-ACK feedback value(s) are NACK/DTX, a CWS may be increased, otherwise the CWS may be reset to the minimum value (i.e., if there is at least one ACK).

Method A-2: When at least one of the HARQ-ACK feedback value(s) for the reference window is determined as NACK, DTX or NACK/DTX, the CWS may be increased, otherwise the CWS may be reset to the minimum value (i.e., if all are ACK).

Method A-3: When the NACK or DTX of the HARQ-ACK feedback value(s) for the reference window is determined as at least Z % (0<Z<100), the CWS may be increased, otherwise the CWS may be reset to the minimum value. In one embodiment, Z may be 50 or 80. Here, the representing that NACK or DTX is at least Z % represents that any of NACK and DTX is calculated, that is, the sum of NACK, DTX and NACK/DTX is at least Z %. That is, NACK/DTX and DTX may be handled the same as NACK. Accordingly, if the ratio of the NACK or DTX (hereinafter Y %) in the HARQ-ACK feedback is equal to or greater than a reference value, the CWS may be increased. And if the ratio of NACK or DTX is less than the reference value, the CWS may be reset to the minimum value. The reference value may be 0<reference value <1 or 0%<reference value <100% depending on the unit. Equivalently, if the ACK of the HARQ-ACK feedback value for the reference window is determined to be less than P % (P=100-Z), the CWS may be increased, otherwise the CWS may be reset to the minimum value. In one embodiment, P may be 20 or 50.

Method A-4: If all HARQ-ACK feedback value(s) for the reference window are determined to be the DTX, the base station assumes that all control channel PDCCH/EPDCCHs have not been received by the user equipment or decoding of the PDCCH/EPDCCH has failed due to interference from another node, thereby increasing the CWS, and otherwise (i.e., all the HARQ-ACK feedback values are not determined as the DTX), the CWS may be adjusted according to methods A-1 to A-3.

When a CWS is increased, the CWS may be doubled or increased exponentially between the minimum value (CW_min) and the maximum value (CW_max) or increased to the maximum value.

In addition, if at least one of the following is satisfied, the CWS may be reset to CW_min.

Method B-1: When maximum CWS (CW_max) is used during K consecutive ECCAs. Here, K may be fixed to 1, 2, or 3, or may be selected within {1, . . . , 8} by the base station.

Method B-2: There is no DL transmission by the base station for at least an arbitrary T interval(s). The arbitrary T may be a pre-determined value or a configurable value.

Method B-3: When the maximum HARQ retransmission is used in K consecutive ECCAs. Here, K may be fixed to 1, 2, or 3, or may be selected within {1, . . . , 8} by the base station.

The reference window may be (1) a single subframe, (2) multi (e.g., 2) subframes, or (3) all subframes for which HARQ-ACK feedback is available in the last DL transmission burst (i.e., the most recent DL transmission burst on the unlicensed band) Details may refer to Case 1.

Case 2-2: When DTX is Further Considered as the HARQ-ACK Response

Hereinafter, another example of a method for adjusting a CWS in consideration of not only ACK and NACK but also DTX as HARQ-ACK responses transmitted from the user equipment will be described. When self-carrier scheduling, that is, in the case where the DL transmission (e.g., PDSCH) on a carrier in the unlicensed band is performed through a control channel (e.g., (E)PDCCH) transmitted on the same carrier in the unlicensed band, the HARQ feedback that the user equipment may transmit for DL transmission in the unlicensed band may include ACK, NACK, DTX, and NACK/DTX. Here, since DTX is a case where DL transmission is failed by a hidden node or the like in an unlicensed band carrier, the DTX may be used for adjusting the CWS with NACK. Additionally, the DTX herein is one of the methods in which the user equipment informs the base station that the user equipment fails to decode a control channel even though the base station has transmitted the control channel (e.g., (E)PDCCH) including scheduling information to the user equipment. The DTX may be determined only by the HARQ-ACK feedback value, or may be determined based on the HARQ-ACK feedback value and the actual scheduling situation. For convenience, a self-carrier scheduling operation is assumed.

The following methods may be considered as a method for adjusting the CWS based on the HARQ-ACK feedback set. Methods C-1 to C-2 and Methods D-1 to D-3 may be combined.

Method C-1: When there is a DTX among the HARQ-ACK feedback value(s) for the reference window, method A-3 of the present invention, i.e., Y % may be calculated by putting a weight on the DTX based on NACK or DTX as the HARQ-ACK feedback. If the base station can distinguish between NACK and DTX, in a case where the user equipment feeds back the DTX even though the base station have transmitted a PDSCH associated with a control channel PDCCH/EPDCCH, the base station may recognize that the user equipment has not received the control channel PDCCH/EPDCCH. In this case, the base station may recognize that interference or hidden nodes may have occurred in the corresponding channel. Therefore, when the DTX is received from the user equipment, in order to more actively solve problems caused by interference and hidden nodes on the channel, the base station may calculate Y % by weighting on the DTX. In addition, when NACK/DTX is included in the HARQ-ACK feedback value(s) of the reference window, the base station may apply the methods of the present invention by considering the NACK/DTX as a NACK. Unlike this, when the user equipment feeds back the NACK/DTX to the base station, it may be meaningful that the user equipment informs the base station that the HARQ-ACK feedback value may be DTX. Therefore, when the NACK/DTX is fed back from the user equipment, the base station may calculate Y % by weighting on the NACK/DTX in the HARQ-ACK feedback set. The values considered for HARQ-ACK feedback may be ACK, NACK, NACK/DTX, and DTX. As described in the present invention, Y % for adjusting the CWS may be calculated by putting a weight differently on the NACK, the NACK/DTX, and the DTX except the ACK.

Equation 1 represents one implementation of Method C-1. The method may similarly be represented by other equations and is not limited to the following equations.

$$Y\% = \{W\_A * Pr(A) + W\_B * Pr(B) + W\_C * Pr(C)\} * 100, \quad \text{[Equation 1]}$$

Here, Pr(A) represents the probability of NACK occurrence in the reference window, i.e., Pr(A) is equal to that the number of NACKs is divided by the total number of the entire HARQ-ACK feedbacks available in the reference window. Pr(B) represents the probability of NACK/DTX occurrence in the reference window, i.e., Pr(B) equal to that the number of NACK/DTX is divided by the total number of the entire HARQ-ACK feedbacks available in the reference window. Pr(C) represents the probability of DTX occurrence in the reference window, i.e., Pr(C) is equal to that the number of DTXs is divided by the total number of the entire HARQ-ACK feedbacks available in the reference window. W_A denotes a weight value for the NACK, W_B denotes a weight value for the NACK/DTX, and W_C denotes a weight value for the DTX.

First, W_A=W_B=W_C is a case where NACK, NACK/DTX and DTX in the HARQ-ACK feedback set are calculated with the same weight when calculating Y %. W_A<W_B=W_C is a case where NACK/DTX and DTX are calculated with a larger weight than NACK and calculated with the same weight between NACK/DTX and DTX in the HARQ-ACK feedback set when calculating Y %. W_A=W_B<W_C is a case where NACK and NACK/DTX are calculated with the same weight and the DTX is calculated with a larger weight in the HARQ-ACK feedback set during calculating Y %. W_A<W_B<W_C is a case where NACK/DTX and DTX are calculated with a larger weight than NACK and the DTX is calculated with a larger weight than NACK/DTX in the HARQ-ACK feedback set when calculating Y %.

If the calculated Y % is at least Z %, a CWS may be increased, otherwise the CWS may be reset to the minimum value. Here, Z % is a reference value that may be set by the base station (e.g., 0<Z<100). In one embodiment, Z may be 50 or 80.

Method C-2: If there is at least one DTX feedback for the reference window, a CWS may be increased. This method overrides Option-3 or Method A-3. Otherwise (i.e. there is no DTX), the CWS may be adjusted according to Option-3 or Method A-3. Since the DTX may indicate that the user equipment is not receiving the control channel PDCCH/EPDCCH in the unlicensed band due to interference or hidden nodes on the same channel, the base station may increase the CWS as a method for solving the problem.

When a CWS is increased, CWS may be doubled or increased exponentially between the minimum value (CW_min) and the maximum value (CW_max) or increased to the maximum value.

In addition, if at least one of the following is satisfied, the CWS may be reset to CW_min.

Method D-1: When the maximum CWS (CW_max) is used for K consecutive ECCAs, then K may be fixed to one of 1, 2, or 3, or may be selected within {1, . . . , 8} by the base station.

Method D-2: There is no DL transmission by the base station for at least any T interval(s). Any T may be a pre-determined value or a configurable value.

Method D-3: If the maximum HARQ retransmission is used in K consecutive ECCAs, then K may be fixed to one of 1, 2, or 3, or may be selected within {1, . . . , 8} by the base station.

The reference window may be (1) a single subframe, (2) multi (e.g., 2) subframes, or (3) all subframes for which HARQ-ACK feedback is available in the last DL transmission burst (i.e., the most recent DL transmission burst on the unlicensed band) Details may refer to Case 1.

Cases 2-1 and 2-2 may be applied differently as follows depending on whether the scheduling cell is an LTE-L cell or an LTE-U cell at the time of cross-carrier scheduling.

If the DL transmissions on the unlicensed carrier are cross-carrier scheduled from other unlicensed bands (i.e., unlicensed carrier, unlicensed band cell, LTE-U cell), a CWS may be adjusted using the same method as self-carrier scheduling. Since the control channel (e.g., PDCCH/EPDDCH) is transmitted on the unlicensed carrier, this is because the determination of the base station by the HARQ-ACK response (ACK, NACK, DTX, NACK/DTX) may be performed in the same manner as in the self-carrier scheduling.

If the DL transmissions on the unlicensed carrier are cross-carrier scheduled from a licensed band (i.e., the licensed carrier, the licensed band, the LTE-L cell), PDCCH/EPDCCH, which is a control channel for scheduling the DL transmission, is transmitted in the licensed band. In this case, since the DTX feedback is used to determine the decoding state of the user equipment with respect to the control channel transmitted on the licensed band, it is not helpful to adaptively adjust the CWS for channel access in the unlicensed band. Thus, when cross-carrier scheduling is from the licensed band, the CWS adjustment method considering DTX is disabled, and it is possible to adjust the CWS considering only ACK and NACK as HARQ-ACK responses for DL transmission (e.g., PDSCH) on the unlicensed band, or considering ACK, NACK, and NACK/DTX. For example, DTX as an HARQ-ARQ response scheduled by cross-carrier scheduling from a licensed band may be excluded in the procedure of applying Cases 1, 2-1, and 2-2. Specifically, DTX as a HARQ-ARQ response by cross-carrier scheduling from the licensed band may be excluded for calculating Z % in Option 3 and Method A-3. That is, Z % may be calculated by extracting only ACK and NACK in the HARQ-ACK feedback set, or by extracting only ACK, NACK, and NACK/DTX in the HARQ-ACK feedback set. In addition, the following two methods are available for the base station to calculate Z % excluding DTX in Option 3 and Method A-3.

First, DTX indicating failure in receiving control channel in the user equipment for control channel transmission from the licensed cell is not included in the entire HARQ-ACK value(s) and is not included in the ratio of NACK for determining Z %.

Second, DTX indicating failure in receiving control channel in the user equipment for control channel transmission from the licensed cell is included in the entire HARQ-ACK value(s) and is not included in the ratio of NACK for determining Z %.

As before, if the DL transmissions transmitted on the unlicensed carrier are cross-carrier scheduled from licensed bands (i.e., cells with licensed bands, cells with licensed bands, LTE-L cells), the DTX as a HARQ-ACK response by cross-carrier scheduling from the licensed band may be excluded procedure applying Cases 1, 2-1, and 2-2. Specifically, DTX as a HARQ-ACK response by cross-carrier scheduling from the licensed band may be excluded for calculating Z % in option 3 and method A-3. In addition, the following two methods are available for the base station to calculate Z % excluding DTX in Option 3 and Method A-3.

First, DTX indicating failure in receiving control channel in the user equipment for control channel transmission from the licensed cell is not included in the entire HARQ-ACK value(s) and is not included in the ratio of NACK, for determining Z %.

Second, DTX indicating failure in receiving control channel in the user equipment for control channel transmission from the licensed cell is included in the entire HARQ-ACK value(s) and is not included in the ratio of NACK, for determining Z %.

However, when HARQ-ACK feedback is performed using a channel selection scheme based on the PUCCH format 1b (PUCCH format 1b with channel selection), even if the user equipment performs no transmission, the base station may determine the HARQ-ACK response according to the no transmission. Specifically, the base station may determine the HARQ-ACK response corresponding to the no transmission by the HARQ-ACK response values of Tables 3 to 5 defined for A=2 to 4. For example, when A=2, if the user equipment performs no transmission, from Table 3, the base station may determine that the HARQ-ACK response corresponding to the no transmission is [HARQ-ACK (0), HARQ-ACK (1)]=[DTX, NACK/DTX].

The DL transmission transmitted on an unlicensed carrier is cross-carrier scheduled from a licensed band (i.e., an licensed carrier, a cell in the licensed band, an LTE-L cell) and the user equipment is configured to transmit a HARQ-ACK response using a channel selection scheme based on the PUCCH format 1b. In this case, in (i) the case of no transmission from the UE and (ii) the case where the base station fails to detect the HARQ-ACK response, i.e., in the cases other than (i) and (ii), as the HARQ-ACK response, the NACK/DTX state and the any state may be regarded as a NACK for calculating Z % for adjusting the CWS. That is, if there is an HARQ-ACK response explicitly, the NACK/DTX state and the any state may be regarded as a NACK for calculating Z %. On the other hand, in the case where (i) there is no transmission from the user equipment or (ii) the base station fails to detect the HARQ-ACK response, the HARQ-ACK response(s) determined by the base station as a DTX may be excluded for calculating Z %. Here, as a method for configuring a DTX to be excluded for calculating Z %, the following two methods are possible.

First, since the corresponding DTX may not reflect the channel state of the unlicensed cell, the DTX is not included in the entire HARQ-ACK value(s) and is not included in the ratio of NACK, for determining Z %.

Second, the corresponding DTX is included in the entire HARQ-ACK value(s), and not included in the ratio of NACK.

Unlike this, in the case (i) of the no transmission from the user equipment or (ii) when the base station fails to detect the HARQ response, the HARQ-ACK response(s) determined by the base station as a NACK/DTX may be considered as a NACK for calculating Z %. This may be a method for allowing a CWS adjustment at the base station as assuming the possibility of a NACK for DL transmission on the unlicensed carrier. Unlike this, in the case where (i) the user equipment indicates a NACK/DTX with the no transmission or (ii) the base station does not detect the HARQ-ACK response, the HARQ-ACK response(s) determined by the base station as a NACK/DTX are regarded as a DTX, not a NACK, for calculating Z % in order not to include the NACK/DTX in Z %. Accordingly, the NACK/DTX state may be ignored. Specifically, since it is impossible to determine whether (i) and (ii) are due to an error in the PDCCH/EPDCCH transmission in the licensed carrier or resulted from the case that a PUCCH detection is not performed by the base station because the channel state of the channel of the PUCCH through which the user equipment transmits a NACK for a PDSCH transmitted through the unlicensed carrier through the licensed carrier is not in a good condition. Accordingly, the corresponding NACK/DTX state may be regarded as a DTX for calculating Z %, so that this may not regard NACK/DTX as the NACK for calculating Z % of NACK. That is, the NACK/DTX state may be ignored so as not to be included in Z %. Here, the following two methods are available for the base station to determine Z % ignoring the NACK/DTX, without including the NACK/DTX.

First, since the DTX, indicating failure in receiving control channel in the user equipment for control channel transmission from the licensed cell, may not reflect the channel state of the unlicensed cell, it is possible to configure the NACK/DTX not to be included in the entire HARQ-ACK value(s), and not to be included in the ratio of NACK, for determining Z %.

Second, since the DTX, indicating failure in receiving control channel in the user equipment for control channel transmission from the licensed cell, may not reflect the channel status of the unlicensed cell, it is possible to configure the NACK/DTX to be included in the entire HARQ-ACK value(s), and not to be included in the ratio of NACK.

Meanwhile, when a part of the HARQ-ACKs is determined to be DTX and another part of the HARQ-ACKs is determined to be NACK/DTX in the process of detecting a HARQ-ACK for the no transmission, the DTX as a part of the HARQ-ACKs may be reflected in calculation of the Z % identically to the NACK/DTX. For example, if the NACK/DTX is regarded as a NACK to be reflected in Z %, the DTX may also be determined as a NACK to be reflected in Z % of the NACK. On the other hand, if the NACK/DTX is not reflected in Z %, the DTX may be regarded as the DTX not to be reflected in Z %. Here, the following two methods are available for a method for setting the base station not to reflect the DTX for determining Z %.

First, since a DTX, indicating failure in receiving control channel in the user equipment for control channel transmission from the licensed cell, does not reflect a channel state of an unlicensed cell, the DTX is not included in the entire HARQ-ACK value(s) and is not included in the ratio of NACK, for determining Z %.

Second, the DTX, indicating failure in receiving control channel in the user equipment for control channel transmission from the licensed cell, is included in the entire HARQ-ACK value(s) and is not included in the ratio of NACK.

Figure 15:
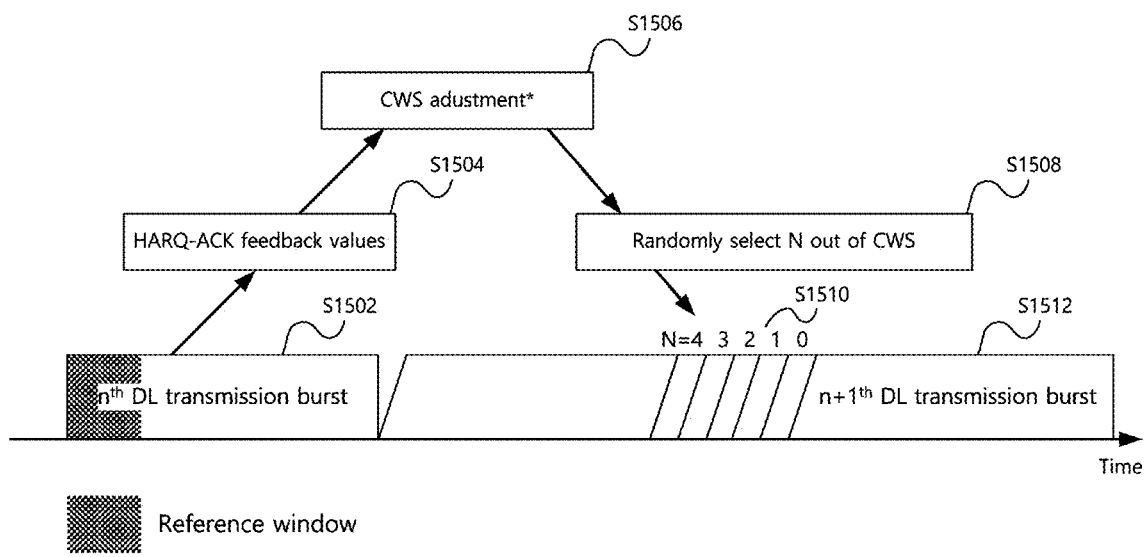

FIGS. 15 to 17 illustrate a signal transmission process according to an embodiment of the present invention. FIG. 15 illustrates a method for adjusting a CWS according to the Case 1, and FIGS. 16 to 17 illustrate a reference window for generating a HARQ-ACK feedback set. Cases 2-1 and 2-2 may be similarly performed.

Referring to FIG. 15, after a base station transmits an n-th DL transmission burst in an unlicensed band (e.g., LTE-U cell) (S1502), if additional DL transmissions are required, the base station may transmit the (n+1)-th DL transmission burst based on an ECCA (S1512). Specifically, if the channel of the unlicensed band is idle during an ECCA defer period, the base station further performs a random backoff in the CW (S1510). The base station generates a random number N within the CW (e.g., [0, q−1]) (S1508) and performs backoff by a slot corresponding to the random number N (S1510). In the present invention, the CWS is adaptively adjusted based on the HARQ-ACK feedback values from the user equipments (S1506). The HARQ-ACK feedback values used for adjusting the CWS include HARQ-ACK feedback values for the most recent DL transmission burst (n-th DL transmission burst). The HARQ-ACK feedback values used for adjusting the CWS include a HARQ-ACK feedback value for DL transmission on the reference window within the DL transmission burst (S1504).

If the Case 1 is applied, the CWS may be adjusted as follows based on the HARQ-ACK feedback values. This may be similarly applied to Case 2-1 and Case 2-2.

Option 1: When all HARQ-ACK feedback value(s) for a reference window are a NACK, a CWS may be increased, otherwise the CWS may be reset to its minimum value.

Option 2: When at least one of the HARQ-ACK feedback value(s) for the reference window is the NACK, the CWS may be increased, otherwise the CWS may be reset to the minimum value.

Option 3: When the NACK among the HARQ-ACK feedback value(s) for the reference window is at least Z % (0<Z<100), the CWS may be increased, otherwise the CWS may be reset to the minimum value.

When a CWS is increased, the CWS may be doubled or increased exponentially between the minimum value (CW_min) and the maximum value (CW_max) or increased to the maximum value.

Referring to FIGS. 16-17, a reference window may consist of the starting subframe(s) (FIG. 16) and the last subframe(s) (FIG. 17) of the most recent DL transmission burst (n-th DL transmission burst). When the reference window is located at the starting of the DL transmission burst, the reference window may be composed of (i) one regular subframe, (ii) one partial subframe+one regular subframe. In addition, when the reference window is located at the end of the DL transmission burst, the reference window may be composed of (i) one regular subframe, (ii) one regular subframe+one partial subframe.

The method assumes that a HARQ-ACK response transmitted from the user equipment is transmitted through a PUCCH or a PUSCH on a PCell of licensed band.

Next, when the user equipment is configured to transmit ACK, NACK, NACK/DTX, and DTX values as a HARQ-ACK response for PDSCH(s) transmitted through DL on an unlicensed carrier through UL on the unlicensed carrier, a method for performing CW size update/adjustment for transmission in the base station will be described.

A case where the HARQ-ACK for the PDSCH(s) transmitted through the DL on LAA SCell is transmitted only through the UL on the unlicensed carrier, the LAA SCell will be described.

In a method 100, in a case where HARQ-ACK for PDSCH(s) transmitted through a DL on an unlicensed carrier, an LAA SCell, is transmitted only through a UL on an unlicensed carrier, LAA SCell, if at least one ACK is fed back as the HARQ-ACK(s) transmitted through the UL on the LAA SCell, the base station may reset the CW size for DL PDSCH(s) transmissions on the LAA SCell, and otherwise may increase the CW size (e.g., double). That is, when the base station successfully decodes a PUCCH or a PUSCH including the HARQ-ACK transmitted from the user equipment on the LAA SCell and detects at least one ACK from the user equipment for the PDSCH(s) transmitted from the base station, the base station may reset the CW size. In this case, the base station determines that the channel for the medium between the base station and the user equipment is idle to reset every CWp (p={1, 2, 3, 4}) that may be differently set according to a channel access priority class to CWmin. And when the user equipment transmits feedback with NACK since the user equipment fails to decode the PDSCH(s) and the base station detects or determines NACK, NACK/DTX, or DTX, the base station may double the CW. Alternatively, even in the case of detecting NACK, NACK/DTX, or DTX at the base station, which may occur due to the transmission of the PUCCH or the PUSCH including the HARQ-ACK transmitted from the user equipment is transmitted on the unlicensed carrier, the base station may double the CW. In this case, the base station may determine that the channel for the medium between the base station and the user equipment is busy and double the CWp (p={1, 2, 3, 4}) that may be differently set according to the channel access priority class. Further, if the LBT using the CW_max value is repeatedly set to K times (e.g., K={1, . . . , 8}) after doubling the CW size, CWp may be set to the CW_min value. The K value may be designated to one value of {1, . . . , 8} by the base station.

When the number of unlicensed carriers increases, it may be impossible to transmit the HARQ-ACK value only through a UL on a specific single unlicensed carrier. In this case, the HARQ-ACK transmission may be performed through the UL in units of a group in which transmission of an HARQ-ACK response is possible and set by the RRC. Meanwhile, when there is not much DL PDSCH transmission on the unlicensed carrier, it is possible to transmit the HARQ-ACK response only through a UL on a single LAA SCell. The present invention may include both of these cases. When the HARQ-ACK transmission is performed through the UL of a group unit, an unlicensed carrier (e.g., an LAA SCell index) on which the transmission of the HARQ-ACK depending on channel availability based on a channel access within a group is possible may be configured to dynamically vary in units of subframes, or configured to a single semi-static unlicensed carrier (e.g., an LAA SCell). The base station receiving the feedback on the HARQ-ACK (s) based on the group may update/adjust a CWp and a group_index by managing the CWp and the group_index for the DL PDSCH to be transmitted to the user equipment based on the group. Based on the feedback of the HARQ-ACK of the DL PDSCH(s) on the LAA SCELL(s) configured as the group, CW size may be reset or doubled.

A case where HARQ-ACK feedbacks for PDSCH(s) transmitted on an unlicensed carrier, an LAA SCell are divided into HARQ-ACK feedbacks transmitted through a PUCCH or a PUSCH on licensed carriers and HARQ-ACK feedbacks transmitted through a PUCCH or a PUSCH on unlicensed carriers will be described.

In a method 110, in a case where the HARQ-ACK feedbacks for PDSCH(s) transmitted on an unlicensed carrier, an LAA SCELL, is divided into the HARQ-ACK feedbacks transmitted through the PUCCH or the PUSCH on the licensed carrier and the HARQ-ACK feedbacks transmitted through the PUCCH or the PUSCH on the unlicensed carrier, if the feedback determined as NACK is Z % or more, the CW size update/adjustment according to the HARQ-ACK feedback transmitted through the UL on the licensed carrier doubles the CW, otherwise reset the CW size based on the Z % of NACK (e.g., 80 or 50, which may be a natural number value set by the base station). When a HARQ-ACK feedback is transmitted on the licensed carrier among the HARQ-ACK feedbacks for PDSCHs transmitted on the LAA cell, a CW size for an LAA SCell transmitting the PDSCH corresponding to the HARQ-ACK transmitted on the licensed carrier may be updated/adjusted using Methods A-1, A-2, A-3, A-4, B-1, B-2, B-3, and a combination thereof. If the LBT using the CW_max value is repeatedly set to K times (e.g., K={1, . . . , 8}) after doubling the CW size, CWp may be set to the CW_min value. The K value may be designated to one value of {1, . . . , 8} by the base station.

The CW size update/adjustment according to the HARQ-ACK feedback transmitted through the UL on the unlicensed carrier limits to a case where the HARQ-ACK corresponding to the PDSCH(s) transmitted through the DL on the LAA SCell is transmitted only through the UL on the unlicensed carrier, the LAA SCell, and also limits to a corresponding group with the LAA SCell transmitting the PDSCH associated with the HARQ-ACK transmitted on the unlicensed carrier. The same method as in Method 100 can be applied so that it is possible to perform CW size update/adjustment for the PDSCH transmitted on the LAA SCell. If the LBT using the CW_max value is repeatedly set to K times (e.g., K={1, . . . , 8}) after doubling the CW size, CWp may be set to the CW_min value. The K value may be designated to one value of {1, . . . , 8} by the base station.

Unlike the method for updating/adjusting the CW size according to whether the cell transmitting the HARQ-ACK independently is the unlicensed cell (LAA SCell) or the licensed cell, by considering both the HARQ-ACK feedback on the licensed carrier and the HARQ-ACK feedback on the unlicensed carrier, a method for managing the CW size for the LBT of the DL PDSCH transmission on the unlicensed carrier, the LAA SCELL may also be considered. When conditions of methods 100 and 110 as a hybrid method of the method 100 and the method 110, that is, a case (Condition-110) where ACK detection as a feedback value transmitted through the UL on the unlicensed carrier is performed by the base station and a case (Condition-110) where the feedback that is regarded as NACK is not equal to or not more than Z %, are both satisfied, CW size may be reset, and when both are not satisfied, CW size may be doubled. Alternatively, since Condition-100 considers UL transmission on an unlicensed carrier, it is determined that the channel state of the unlicensed carrier may be better reflected so that CW size may be reset or doubled depending on whether Condition-100 is satisfied. Unlike this, Condition-110, which is designed to better reflect the channel state of all UEs, is considered to better reflect the channel state of unlicensed carriers in all UEs, so that a method for resetting or doubling the CW size according to whether Condition-110 is satisfied may be considered. If the LBT using the CW_max value is repeatedly set to K times (e.g., K={1, . . . , 8}) after doubling the CW size, CWp may be set to the CW_min value. The K value may be designated to one value of {1, . . . , 8} by the base station.

In the LTE system up to the existing Rel-13, if a simultaneous transmission of PUSCH and PUCCH is set in a user equipment, the simultaneous transmission of PUSCH and PUCCH may be performed in the same carrier or in different carriers. However, if the simultaneous transmission of PUSCH and PUCCH is not configured in the user equipment, in a case where the PUSCH transmission is not scheduled in the corresponding subframe, transmission of UCI such as HARQ-ACK and CSI is performed on the PUCCH, and in a case where the PUSCH transmission is scheduled in the corresponding subframe, the transmission of UCI such as the HARQ-ACK and the CSI to be transmitted through the PUCCH is piggybacked to the PUSCH. This applies equally to different carriers when carrier aggregation is performed.

In the present invention, in performing carrier aggregation, in cases where aggregated carriers are composed of different licensed carriers and unlicensed carriers, it is assumed that a group of cells on which transmission of a PUCCH is possible is composed of licensed carrier(s) and unlicensed carrier(s). In this case, if simultaneous transmission of PUSCH and PUCCH is configured in the user equipment, HARQ-ACK and CSI as user equipment feedback for DL transmissions transmitted on the licensed carrier(s) may be transmitted through the PUCCH on the licensed carrier(s), but the HARQ-ACK may not be transmitted through a scheduled PUSCH on the unlicensed carrier(s), and the CSI (periodic CSI or aperiodic CSI) may be transmitted to the scheduled PUSCH on the unlicensed carrier(s). In addition, if HARQ-ACK and CSI as user equipment feedback for DL transmissions transmitted on unlicensed carriers are transmitted through the PUCCH on the licensed carrier or if the PUSCH on the unlicensed carrier is scheduled, transmission through the corresponding PUSCH may be possible.

However, if simultaneous transmission of PUSCH and PUCCH is not configured in the user equipment, HARQ-ACK and CSI as a feedback from the user equipment for DL transmissions transmitted from licensed carriers may be transmitted through a PUCCH on the licensed carriers, but the HARQ-ACK may not be transmitted through a scheduled PUSCH on the unlicensed carrier, and CSI (periodic CSI or aperiodic CSI) may be transmitted through the scheduled PUSCH on an unlicensed carrier. According to the method used in the existing LTE system, if the PUSCH is not scheduled in the corresponding subframe, HARQ-ACK and CSI as a user equipment feedback for DL transmission on the licensed carrier and on the unlicensed carrier are transmitted through the PUCCH on the licensed carrier, and if the PUSCH is scheduled in the corresponding subframe on the licensed carrier or on the unlicensed carrier, only the scheduled PUSCH is transmitted by piggybacking HARQ-ACK and CSI as the user equipment feedback for DL transmission on the licensed carrier and on the unlicensed carrier with a scheduled PUSCH on a licensed carrier or on an unlicensed carrier However, since HARQ-ACK as the user equipment feedback for DL transmission transmitted on licensed carriers is configured not to be transmitted on unlicensed carrier, if the PUSCH is scheduled on the unlicensed carrier, the HARQ-ACK response as the user equipment feedback for the DL transmission transmitted on the licensed carrier may not be transmitted through the scheduled PUSCH on the unlicensed carrier. Therefore, the present invention will be described with reference to the following embodiments in order to solve the corresponding case.

Embodiment 1. In a case where the configuration of a carrier aggregation (CA) is composed of licensed carriers and unlicensed carriers, as a group of cells on which transmission of a PUCCH is possible, it is composed of licensed carrier(s) and unlicensed carrier(s), and if simultaneous transmission of PUSCH and PUCCH is not configured in the user equipment, in a subframe where transmission of the PUCCH may be performed, the user equipment does not expect transmission of the PUSCH to be scheduled on the unlicensed carrier from the base station, and the user equipment assumes only the transmission of the PUCCH, so that HARQ-ACK and CSI as a user equipment feedback for DL transmission on the licensed carrier and on the unlicensed carriers are transmitted through the PUCCH on the licensed carrier.

Embodiment 2. In a case where the configuration of the CA is composed of licensed carriers and unlicensed carriers, as a group of cells on which transmission of a PUCCH is possible, it is composed of licensed carrier(s) and unlicensed carrier(s), and if simultaneous transmission of PUSCH and PUCCH is not configured in the user equipment, for a subframe where transmission of the PUCCH may be possible, as a user equipment feedback for DL transmission on the licensed carrier to be transmitted by the user equipment, only when the HARQ-ACK response is a subframe to be transmitted, the user equipment does not expect the PUSCH transmission to be scheduled on the unlicensed carrier from the base station. And the user equipment assumes only the transmission of the PUCCH, so that HARQ-ACK and CSI as the user equipment feedback for DL transmission on the licensed carrier and on the unlicensed carrier are transmitted through the PUCCH on the licensed carrier. Since only the HARQ-ACK response for the DL transmission on the licensed carrier may not be transmitted to the PUSCH on the unlicensed carrier, the CSI may be transmitted to the PUSCH on the unlicensed carrier. Therefore, only when the UCI type to be piggybacked is the HARQ-ACK response for the DL transmission on the licensed carrier, the method may be applied.

Embodiment 3. In a case where the CA is composed of licensed carrier(s) and unlicensed carrier(s), as a group of cells on which transmission of a PUCCH is possible, and the simultaneous transmission of PUSCH and PUCCH is not configured in the user equipment, for a subframe where PUCCH transmission may be possible, if the PUSCH transmission is scheduled on the unlicensed carrier from the base station, the user equipment configures HARQ-ACK and CSI as a user equipment feedback for DL transmissions on the licensed carrier and on the unlicensed carrier, to be transmitted through the PUSCH on the unlicensed carrier, by using the legacy UCI piggyback method.

Embodiment 4. In a case where the CA is composed of licensed carrier(s) and unlicensed carrier(s), as a group of cells on which transmission of a PUCCH is possible, and the simultaneous transmission of PUSCH and PUCCH is not configured in the user equipment, for a subframe where PUCCH transmission may be possible, if the PUSCH transmission is scheduled on the unlicensed carrier from the base station, the user equipment drops the scheduled PUSCH on the unlicensed carrier, and the user equipment configures HARQ-ACK and CSI as the user equipment feedback for DL transmissions on the licensed carrier and on the unlicensed carrier to be transmitted through the PUCCH on the licensed carrier, by assuming the transmission only through the PUCCH.

Embodiment 5. In a case where the CA is composed of licensed carrier(s) and unlicensed carrier(s), as a group of cells on which transmission of a PUCCH is possible, and the simultaneous transmission of PUSCH and PUCCH is not configured in the user equipment, for a subframe where PUCCH transmission may be possible, if a PUSCH transmission is scheduled on the unlicensed carrier from a base station, the user equipment drops the scheduled PUSCH as only when the subframe is the HARQ-ACK response to be transmitted as an user equipment feedback for DL transmission on the licensed carrier to be transmitted by the user equipment. In addition, the user equipment configures HARQ-ACK and CSI as the user equipment feedback for DL transmissions on the licensed carrier and on the unlicensed carrier to be transmitted through the PUCCH on the licensed carrier, by assuming the transmission only through the PUCCH. Since only the HARQ-ACK response to the DL transmission on the licensed carrier may not be transmitted through the PUSCH on the unlicensed carrier, the CSI may be transmitted through the PUSCH on an unlicensed carrier. Therefore, only when the UCI type to be piggybacked is the HARQ-ACK response to the DL transmission on the licensed carrier, it may drop the scheduled PUSCH on the unlicensed carrier by applying the corresponding method.

<Exclusion Method for Calculating NACK Rate for PUSCH Transmission Drop in Adjusting CWS>

In Embodiments 4 to 5, the base station may schedule the PUSCH, but the user equipment may drop the PUSCH. If a CWS adjustment is used based on the PUSCH reception of the base station at UL LBT, in the case of Embodiments 4 to 5, since the base station may recognize the PUSCH drop from the user equipment according to the combination of the configuration information, for the PUSCH drop of the user equipment, during the CWS adjustment, the corresponding PUSCH drop may not indicate the collision handling or interference condition on the unlicensed carrier(s). Accordingly, the dropped PUSCH may be configured not to be used for calculating the NACK ratio for the CWS adjustment or calculating Z % of the NACK used for DL CWS adjustment.

The representation of the unlicensed carrier(s) in the present invention may be identical to that of the LAA SCell(s).

CWS Adjustment for UL Transmission

A method for adjusting a CWS for the UL LBT of the user equipment will be described.

When a base station manages a user equipment-specific CWS of each of user equipment(s), or each of the user equipment(s) enables the base station to recognize the CWS of the each of the user equipments, the base station may update/adjust the CWS of the each of the user equipments based on the UL transmissions transmitted from the user equipments. Meanwhile, in the case of power limitation of a user equipment, depending on a priority of channels of licensed carrier(s) and channels of unlicensed carrier(s), a PUSCH transmission may be dropped on the unlicensed carrier(s). However, since the base station may difficult to recognize the power limitation state of the user equipment, it is impossible to recognize whether the channels dropped by the user equipment are transmitted due to the power limitation. The base station expects the user equipment to transmit the scheduled channel and expects UL reception at the corresponding reception timing. Accordingly, when the UL transmission is dropped in the user equipment, the base station may determine a reception response for the UL transmission to a NACK and use the NACK as information for updating the CWS of the use equipment. However, due to the power limitation state of the user equipment, the dropped UL transmission may not be useful information for determining whether the channel for the medium between the user equipment and the base station is busy or idle. Therefore, when the base station performs the CWS update/adjustment for each user equipment, it may consider performing the CWS update/adjustment based on whether the base station receives the PUSCH transmitted by the user equipment. For example, when the user equipment transmits the PUSCH and the base station successfully decodes the PUSCH, the base station may reset the CWS of the corresponding user equipment to the minimum value (CWmin) by determining that the response for the PUSCH transmission is an ACK. In this case, the user equipment determines that the channel between the user equipment and the base station is idle, so that the user equipment may reset every CWp (e.g., p={1, 2, 3, 4}), which may be set differently according to the channel access priority class, to the minimum value (CWmin, p). Meanwhile, when the base station fails to decode the corresponding PUSCH, the base station may double the CWS of the corresponding user equipment by determining that the response to the PUSCH transmission is a NACK and. In this case, the user equipment determines that the channel between the user equipment and the base station is busy, so that the user equipment doubles the CWp (e.g., p={1, 2, 3, 4}) that may be differently set according to the channel access priority class. In addition, if the base station performs energy detection for the PUSCH transmission through detection of the UL DM-RS, or if the PUSCH is scheduled with the SRS, the energy detection of the SRS may be performed to determine whether the PUSCH is transmitted.

When the base station manages the CWS of each user equipment according to a PUSCH decoding result, the base station may enable each user equipment to perform the CWS update/adjustment using a new data indicator (NDI) included in a UL grant. The NDI is 1-bit information indicating an initial-transmission/retransmission of the PUSCH based on whether it is toggled based on a NDI value of the previous UL grant. For example, if a NDI value of the current UL grant is equal to the NDI value of the previous UL grant, the current UL grant indicates a retransmission of the PUSCH (i.e., decoding failure of the previous PUSCH). And, if the NDI value of the current UL grant is toggled differently from the previous value, the current UL grant indicates an initial transmission of the PUSCH (i.e., the decoding success of the previous PUSCH). Specifically, when the NDI on the UL grant received in the n-th subframe from the base station is toggled so that transmission of a PUSCH scheduled to the corresponding user equipment in the (n+4)-th subframe indicates new data, at the time when the UL grant is received, the CWp for the corresponding user equipment may be reset, that is, the current CWp may be set to the CW_min, p value. Unlike this, when the NDI received on the UL grant received in the n-th subframe from the base station does not indicate the new data (i.e., the NDI in the (n-4)-th UL subframe is not toggled to indicate retransmission of the PUSCH), it may perform LBT for transmission of the PUSCH in the (n+4)-th subframe by doubling the current CWS (at the time of receiving the UL grant). In addition, if the LBT using the CW_max value is repeatedly set to K times (e.g., K={1, . . . , 8}) by retransmission, CWp may be set to the CW_min value. The K value may be designated to one value of {1, . . . , 8} by the base station.

Next, when the base station manages only a CWS for the base station transmission without information on the CWS of the user equipment and each user equipment(s) manages its own CWS, each user equipment may perform the CWS update/adjustment using New data indicator (NDI) information included in the UL grant transmitted from the base station. For example, when the NDI on the UL grant received in the n-th subframe from the base station is toggled so that transmission of the PUSCH scheduled to the corresponding user equipment in the (n+4)-th subframe indicates the new data, at the time when the UL grant is received, the CWp for the corresponding user equipment may be reset, that is, the current CWp may be set to the CW_min, p value. Unlike this, when the NDI received on the UL grant received in the n-th subframe from the base station does not indicate the new data (i.e., the NDI in the (n−4)-th UL subframe is not toggled to indicate retransmission of the PUSCH), it may perform the LBT for the transmission of the PUSCH in the (n+4)-th subframe by doubling the current CWS (at the time of receiving the UL grant). In addition, if the LBT using the CW_max value is repeatedly set to K times (e.g., K={1, . . . , 8}) by retransmission, CWp may be set to the CW_min value. The K value may be designated to one value of {1, . . . , 8} by the base station.

If the user equipment adjusts the CWS according to toggle of the NDI included in the UL grant, it may be considered to update/adjust the CWS depending on whether the UL transmission on a reference subframe has been successfully decoded to promptly adjust the CWS according to the UL channel states. Here, the reference subframe may be defined as follows.

The reference subframe is defined as a starting transmission subframe of the most recent UL transmission burst in which the Cat-4 LBT procedure is expected to be used, and it refers to the subframe in which the transmission of the UL DMRS or SRS from the user equipment is detected by the base station and the PUSCH is decoded.

The reference subframe may be defined as the starting transmission subframe of the most recent UL transmission burst in which the Cat-4 LBT procedure is expected to be used.

The reference subframe may be defined as the first subframe of a reference scheduled burst in which the base station successfully decodes at least one transport block on the LAA SCell. The reference scheduled burst refers to the UL subframe(s) most recently consecutively scheduled for the corresponding user equipment. The reference scheduled burst is the UL subframe(s) expected to initiate a UL transmission after a Cat-4 LBT, and refers to the UL subframe(s) expected to complete transmission before at least four subframes than a subframe in which the CWS adjustment information (e.g., NDI) is transmitted.

The reference subframe may be defined as a (starting) subframe of the most recent UL transmission burst successfully transmitted by the user equipment.

The reference subframe may be defined as a (starting) subframe of the most recent UL transmission burst successfully transmitted, after the user equipment performs Cat-4.

When the base station successfully decodes the reference subframe (PUSCH), the CWS may be reset by the user equipment. And when the base station does not successfully decode the reference subframe (PUSCH), the CWS may be increased by the user equipment. When the CWS is defined for each of channel access priority classes, CWSp may be reset or increased to a CWSp value of the next higher allowed level for every channel access priority classes. p is the channel access priority class (e.g., p={1, 2, 3, 4}).

When the PUSCH carries a plurality of transport blocks (TB) in the reference subframe (i.e., UL SU-MIMO) and at least one of the TB(s) in the reference subframe are successfully decoded, CWS for each of the channel access priority classes may be reset, and otherwise, the CWS may be increased to a CWS value of the next higher allowed level of for each of the channel access priority classes. The transmission success/failure of the user equipment with respect to the reference subframe may be determined by referring to the NDI value transmitted in the UL grant by the base station. The NDI is set by each TB. Accordingly, if the NDI for at least one of the TB(s) for the reference subframe is toggled, the CWS may be reset for every channel access priority classes, and otherwise (that is, there is no toggled NDI), for every channel access priority classes, the CWS may be increased to the CWS value of the next higher allowed level. In other words, if any NDI is toggled in a subsequent UL grant after and associated with the reference subframe (e.g., only one of the two NDIs is toggled), the CWS may be reset to the minimum value, and the CWS may be increased if there is no toggled NDI. Whether the UL grant is associated with a reference subframe of a previous UL transmission burst may be determined based on whether or not HARQ-process ID of the reference subframe is the same as HARQ-process ID of a subframe scheduled by the UL grant (or uplink transmission (e.g., PUSCH)). Since asynchronous HARQ may be applied to UL transmission on LAA SCell, whether the UL grant is associated with the reference subframe of a previous UL transmission burst may be determined based on whether the HARQ-process ID in the UL grant is the same as the HARQ-process ID used to schedule the reference subframe. Meanwhile, when the LBT using the CW_max value is repeatedly set to K times (for example, K={1, . . . , 8}) by retransmission, only the CWp of the repeated channel access priority class may be set to the CW_min value. The K value may be designated to one value of {1, . . . , 8} by the base station.

Meanwhile, the base station may signal or indicate the user equipment a location of the reference subframe within the reference scheduled burst that the user equipment may use to update the CWS. For example, when information indicating cat-4 LBT, as the LBT type to be performed by the user equipment in UL transmission, is implicitly or explicitly signaled to the user equipment via the UL grant, information on the location of the reference subframe may be included in the corresponding UL grant. Even if no reference subframe is detected in the base station, the base station may signal the information on the location of the reference subframe to the user equipment.

For example, the number of bits may be determined according to the number of subframes scheduled for multi-subframe to inform the location of the reference subframe in the reference scheduled burst with a bitmap. As another example, the location of the reference subframe may be indicated including a case where no reference subframe is detected with a bitmap regardless of the number of subframes scheduled for multi-subframe (e.g., 0000: no reference subframe, 1000: 1st subframe, 0100: 2nd subframe, 0010: 3rd subframe, 0001: 4th subframe). Unlike this, assuming that the maximum number of subframes that can be multi-subframe scheduled is four, the location of the reference subframe may be designated with two bits. As another example, it is possible to signal 5 states (e.g., no reference subframe, 1st subframe, 2nd subframe, 3rd subframe, and 4th subframe) with 3 bits, including a case where any reference subframe is not detected.

When the user equipment receives the location of the reference subframe from the base station, the user equipment may perform an UL transmission (e.g., PUSCH) in a subframe (e.g., the first UL subframe of four consecutive UL subframes) prior to a reference subframe (e.g., the second UL subframe of four consecutive UL subframes) in the reference scheduled burst. In this case, the base station may not receive the UL transmission in the reference subframe even though the user equipment has transmitted it earlier. Therefore, the user equipment may determine that a collision has occurred in the base station reception for the UL transmission, and the user equipment may increase the CWS(s) for every channel access priority classes (or LBT priority classes) (e.g., twice).

When the user equipment receives the location of the reference subframe from the base station, the user equipment may perform an UL transmission (e.g., PUSCH) in a subframe (e.g., the third UL subframe of four consecutive UL subframes) after a reference subframe (e.g., the second UL subframe of four consecutive UL subframes) in the reference scheduled burst. In this case, the user equipment may maintain the CWS(s) for every channel access priority classes (or the LBT priority classes) without changing them. That is, the base station considers that the UL transmission is received in the reference subframe even though the user equipment transmits it later and the CWS may be maintained by considering that it is not related to collision in the base station reception for UL transmission.

When the user equipment receives the location of the reference subframe from the base station, the user equipment may perform an UL transmission (e.g., PUSCH) in the same subframe (e.g., the first UL subframe of four consecutive UL subframes) in the reference scheduled burst. In this case, since the user equipment performs the UL transmission in the reference subframe and the base station successfully decodes at least one transport block for the UL transmission of the reference subframe, the user equipment may determine that the base station successfully receives the UL transmission. Thus, the user equipment may reset the CWS(s) for every channel access priority classes (or the LBT priority classes) to a minimum value.

Meanwhile, if the user equipment is configured to reset the CWS or increase it to the next higher allowed level in the cat-4 LBT based on the NDI for the reference subframe, since asynchronous HARQ is applied to UL transmission in LAA SCell, not synchronous HARQ, it is not guaranteed that the UL grant that may refer to the retransmission for UL transmission (e.g., PUSCH) transmitted in the subframe n is transmitted in the subframe (n+4). Therefore, when the UL grant is not received in the subframe (n+4), ambiguity arises as to whether the user equipment should reset the CWS or increase it to the next level for using the CWS for the cat-4 LBT. To solve this problem, if the NDI for at least one of the TB(s) based on the NDI of the recently received UL grant is toggled, the user equipment resets the CWS for every channel access priority classes to CW_min, and otherwise, increases the CWS to a CWS value of the next higher allowed level for every channel access priority classes. In addition, when the LBT using the CW_max value is repeatedly set to K times (for example, K={1, . . . , 8}) by retransmission, only the CWp of the repeated channel access priority class may be set to the CW_min value. The K value may be designated to one value of {1, . . . , 8} by the base station.

As described above, therefore, the base station may not distinguish the following three cases in which the user equipment fails to transmit the PUSCH. Therefore, a method for classifying the following three cases is proposed and a method for adjusting the CWS according to the corresponding method will be described.

First, the case where the PUSCH may not be transmitted due to not receiving the UL grant, Second, the case where LBT fails before PUSCH transmission and PUSCH may not be transmitted Third, the case where LBT succeeds before PUSCH transmission but PUSCH may not be transmitted (e.g., UL power limit case)

First, as an example of a method for distinguishing the first and second cases, if LAA SCell is configured to receive cross-carrier scheduling from a cell of a licensed carrier, (E)PDCCH and PDSCH including the UL grant for transmission of the UL PUSCH on the LAA SCell may be simultaneously transmitted in the downlink. In this case, when the base station detects explicit HARQ-ACK feedback (including a case of receiving "ACK, NACK" or "ACK, NACK, NACK/DTX" or at least ACK or NACK) as feedback on the PDSCH rather than no transmission on a licensed carrier or an unlicensed carrier, since it may be seen that (E)PDCCH scheduling PDSCH may be regarded as successful in the user equipment, the base station may determine that the user equipment has successfully received the UL grant. Thus, in the first case, that is, the PUSCH may not be transmitted because the UL grant is not received, it may be excluded from the event to adjust (e.g., CWS increase) the CWS used to perform the UL LBT for transmission of the next PUSCH. When (E)PDCCH including the UL grant is transmitted from the cell of the licensed carrier, since the first case may not be advantageous informing the state of the channel collision for transmission of the UL PUSCH on the LAA SCELL, the base station may be excluded for adjusting the CWS for the uplink transmission of the user equipment. That is, when the base station may not receive (or detect) the PUSCH at the transmission timing of the PUSCH determined by the reception of the UL grant, the base station may determine that the PUSCH is not transmitted due to the failure of the PUSCH LBT and increase the CWS for the corresponding user equipment (for example, twice).

The above contents may be identically applied to the case where the unlicensed carrier, LAA SCell is configured to self-carrier scheduling. When the (E) PDCCH and the PDSCH including the UL grant for transmission of the UL PUSCH on the LAA SCell may be simultaneously transmitted on the downlink on the LAA SCELL, as feedback on the PDSCH, the explicit HARQ-ACK feedback (including a case in which one of "ACK, NACK" or "ACK, NACK, NACK/DTX" or at least ACK or NACK is detected), which is not a no transmission case, may be detected by the base station on a licensed carrier or an unlicensed carrier. In this case, it may be seen that the reception of the (E)PDCCH for scheduling the PDSCH is successful in the user equipment. And the base station may determine that the user equipment has successfully received the UL grant. Thus, in the first case, that is, when the PUSCH may not be transmitted because the UL grant is not received on the unlicensed carrier, it may be excluded from the event to adjust (e.g., CWS increase) the CWS used to perform the UL LBT for transmission of the next PUSCH. That is, when the base station may not receive (or detect) the PUSCH at the transmission timing of the PUSCH determined by the reception of the UL grant, the base station may determine that the PUSCH is not transmitted due to the failure of the PUSCH LBT and increase the CWS for the corresponding user equipment (for example, twice).

Next, an implicit signaling method and an explicit signaling method will be described as methods by which the base station may distinguish between the second and third cases.

First, as an implicit signaling method, when a CA is configured for a power limitation case of a user equipment, a PUSCH on an unlicensed carrier may be dropped according to a transmission priority according to a channel type in different carriers and contents of channels. The transmission priority may follow the priority defined in the standard up to the existing 3GPP Rel-13 (e.g., PRACH>PUCCH>PUSCH with UCI>PUSCH>periodic SRS). Therefore, when transmission of channels (e.g., PRACH, PUCCH, or PUSCH with UCI) having a higher priority than the PUSCH on the unlicensed carrier is detected in another carrier at transmission timing of the PUSCH according to the UL grant transmission, the base station may regard the PUSCH on the unlicensed carrier as dropped due to the power limitation state of the user equipment. In this case, the PUSCH not received on the unlicensed carrier may be excluded from the event to adjust the CWS (e.g., CWS increase) used to perform UL LBT for transmission of the next PUSCH. That is, although the LBT for the PUSCH has succeeded (i.e., the channel is idle), even if the PUSCH is not received (or detected) in the base station at the transmission timing of the PUSCH according to the UL grant because the PUSCH may not be transmitted due to the power limitation state of the user equipment, the base station may not double or increase the CWS of the corresponding user equipment (i.e., maintain the CWS).

In addition, the above implicit signaling method may be configured differently in a case where the user equipment receives cross-carrier scheduling of the PUSCH and in a case where the user equipment receives self-carrier scheduling of the PUSCH. In the case of the self-carrier scheduling, when it is determined that the UL grant has been successfully received, the channel state may be considered/regarded to be idle at the PUSCH transmission timing on the unlicensed carrier. That is, although the PUSCH LBT succeeds, even if the PUSCH is not received (or detected) at the base station at the transmission timing of the PUSCH according to the UL grant, in consideration that the PUSCH may not be transmitted due to the power limitation state of the user equipment (i.e., the third case), the CWS of the corresponding user equipment may not be doubled or increased from the previous CWS (i.e., maintain the CWS).

In the case of the cross-carrier scheduling, successful UL grant reception on the licensed carrier may not be considered as a method for determining the state of a channel at the PUSCH timing on an unlicensed carrier. In this case, since it is difficult for the base station to determine the second case and the third case, the base station arbitrarily determine whether the second case or the third case to apply the CWS adjustment method. Alternatively, in order to configurate to obtain more channel opportunities, even if it is scheduled by an UL grant from a licensed carrier, in a case where the PUSCH is not received, a method may be considered in which the CWS is configured to be doubled or increased from the previous value.

Next, as an explicit signaling method, information on a PUSCH LBT failure on the LAA SCELL or information on whether the PUSCH on the LAA SCell is dropped due to power limitation may be included within the PUCCH/PUSCH of the licensed PCell or the PUCCH/PUSCH of the licensed SCell and transmitted. Alternatively, information on a PUSCH LBT failure on another LAA SCell or information on whether a PUSCH on the LAA SCell is dropped due to power limitation may be included in a PUSCH of the LAA SCell set to be transmittable after LBT success and transmitted.

Figure 18:
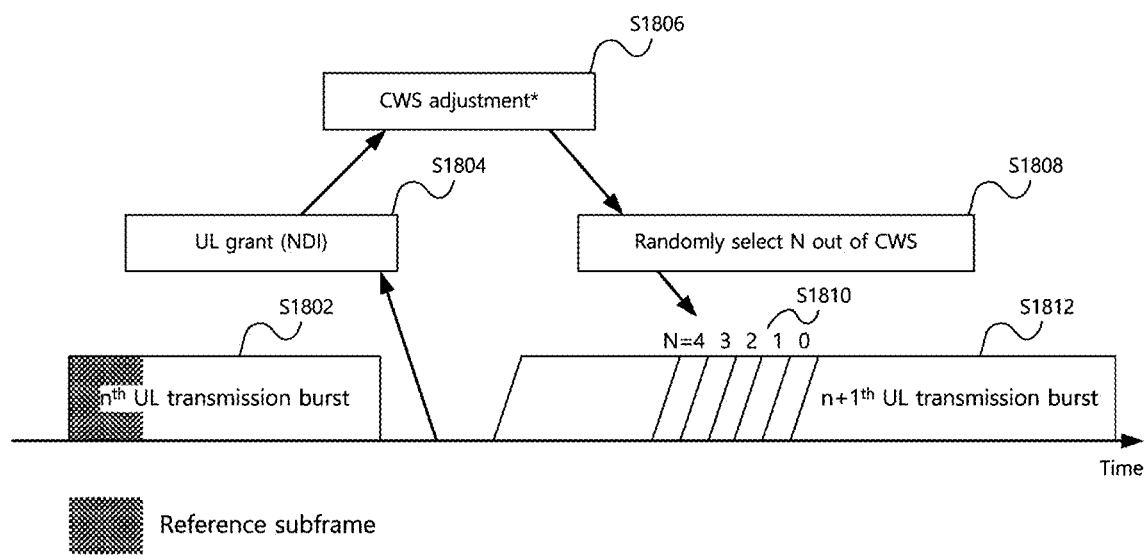

FIG. 18 illustrates a signal transmission process according to an embodiment of the present invention.

Referring to FIG. 18, after receiving an UL grant (UG #1) from a base station, a user equipment may transmit an n-th UL transmission burst (UTB #1) (S1802).

The UTB #1 includes one or more, preferably two or more, consecutively scheduled UL subframe(s), and a PUSCH may be transmitted for each UL subframe. The UTB #1 may be transmitted in an unlicensed band (e.g., an LTE-U cell) and may be transmitted based on a Cat-4 LBT procedure (i.e., Type 1 channel access). Then, the base station may transmit UL grant (UG #2) to the user equipment (S1804). The UG #2 includes scheduling information for the (n+1)-th UL transmission burst (UTB #2), and the UTB #2 includes one or more continuously scheduled UL subframe(s). The UG #2 includes PUSCH scheduling information for each UL subframe in the UTB #2, and each PUSCH scheduling information includes an NDI for each TB. The user equipment may transmit UTB #2 according to UG #2 (S1812). The UTB #2 may also be transmitted in an unlicensed band (e.g., LTE-U cell) and may be transmitted based on the Cat-4

LBT procedure. Specifically, if channel of the unlicensed band is in an idle state during the ECCA defer period, the user equipment further performs a random backoff within a CWS (S1810). The user equipment generates a random number N equal to or less than the CWS (e.g., [0, q−1]) (S1808) and performs backoff with the number of slot corresponding to the random number N (S1810). In this case, the size of CW (i.e., CWS) is adaptively changed based on the NDI value of the UG #2 (S1806). The NDI value used for adjusting the CWS may be related to the UL transmission (i.e., PUSCH) on a reference subframe in the most recent UL transmission burst (i.e., UTB #1). Specifically, when at least one NDI is toggled with respect to the TB(s) transmitted on the reference subframe in the UTB #1, the CWS is reset to the minimum value, otherwise the CWS may be increased. For example, if multiple (e.g., two) TBs are transmitted on the reference subframe and at least one NDI is toggled in a UL grant after and associated with the reference subframe (e.g., only one of the two NDIs is toggled), the CWS may be reset to the minimum value. Since asynchronous HARQ is applied to UL transmission in LAA SCell, in the UL transmission, whether the UL grant is associated with the reference subframe of the previous UL transmission burst may be confirmed using a HARQ-process ID. For example, when the UL grant having the HARQ-process ID used for the scheduling of the reference subframe is received after the reference subframe (or when the HARQ-process ID of the reference subframe and the HARQ process ID of the subframe scheduled by the UL grant are the same), and when at least one of the NDI values in the UL grant are toggled, the CWS may be reset to the minimum value. On the other hand, if the UL grant associated with the reference subframe is not received, or the UL grant associated with the reference subframe is received but the NDI is not toggled on all TBs, the CWS may be increased. When CWS increases, CWS may be doubled or increased exponentially between the minimum value (CW_min) and the maximum value (CW_max) or increased to the maximum value.

The method described above based on multi-subframe scheduling may be similarly applied to the case of single subframe scheduling.

Next, a signaling method for the LBT parameter for adjusting the CWS at performing UL LBT for UL PUSCH transmission by the user equipment will be described.

When a base station informs a user equipment of a UL LBT parameter, since the base station may difficult to recognize the channel access priority class for the traffic transmitted by the user equipment, notifying CWS of every channel access priority classes to the user equipment may be a large signaling overhead. Also, when each channel access priority class follows the channel access priority class (DL channel access priority class) used in the DL, as shown in Table 6, the range of allowed CWp size is large, so that related signaling overhead may be increased.

TABLE 6

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

TABLE 6-continued

In addition, Table 7 may be used as an LBT parameter for the UL channel access priority class.

TABLE 7

| LBT priority class | n | CWmin | CWmax | MCOT | Set of CW sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms (see note 1) or 10 ms (see note 2) | {15, 31, 63, 127, 255, 511, 1023} |
| 4 | 7 | 15 | 1023 | 6 ms (see note 1) or 10 ms (see note 2) | {15, 31, 63, 127, 255, 511, 1023} |

NOTE 1:
The MCOT of 6 ms may be increased to 8 ms by inserting one or more gaps. The minimum duration of a pause shall be 100 μs. The maximum duration (Channel Occupancy) before including any such gap shall be 6 ms. The gap duration is not included in the channel occupancy time.
NOTE 2:
If the absence of any other technology sharing the carrier can be guaranteed on a long term basis (e.g. by level of regulation), the maximum channel occupancy time (MCOT) for LBT priority classes 3 and 4 is for 10 ms, otherwise, the MCOT for LBT priority classes 3 and 4 is 6 ms as in note 1.

Note1: The maximum channel occupancy time (MCOT) of 6 ms may be increased to 8 ms by inserting one or more gaps and the minimum duration of a pause due to the gap should be 100 us. The maximum duration length before including the gap should be 6 ms. The gap duration is not included in the channel occupancy time.

Note2: If the absence of any other technology (e.g., Wi-Fi) on the same carrier is guaranteed, the MCOT for LBT priority classes 3 and 4 may be up to 10 ms, otherwise, the MCOT for LBT priority classes 3 and 4 is as specified in note 1.

Therefore, in order to inform the CW size among the LBT parameters that the base station may inform the user equipment, a method for reducing the signaling overhead and a method for adjusting the CWS according to the signaling overhead will be described.

First, as the base station informs the user equipment of a common value for the CWS regardless of the channel access priority class, the user equipment receiving the common value may perform an LBT that performs a backoff operation using the CWS corresponding to a common value according to the channel access priority class to be transmitted. In other words, the base station determines whether the CWS is doubled or increased based on the reception of the PUSCH transmitted from the user equipment, and informs the user equipment of a common value with the parameters for the LBT, regardless of the channel access priority class, the user equipment receiving the common value sets the CWS according to the common value of the LBT of the PUSCH to be transmitted to performs the LBT, and transmits the PUSCH according to the success of the LBT. In the case of receiving a common value through the UL grant, when the common value is 0, the LBT may be performed with the minimum value of the CW size of the channel access priority class for the PUSCH to be transmitted, and when the common value is 1, LBT may be performed by setting the minimum value of CW size to the next level value. As a common value is applied according to sizes of CWp allowed in each channel access priority class, as in DL, when the maximum CWmax, p value in the channel access priority class is repeatedly set to K times, the CWp value may be set to the CWmin, p value in the channel access priority class. Here, K may be selected from {1, 2, . . . , 8} by the base station. K may be indicated to the user equipment via RRC signaling.

When DL channel access priority class 4 is used, 6 is indicated as the common value for CWS, and in a case where the next PUSCH transmission is intended for transmission with channel access priority class 1, in considering that the maximum CWS is repeated 6 times, according to the condition that if it is repeatedly set to K times by the base station, CWp value should be set to CWmin, p value in channel access priority class, the CWS of the PUSCH for the corresponding channel access priority class may be determined. A method may be considered in which when K is configured to 6, CWp may be set to the minimum value CWS, and if K is configured to 4, it is configured to the CWp maximum value, and since the common value is larger than the set K value, CWp is configured to the minimum value CWS.

Furthermore, as another method, as the level of allowed CWp size for UL PUSCH transmission is configured to the same number of levels (e.g., one of {2, 3, 4, . . . , 8 steps}) for every channel access priority classes. And the base station informs the user equipment of the common value for the CWS regardless of the channel access priority class. Then, the user equipment receiving the common value may perform an LBT that performs backoff using the CWS corresponding to the common value according to a channel access priority class to be transmitted. This may be a method in which the increase or reset of the CWS with respect to the adjustment of the CWS according to each channel access priority class is controlled to be the same by the common value and the signaling overhead for CWS indication is reduced. In other words, in the case of receiving the common value of a condition in which the CWS increases for every channel access priority classes, the CWS is increased to the next higher allowed value regardless of the channel access priority class to be transmitted from the user equipment. And even in the case of receiving the common value of the reset condition in the CWS reset or satisfying the reset condition by repeating K times, the corresponding CWS for every channel access priority class is reset regardless of the channel access priority class. This may be considered as a method for reducing the signaling overhead for CWS among the LBT parameters transmitted in the UL grant. As one embodiment below, when the channel access priority class used in the DL is based on the following method, a method for setting a level of the allowed CWp size to two levels may be used. In the corresponding case, a signaling overhead of a common value indicating CWS is sufficient for one bit.

TABLE 8

| Channel Access Priority Class (p) | allowed $CW_p$ sizes |
|---|---|
| 1 | {3, 7} |
| 2 | {7, 15} |
| 3 | {15, 31} |
| 4 | {31, 63} |

If Modified to a more general allowed CWp size representation, it may be as follows.

TABLE 9

| Channel Access Priority Class (p) | allowed $CW_p$ sizes |
|---|---|
| 1 | {A, B} |
| 2 | {C, D} |
| 3 | {E, F} |
| 4 | {G, H} |

Here, B, C, D, E, F, G, and H values may be set to values satisfying the condition A<B=<C<D=<E<F=<G<H, and B, D, F, and H values may be set as the maximum CW size value of the corresponding channel access priority class. For example, when the maximum allowed CW size uses the value used in the DL, each of B, D, F, and H may have one value of {7, 15, 31, 63, 127, 255, 511, 1023}.

As another embodiment, if the UL transmission is configured to use a smaller CW size than the DL transmission. For example, when the maximum allowed CW size is configured to {3, 4, 5, 6} or {3, 4, 5, 6, 7}, even when having the maximum CWS defined by the value of one of {3, 4, 5, 6} or one of {3, 4, 5, 6, 7}, the allowed CWp size level for UL PUSCH transmission may be set to the same number of levels for every channel access priority classes.

Table 10 is one example, and a method for setting an allowed CWp size level to two levels may be used.

TABLE 10

| Channel Access Priority Class (p) | allowed $CW_p$ sizes |
|---|---|
| 1, 2 | {A, B} |
| 3, 4 | {C, D} |

Here, B, C, and D values may be set to values satisfying the condition A<B=<C<D, and B and D values may be set to the maximum CW size value of the corresponding channel access priority class. For example, if the maximum allowed CW size is configured to {3, 4, 5, 6} or {3, 4, 5, 6, 7}, it is possible to set each of B and D to one of {3, 4, 5, 6} or one of {3, 4, 5, 6, 7} as the maximum allowed CW size.

TABLE 11

| Channel Access Priority Class (p) | allowed $CW_p$ sizes |
|---|---|
| 1 | {A, B} |
| 2 | {C, D} |
| 3 | {E, F} |
| 4 | {G, H} |

Here, B, C, D, E, F, G, and H values may be set to values satisfying the condition A<B=<C<D=<E<F=<G<H, and B, D, F, and H values may be set to the maximum CW size value of the corresponding channel access priority class. For example, if the maximum allowed CW size is configured to {3, 4, 5, 6} or {3, 4, 5, 6, 7}, it is possible to set each of B, D, F, and H to one of {3, 4, 5, 6} or one of {3, 4, 5, 6, 7} as the maximum allowed CW size.

When the base station performs the scheduling to the user equipment as shown in FIGS. 19 to 20 and configures the reference subframe for updating the CWS by the user equipment. In this case, the user equipment performs the UL LBT for the reference subframe according to the scheduling information transmitted in the UL grant from the base station. Then, when the LBT succeeds, the use equipment performs UL transmission in the UL reference subframe. However, even though the user equipment performs the UL transmission, a case where the base station fails to detect the UL transmission, due to the channel interference condition of the unlicensed band used by the LAA SCell, may occur. In this case, the base station may not accurately identify whether the UL transmission of the scheduled UL subframe fails to perform transmission due to UL LBT failure of the user equipment, due to transmission failure at the user equipment, or because the user equipment miss the UL grant from the base station, or whether the base station may not detect it due to channel interference in the corresponding subframe. Especially, if the base station fails to detect the reference subframe despite the transmission of the reference subframe from the user equipment, the CWS should be increased, but if the base station and the user equipment determine the reference subframe differently each other, the CWS may be reset even though it is an increase condition of the CWS. Or, the opposite case may occur. Accordingly, by solving the mismatch problem of the reference subframe between the base station and the user equipment for adjusting the CWS and setting to have the same understanding between the base station and the user equipment, in determining the CWS for the UL LBT performed by the user equipment, a method for configuring the base station and the user equipment to recognize whether the reference subframe of the UL transmission burst received at the base station is same as the reference subframe transmitted by the user equipment will be described.

When assuming that a reference subframe is a starting transmission subframe of an UL transmission burst transmitted from a user equipment by performing cat-4 LBT, the following description is a method for indicating the starting transmission subframe of the UL transmission burst in the user equipment and a method for configuring a base station to recognize whether the first subframe of an UL transmission burst received by the base station is the first subframe transmitted by the user equipment.

Figure 21:
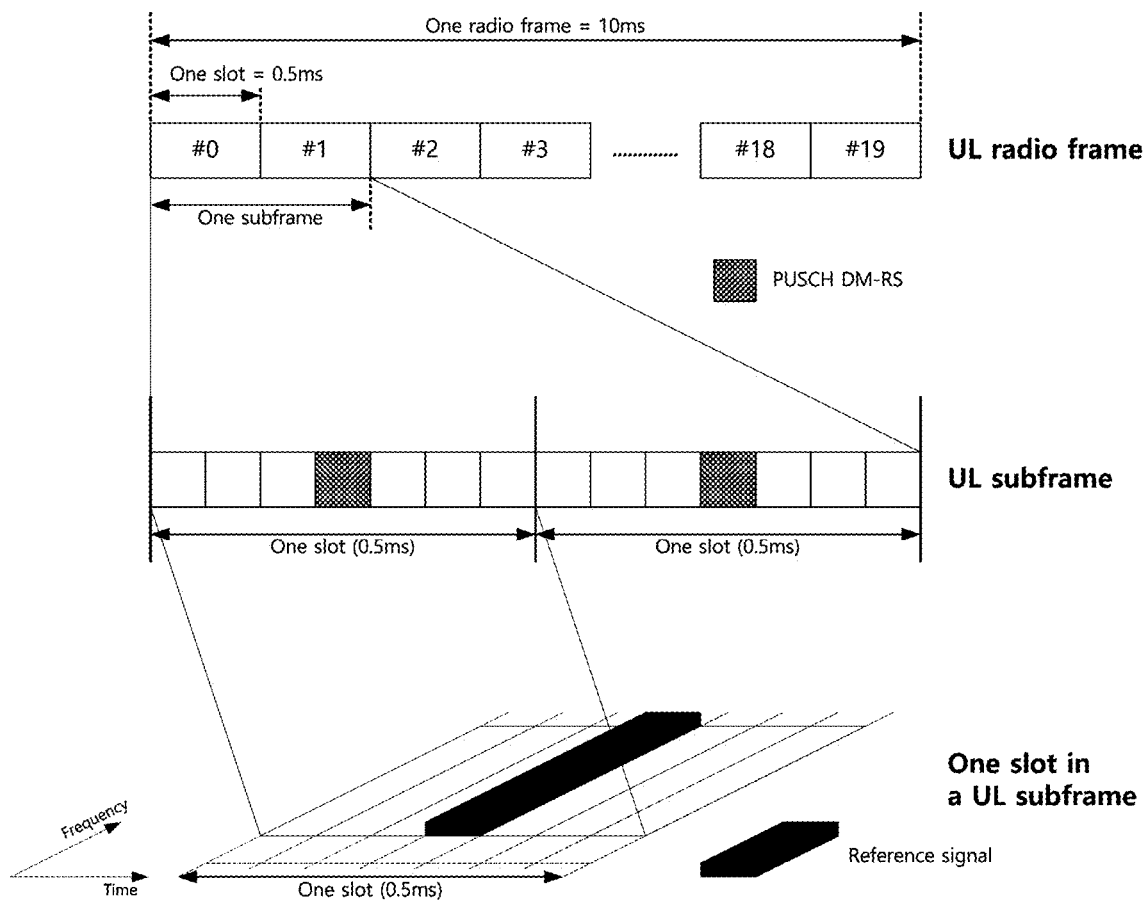

FIG. 21 is a diagram showing a structure of an UL radio frame, an UL subframe, and an UL slot in LTE. In the LTE, a cyclic-shift index of a sequence of a reference signal (UL DMRS) within the UL subframe is determined by a value set by the cyclic-shift index of the UL DMRS in the UL grant transmitted from a base station to a user equipment and RRC signaling, and a function of the slot index. The cyclic shift value determined by RRC signaling during a certain time interval is the same, and since the cyclic shift index value determined by the UL grant is constant within a subframe, the cyclic shift value of the UL DMRS in the subframe may be determined to be a different value depending on the slot index.

Method P) as a method different from a method of using the cyclic-shift index of the UL DM-RS sequence transmitted in the UL subframe transmitted at the first in the UL transmission burst transmitted after the UL LBT based on the slot index used in the legacy, a method for transmitting an UL DM-RS sequence using the following methods P-1 to P-3 may be considered. Therefore, as the base station performs detection of the UL DMRS as many as twice at the time of the PUSCH detection for each subframe of the UL transmission burst scheduled by the base station, the base station determines whether each subframe of the received UL transmission burst is the first successfully transmitted subframe or whether there is the first successfully transmitted subframe prior to transmission of the corresponding subframe.

Method P-1) as one embodiment, unlike the legacy method, the user equipment switches a cyclic shift index of a UL DM-RS sequence transmitted in the UL subframe transmitted at the first in the UL transmission burst to a cyclic shift index of a UL DM-RS transmitted in each slot of the UL subframe transmitted at the first transmission, that is, switches the first slot index and the second slot index, so that the user equipment transmits the UL subframe including the UL DM-RS by setting the cyclic shift of the UL DM-RS sequence transmitted in the first slot based on the second slot index and the cyclic shift of the DMRS sequence transmitted in the second slot based on the first slot index.

As the user equipment informs whether the corresponding UL subframe is the first UL subframe of the UL transmission burst scheduled from the base station, through indicating that the cyclic shift index of the UL DM-RS is switched between the slots, when the user equipment transmits the UL subframe to the base station, this may be used as a method for preventing a mismatch of the user equipment and the base station for the starting transmission UL subframe.

For a continuous UL subframe of UL transmission bursts scheduled by the base station, the base station performs two detections based on the UL DM-RS generated by two different schemes (i.e., switching or no switching of the UL DM-RS cyclic shift value between the slots) until the PUSCH detection of the UL subframe. Then, when the UL PUSCH is detected by the switched UL DM-RS, the transmission of the corresponding subframe may be determined as the UL subframe at the starting of the UL transmission burst form the user equipment. In this case, depending on the success of PUSCH decoding in the starting UL subframe, the base station may signal the user equipment through signaling (e.g., UL grant, common control channel, common PDCCH) a reset of the CWS or that the CWS increases with a next higher allowed value. Unlike this, if the UL PUSCH is detected by the non-switched UL DM-RS at the base station, the base station determines that the transmission of the corresponding subframe is not the transmission of the first UL subframe of the UL transmission burst from the user equipment and the first UL subframe of the UL transmission burst in the user equipment is transmitted from the user equipment but the first UL subframe may not be detected at the base station due to the interference condition of the channel, so that the base station may signal the user equipment through signaling (e.g., UL grant, common control channel, common PDCCH) to increase the CWS to the next higher allowed value.

Method P-2) A method of setting the cyclic shift index of the UL DM-RS sequence in the first slot and the cyclic shift index of the UL DM-RS sequence in the second slot according to the same slot index may be considered. There may be a method of setting the cyclic shift index of the UL DM-RS sequence to be the same based on the index of the first slot of the UL subframe to be transmitted, and there may be a method of setting the same cyclic shift index of the UL DM-RS sequence based on the index of the second slot.

As the user equipment informs whether the UL subframe is the starting UL subframe of the UL transmission burst scheduled from the base station when the user equipment transmits the UL subframe to the base station through indicating that the cyclic shift index of the UL DM-RS is switched between the slots, this may be used as a method for preventing a mismatch of the user equipment and the base station for the starting transmission UL subframe.

For a continuous UL subframe of UL transmission bursts scheduled by the base station, the base station performs two detections based on the UL DM-RS generated by the two different schemes (i.e., based the same slot index for the UL DMRS cyclic shift value between the slots or based on each slot index for the UL DM-RS cyclic shift value) until the PUSCH detection of the UL subframe. Then, when the UL PUSCH is detected by the UL DM-RS generated by the value of the same slot index of the UL DM-RS cyclic shift value between the slots, the transmission of the corresponding subframe may be determined as the UL subframe at the starting of the UL transmission burst from the user equipment. In this case, depending on the success of PUSCH decoding in the starting UL subframe, the base station may signal the user equipment through signaling (e.g., UL grant, common control channel, common PDCCH) a reset of CWS or that the CWS increases with a next higher allowed value. Unlike this, if the UL PUSCH is detected in the base station by the UL DM-RS generated by the value set based on the slot index, the base station determines that the transmission of the corresponding subframe is not the transmission of the first UL subframe of the UL transmission burst from the user equipment and the first UL subframe of the UL transmission burst in the user equipment is transmitted from the user equipment but the first UL subframe may not be detected at the base station due to the interference condition of the channel, so that the base station may signal the user equipment through signaling (e.g., UL grant, common control channel, common PDCCH) to increase the CWS to the next higher allowed value.

Method P-3) A method for transmitting a pre-defined cyclic shift index of UL DM-RS sequence based on the pre-defined index of the cyclic shift of the UL DM-RS previously set for a base station and a user equipment by applied to the UL DM-RS of a UL subframe to be transmitted at the first by the user equipment may be considered.

Method Q) as a method different from a method for using the cyclic-shift index of the sequence of the UL DM-RS transmitted in the UL subframe(s) excluding the UL subframe transmitted at the first in the UL transmission burst transmitted after the UL LBT based on a slot index using in a legacy, by generating an UL DM-RS sequence by using the following methods Q-1 to Q-3 to transmit, it is possible to distinguish between the starting transmission of the UL transmission burst at the base station and the non-starting transmission.

Method Q-1) as the setting of the cyclic-shift index of the UL DM-RS sequence transmitted to the UL subframe excluding the first UL subframe transmitted in the UL transmission burst is different from the legacy method, the user equipment switches the cyclic shift index of the UL DMRS transmitted in each slot between the slots, that is, switches the first slot index and the second slot index, so that the user equipment transmit the UL subframe including the UL DMRS by setting the cyclic shift of the DMRS sequence of the UL DMRS transmitted in the first slot based on the second slot index and the cyclic shift of the DMRS sequence of the UL DMRS transmitted in the second slot based on the first slot index.

Method Q-2) In the UL subframe(s) except the first UL subframe transmitted in the UL transmission burst, a method of setting the cyclic shift index of UL DMRS sequence in first slot and the cyclic shift index of the UL DMRS sequence in the second slot by the user equipment according to the same slot index may be considered. There may be a method of setting the cyclic shift index of the UL DMRS sequence to be the same based on the index of the first slot of the UL subframe to be transmitted, and there may be a method of setting the same cyclic shift index of the UL DMRS sequence based on the index of the second slot.

Method Q-3) In the UL subframe(s) except the first UL subframe transmitted in the UL transmission burst, a method for transmitting a cyclic shift index of a pre-defined UL DMRS sequence based on a pre-defined index of the cyclic shift of the UL DMRS previously set for a base station and a user equipment by applied to the UL DMRS of a UL subframe to be transmitted at the first by the user equipment may be considered.

FIG. 20 illustrates a method for determining a CWS in a subframe in which Cat-4 should be performed for UL transmission. Specifically, it illustrates a case where each UL scheduled subframe of the most recent UL transmission burst has a gap between consecutive subframes and is scheduled by each UL grant ((a) in FIG. 20), a case where scheduling is performed with a gap between consecutive UL subframes scheduled by a multi-subframe scheduling from one DL subframe ((b) in FIG. 20), and a case where scheduling is performed with a gap between UL subframes scheduled by a plurality of UL grants from one DL subframe ((c) in FIG. 20). In these case, each UL subframe performing each cat-4 LBT may be regarded as an UL transmission burst due to a gap between UL subframes. As shown in FIG. 20, if there is a gap between scheduled UL subframes, in determining the CWS for performing cat-4 for the next UL transmission, the most recent UL transmission burst performing cat-4 as the reference subframe may be an A subframe (UL SF #(n+4+k)), a B subframe (UL SF #(n+5+k)), or a C subframe (UL SF #(n+6+k)) in (a), (b) or (c) of FIG. 20. Here, since a subframe that has performed each cat-4 transmitted lastly may be the subframe of the UL burst most recently, in this case, even if it is the UL subframe that starts first among the scheduled subframes due to LBT success in the preceding UL cat-4 LBT, by informing the starting subframe of the UL burst by using Methods P-1, P-2, P-3 and Methods Q-1, Q-2 and Q-3 in the corresponding subframe, it is difficult to solve the reference subframe mismatch for adjusting the CWS for the next UL transmission between the BS and the MS. In such a case, detection of the UL DMRS and the PUSCH twice in the base station may increase only the detection complexity of the base station. Therefore, in a case where the base station configures the user equipment to perform scheduling with a UL gap, a method in which the base station signals the user equipment to not perform the modification transmission of the UL DMRS sequence in the user equipment, that is, Methods P-1, P-2, P-3 and Methods Q-1, Q-2, and Q-3 may be considered. As the signaling method, for example, it is possible to indicate through the UL grant, the common control channel or the common PDCCH. As shown in FIG. 19, in a case where the base station performs the scheduling for the UL transmission burst without a gap, the base station may configure the user equipment to use Methods P-1, P-2, and P-3 and Methods Q-1, Q-2, and Q-3 to solve the mismatch between the base station and the user equipment for the reference subframe. And, as shown in FIG. 20, in a case where the base station schedules the UL transmission burst with a gap, the base station may signal the user equipment not to perform Methods P-1, P-2, and P-3 and Methods Q-1, Q-2, and Q-3 so as to reduce the number of blind detection times at the base station.

UL Signal Transmission Scheme

A method for multiplexing the SRS only transmission, the SRS+PUSCH transmission, and the PUSCH only transmission, which may be configured the user equipment to transmit, will be described.

Figure 23:
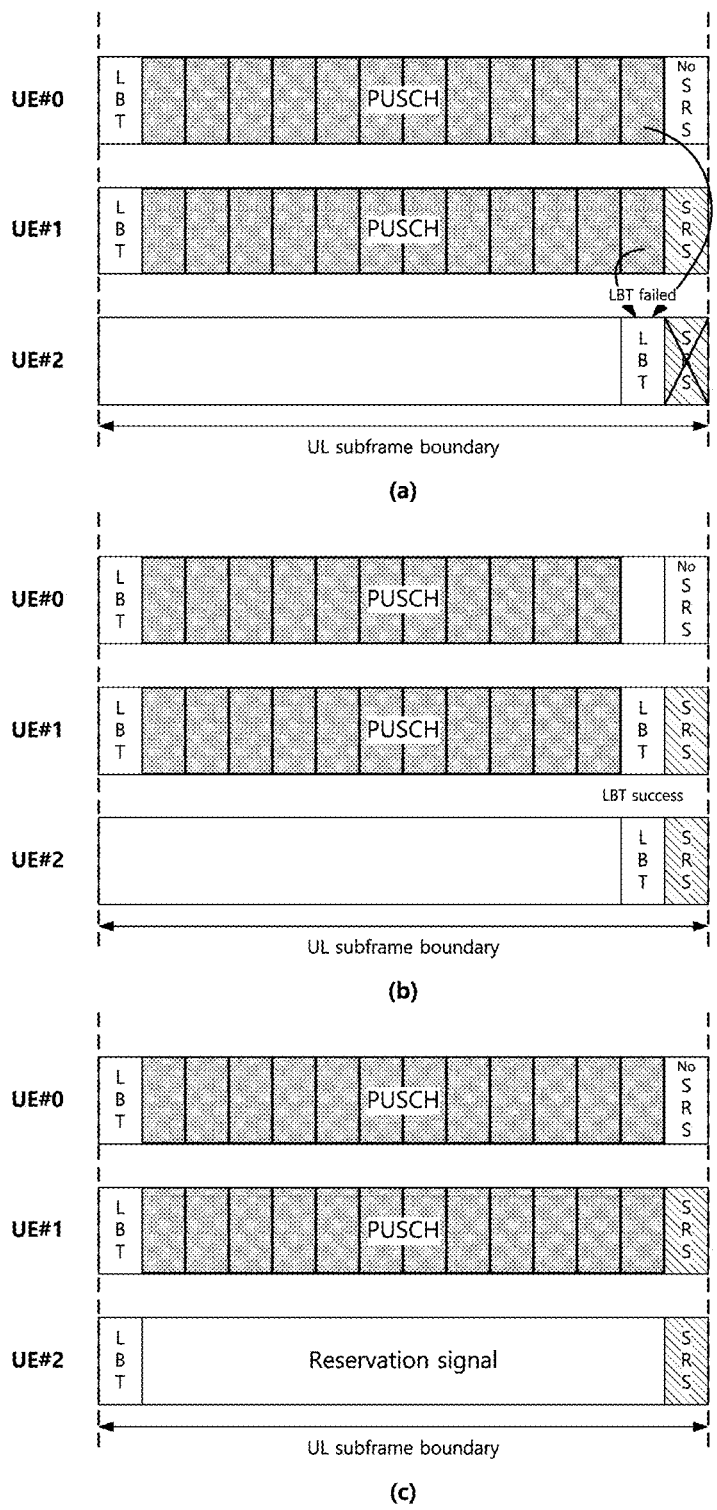
Figure 24:
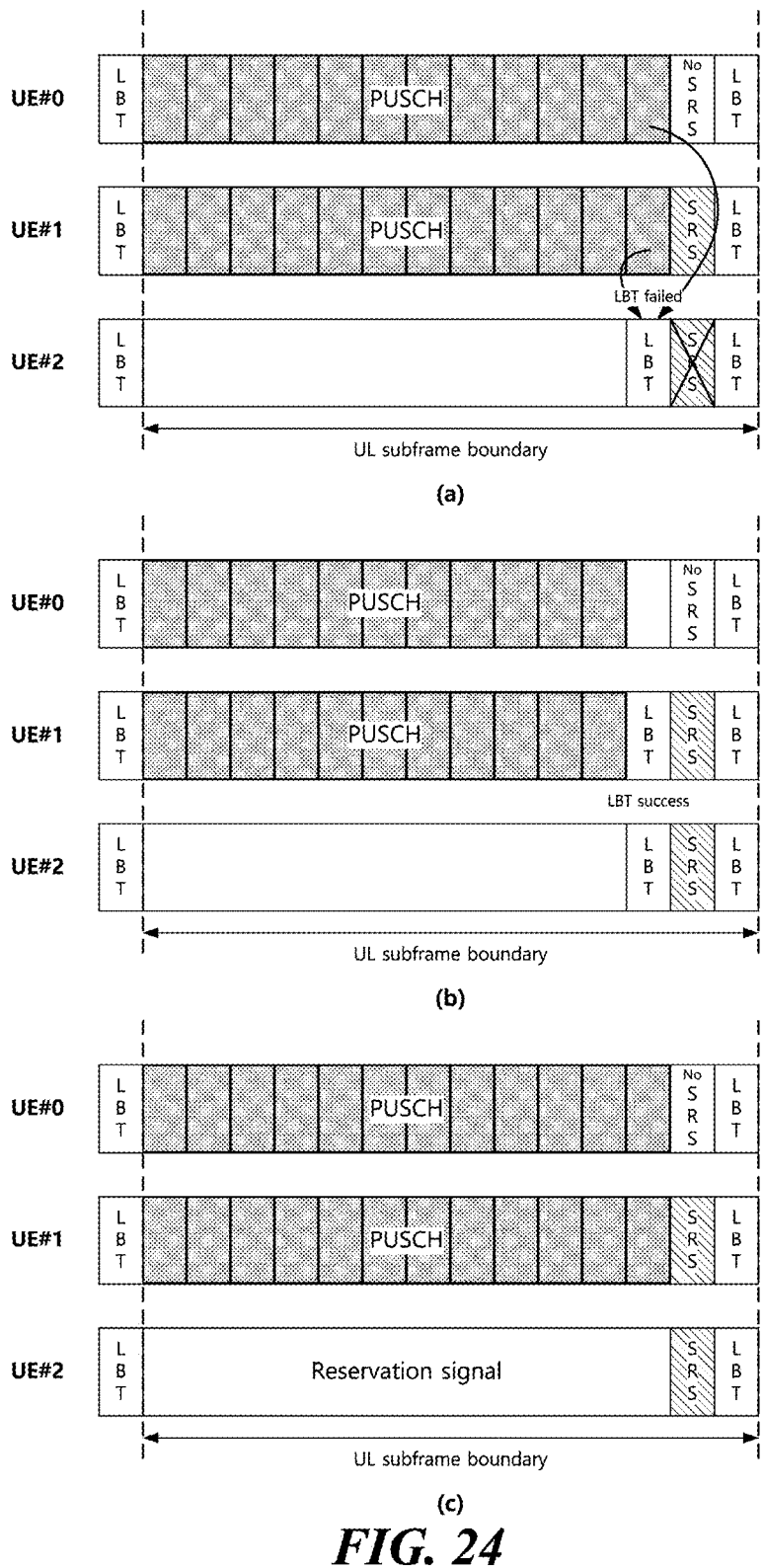

Considering SRS only transmissions, the last symbol in the subframe (e.g., the 14th SC-FDMA symbol), which is the symbol position for the SRS (SC-FDMA) used in the legacy LTE, may be used as the symbol position for the SRS. In this case, from the viewpoint of the user equipment transmitting SRS only, the LBT must be performed before the SRS transmission in order to perform the SRS only transmission, and the SRS transmission may be possible after success of the LBT. However, when a multi-user equipment(s) is scheduled, some of multi-user equipment(s) may simultaneously transmit PUSCH and SRS, and some of multi-user equipment(s) may only transmit a PUSCH. In this case, as shown in (a) in FIG. 23/24, the user equipment transmitting only the SRS performs LBT before the SRS transmission in the 14th SC-FDMA symbol, and since the LBT always fails due to the transmission of the PUSCH from a user equipment transmitting the PUSCH+SRS and user equipment(s) transmitting only the PUSCH, SRS only transmission may not be performed. Therefore, in order to prevent the user equipment the LBT failure of the user equipment transmitting SRS only and configure the user equipment to perform the SRS transmission, as shown in FIG. 23(b)/24(b), the user equipment(s) simultaneously transmitting PUSCH+SRS and the user equipment(s) transmitting the PUSCH may set an additional LBT gap in front of the 14th SC-FDMA symbol. And even the user equipment(s) simultaneously transmitting PUSCH+SRS can perform an additional LBT in front of the 14th SC-FDMA symbol. As another example, as shown in (c) of FIG. 23/24, when the user equipment transmitting the SRS only performs the LBT in the LBT gap (e.g., 1st SC-FDMA symbol) performed by the UE #0 and the UE #1, and succeeds in the LBT, the user equipment may transmit a specific reservation signal until in front of the 14th SC-FDMA symbol to which the SRS is transmitted to enable the SRS only transmission of the UE #2. A specific reservation signal may be considered for transmission of a specific narrow band (e.g., RB-level reservation signal, or transmission of random dummy data) pre-reserved by the base station. The reservation signal may be composed of the frequency resources as same as the SRS. FIG. 23 illustrates a case where the LBT gap exists from the start of the UL subframe, and FIG. 24 illustrates a case where the LBT gap exists at the end of the UL subframe. In the drawing, the length of the LBT is one symbol length, but it is not limited thereto.

As another embodiment, as a method for multiplexing SRS only transmission, SRS+PUSCH transmission and PUSCH only transmission without performing additional LBT for SRS, a method of allocating a symbol position for the SRS to the SC-FDMA symbol in the starting point of the UL subframe may be considered. FIG. 25 illustrates a case where the LBT gap exists from the starting point of the UL subframe, and the symbol position for the SRS is configured to the starting point of the UL subframe after LBT. FIG. 26 illustrates a case where the LBT is performed before the starting point of boundary of the UL subframe (that is, the LBT gap exists at the end of the UL subframe), and the symbol position for the SRS is configured to the first SC-FDMA symbol of the UL subframe. In this method, the shared LBT is used for the PUSCH in which simultaneous transmission of the SRS transmission is performed, to prevent waste of time resources due to the additional LBT. However, in the case of the UE #0 performing transmission of the PUSCH only, when there is no transmission of the SRS configured to the UE #0 in spite of the success of the LBT in duration of the shared LBT, a symbol for a SRS (e.g., a second SC-FDMA symbol) may be blanked for transmission of a SRS of the other user equipments. In this case, if a channel access is successful by the other use equipments during the blanked symbol duration, the transmission of the scheduled PUSCH may not be performed. Therefore, a method of guaranteeing the transmission of the PUSCH scheduled in the case of the PUSCH only transmission by transmitting reservation signals, as shown in (b) of FIG. 25, may be considered. For example, by considering that the SRS transmission of the other user equipment is performed in the same symbol, specific frequency resources of the SRS (e.g., SRS transmission comb, SRS transmission band) may be used as the reservation signal for the case of PUSCH only. As another example, since multiplexing through frequency resources and CDM multiplexing in the code domain through different cyclic shifts of Zadoff Chu (ZC) sequence are applied to the SRS between different UEs, a specific cyclic shift value may be used as the reservation signals for PUSCH only transmission. The second example is not limited to a specific frequency resource, and the specific cyclic shift value within the frequency resource to which the SRS is transmitted may always be used for reservation signals for the PUSCH only transmission. For example, in the case of the PUSCH only transmission, the user equipment may transmit the SRS having a specific cyclic shift value on PUSCH resources to be transmitted on a symbol allocated for an SRS symbol. As another example, the above two methods may be used at the same time. That is, by using a combination of frequency resources and cyclic shift values for transmitting the SRS, a method of transmitting the SRS as the usage of the reservation signal through the information that the base station and the user equipment recognize implicitly or explicitly may also be considered.

Furthermore, although UE #0 may know that there is no SRS transmission in the scheduled subframe since the UE #0 receives the scheduling for the PUSCH only transmission, the UE #0 may not know whether the SRS is transmitted in UE #1 and UE #2. Therefore, UE #0 may not determine whether the PUSCH transmission should be guaranteed through the reservation signal transmission at a candidate SRS symbol position after success of the LBT at the starting point of the UL subframe. Whether to perform triggering SRS for other user equipments at the time of granting the UL grant for the PUSCH is determined by the base station scheduling. Accordingly, when the base station transmits an UL grant to a user equipment (e.g., UE #0) that indicates the PUSCH only transmission, the base station insert a signaling indicating that the other user equipments may perform the transmission of the triggered SRS or periodic SRS (hereinafter referred to as "SRS signaling") in the UL grant. Alternatively, a method of signaling that there is transmission of the triggered SRS or the periodic SRS on the corresponding subframe by using the UL common control signal may be considered. In this case, the user equipment that is scheduled to transmit only the PUSCH (e.g., UE #0) transmits the reservation signal at the symbol position for the SRS depending on the transmission of the SRS by the other user equipment(s) indicated by the SRS signaling. Thus, it is possible to avoid interference in the SRS transmission between different user equipments. In addition, UE #0 performs rate-matching with respect to the PUSCH as much as length of the SRS symbol, and does not map the PUSCH resource at the SRS symbol position.

As another embodiment, a method for determining whether to transmit an reservation signal for the PUSCH only transmission in Cases 1) and 2) will be described below.

Case 1) When configuring a cell-specific SRS subframe used in legacy LTE, a user equipment-specific trigger type-0 SRS (periodic SRS) subframe or a user equipment-specific trigger type-1 SRS (non-periodic SRS) subframe, Tables 12 to 13 show cell-specific SRS subframe configurations in FDD and TDD, respectively.

TABLE 12

| srs-SubframeConfig | Binary | Configuration Period $T_{SFC}$ (Subframes) | Transmission offset $\Delta_{SFC}$ (Subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | reserved | reserved |

TABLE 13

| srs-SubframeConfig | Binary | Configuration Period $T_{SFC}$ (Subframes) | Transmission offset $\Delta_{SFC}$ (Subframes) |
|---|---|---|---|
| 0 | 0000 | 5 | {1} |
| 1 | 0001 | 5 | {1, 2} |
| 2 | 0010 | 5 | {1, 3} |
| 3 | 0011 | 5 | {1, 4} |
| 4 | 0100 | 5 | {1, 2, 3} |
| 5 | 0101 | 5 | {1, 2, 4} |
| 6 | 0110 | 5 | {1, 3, 4} |
| 7 | 0111 | 5 | {1, 2, 3, 4} |
| 8 | 1000 | 10 | {1, 2, 6} |
| 9 | 1001 | 10 | {1, 3, 6} |
| 10 | 1010 | 10 | {1, 6, 7} |
| 11 | 1011 | 10 | {1, 2, 6, 8} |
| 12 | 1100 | 10 | {1, 3, 6, 9} |
| 13 | 1101 | 10 | {1, 4, 6, 7} |
| 14 | 1110 | reserved | reserved |
| 15 | 1111 | reserved | reserved |

Tables 14 to 15 show the user equipment-specific SRS period $T_{SRS}$ and subframe offset $T_{offset}$ for trigger type-0 in FDD and TDD, respectively.

TABLE 14

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |

TABLE 14-continued

| SRS Configuration Index $I_{SRS}$ | SRS Periodicity $T_{SRS}$ (ms) | SRS Subframe Offset $T_{offset}$ |
|---|---|---|
| 157-316 | 160 | $I_{SRS}$-157 |
| 317-636 | 320 | $I_{SRS}$-317 |
| 637-1023 | reserved | reserved |

TABLE 15

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

Tables 16 to 17 show the UE-specific SRS period $T_{SRS,1}$ and subframe offset $T_{offset,1}$ for trigger type-1 in FDD and TDD, respectively.

TABLE 16

| SRS Configuration Index $I_{SRS}$ | SRS Periodicity $T_{SRS,1}$ (ms) | SRS Subframe Offset $T_{offset,1}$ |
|---|---|---|
| 0-1 | 2 | $I_{SRS}$ |
| 2-6 | 5 | $I_{SRS}$-2 |
| 7-16 | 10 | $I_{SRS}$-7 |
| 17-31 | reserved | reserved |

TABLE 17

| SRS Configuration Index $I_{SRS}$ | SRS Periodicity $T_{SRS,1}$ (ms) | SRS Subframe Offset $T_{offset,1}$ |
|---|---|---|
| 0 | reserved | reserved |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |
| 15-24 | 10 | $I_{SRS}$-15 |
| 25-31 | reserved | reserved |

For example, the user equipment(s) scheduled for the PUSCH only transmission in a subframe for an aperiodic SRS (or Trigger Type-1 SRS), that is, the subframe configured according to the configuration information (I_SRS) of the user equipment-specific trigger type-1 SRS subframe, may transmit the reservation signal at a symbol position for the SRS, considering the possibility of SRS transmission by the other user equipment(s) without receiving additional signaling, to avoid the possibility of generating an interference in the SRS transmission between different user equipments. In this case, rate-matching is performed as much as the length of the SRS symbol for the PUSCH only transmission and the PUSCH resource at the symbol position for the SRS may not be mapped. This is because the user equipments belonging to a serving cell know that there is a possibility of transmission of the aperiodic SRS by the other user equipment(s) in the user equipment-specific trigger type-1 SRS subframe configured for itself, since the case of the user equipment-specific trigger type-1 SRS subframe may be serving cell-specified.

As another example, the user equipment(s) scheduled for the PUSCH only transmission in the subframe for a periodic SRS (or Trigger Type-0 SRS), that is, the user equipment-specific trigger type-0 (periodic) subframe configured according to the configuration information of the SRS subframe, may transmit the reservation signal at the symbol position for the SRS, considering the possibility of SRS transmission by the other user equipment(s) without receiving additional signaling, to avoid the possibility of generating an interference in the SRS transmission between different user equipments. In this case, rate-matching is performed as much as the length of the SRS symbol for the PUSCH only transmission and the PUSCH resource at the SRS symbol position may not be mapped. This is because the user equipments belonging to a serving cell know that there is a possibility of transmission of the aperiodic SRS by the other user equipment(s) in the user equipment-specific trigger type-0 SRS subframe configured for itself, since the case of the user equipment-specific trigger type-0 SRS subframe may be serving cell-specified.

As another example, a combination of the above-described methods may be determined depending on whether the type of SRS is configured on the LAA SCell. As an example, when both Type-0 and Type-1 are configured as types of SRS configured on the LAA SCell, the user equipment scheduled for the PUSCH only transmission in the corresponding SRS subframe according to configuration information of the UE-specific type-1 SRS subframe and the UE-specific type-0 SRS subframe may transmit the reservation signal at a symbol position for the SRS considering the possibility of SRS transmission by the other user equipment(s) without receiving additional signaling, to avoid the possibility of generating an interference in the SRS transmission between different user equipments. In this case, rate-matching is performed as much as the length of the SRS symbol for the PUSCH only transmission and the PUSCH resource at the SRS symbol position may not be mapped.

Case 2) a case where without configuring a cell-specific SRS subframe used in legacy LTE, a UE-specific trigger type-0 SRS subframe or a UE-specific trigger type-1 SRS subframe, an SRS is transmitted at a given time instance after receiving an SRS trigger through a DL grant or UL grant, for example, when SRS triggering is received in the n-th subframe, the SRS is transmitted in the (n+k)-th subframe (k may be 4, or may be a natural number greater than 0). Alternatively, the base station may inform the user equipment of the k value when transmitting the SRS trigger.

When the SRS transmission is performed by the other user equipments having a schedule on the same subframe, the base station may inform the user equipment which is scheduled to perform PUSCH only transmission an SRS is transmitted by the other user equipments through signaling. If the unlicensed carrier does not have a cell-specific SRS subframe or a UE-specific SRS subframe, there is no way of knowing that SRS transmission is possible in other UE(s) other than the UE(s) receiving SRS scheduling. Therefore, since the user equipment that is scheduled to transmit only the PUSCH in a specific subframe may not know whether the other user equipments perform SRS transmission on the specific subframe, it is possible to perform the PUSCH resource mapping without considering the location where the SRS may be transmitted within the specific subframe without rate matching or puncturing of the PUSCH. In this case, the SRS channel measurement accuracy is lowered due to SRS and PUSCH transmitted from different user equipments on the same subframe, and the possibility of retransmission may increase due to the failure of the PUSCH decoding at the base station. But, since it is determined by the base station scheduling that when and to whom the base station performs the SRS triggering, if the configuration information for a subframe in which transmission of the SRS is possible is not configured on the LAA SCell (e.g., a cell-specific SRS subframe, a user equipment-specific trigger type-0 SRS subframe or a user equipment-specific trigger type-1 SRS subframe), the user equipment scheduled to transmit only the PUSCH may always transmit the reservation signal at the symbol position for the SRS to prevent interference between the different user equipments with the SRS transmission. In this case, rate-matching is performed as much as the length of the SRS symbol for the PUSCH only transmission and the PUSCH resource at the SRS symbol position may not be mapped.

As another example, since it is determined by the base station scheduling that whether the base station performs the SRS triggering for the other user equipment at the time of trigging the SRS or granting the UL grant for the PUSCH, when the base station grant the UL grant to a user equipment performing the PUSCH only transmission, a method of granting the UL grant including signaling indicating that the other user equipments may perform the transmission of the triggered SRS or the periodic SRS may be used. Alternatively, a method for signaling that there is transmission of the triggered SRS or the periodic SRS on the subframe to the UL common control signal may be considered. In this case, the user equipment scheduled to transmit only the PUSCH transmits an reservation signal at the symbol position for the SRS according to the transmission of the SRS of the other UE(s) indicated by the signaling, so that interference does not occur in SRS transmission between different user equipments, and performs rate matching as much as the length of the SRS symbol for the corresponding PUSCH and the PUSCH resource is not mapped at the SRS symbol position.

Unlike Case1) and Case2), as a method for reducing problems and related signaling that may occur due to unknown SRS transmission at user equipments different from each other, a group triggering mechanism may be used to trigger the SRS transmission to the user equipment group. Through the common control signal for UL (UL common control signal), configuring the user equipment belonging to a cell to transmit simultaneously SRS, and to perform PUSCH+SRS simultaneous transmission or SRS only transmission according to PUSCH scheduling. As a signaling method, a method of transmitting through a DL common control signal that may be transmitted from a base station may be possible. However, in the case of the DL common control signal, since when the DL subframe is a full subframe, common controlling may not exist. In that case, the SRS for the group of user equipment(s) may be triggered according to the signaling indicated through the UL common control signal.

Next, a transmission method of SRS using UL SC-FDMA symbols after UL LBT will be described. The UL LBT may perform a UL transmission through a single interval LBT (e.g., 16 us, 25 us, 34 us, 43 us or 16+9*N, where N may be a natural number greater than 1) according to a specific condition (e.g., a UL condition exists within the Maximum Channel Occupancy Time (MCOT) after DL transmission), or when performing a cat-4 UL LBT, the time to end an LBT may be a unit smaller than a symbol unit or a half symbol unit. Especially, as an example of a single-interval LBT of 25 us that may be set according to the specific condition, as shown in FIG. 27, since the length of one SC-FDMA symbol in one UL subframe constituting 14 SC-FDMA symbols is about 70 us on the basis of 1 ms, in the case of considering only the transmission by the SC-FDMA symbol unit without considering the partial symbol transmission after the success of the LBT of 25 us, the user equipment(s) may have a blanking time interval at least about 45 us. In this case, a user equipment to be transmitted from the LAA SCell may fail to occupy the medium despite the success of the LBT, due to a channel access by another node or another user equipment. Therefore, as a method for preventing this, a method of performing transmission of the SRS symbol as a half symbol occupied or a configured for the SRS transmission may be considered. In particular, since the legacy SRS transmission is transmitted with two subcarriers spacing (i.e., comb-2) in the frequency domain, by using a structure that is repeated twice in the time domain, the symbol transmission of the SRS may be performed as a half symbol occupied or configured for the SRS transmission. This may be applicable to both cases where the duration of the LBT starts from the starting point of the UL subframe as shown in FIG. 27, or where the duration of the LBT starts before the starting point of the UL subframe as shown in FIG. 28. Although not shown in FIGS. 27 and 28, the method may be applicable to even a case where the symbol position for the SRS is in the end symbol of the UL subframe as in FIG. 23/24. However, as shown in FIG. 27(*a*)/28 (*a*), the present method may be applied to an UL transmission and an LBT for a case where the UL is allocated to the same user equipment or user equipments different from each other subsequently and UL is transmitted after DL, and as shown in FIGS. 27(*b*) and 28(*b*), if a DL subframe is transmitted after UL, it may depend on an LBT method for DL.

Next, a method for transmitting an SRS triggering only grant through an UL grant or a DL grant will be described. According to an aperiodic SRS transmission method of legacy LTE system, in case of the aperiodic SRS transmission, SRS trigger may be included in the UL grant or the DL grant. In this case, scheduling for UL PUSCH is simultaneously performed in the UL grant, and scheduling for the DL PDSCH is simultaneously performed in the DL grant. That is, the SRS triggering included in the UL grant and the DL grant may not be performed independently without data scheduling of UL and DL. However, when an SRS only transmission through the UL performed in the LAA SCell is possible, DL scheduling is performed in the n-th subframe by the DL grant and the (n+4)-th UL subframe is a UE-specific type-1 SRS subframe, the SRS only transmission is possible in the (n+4)-th UL subframe. That is, when scheduling of the DL subframe is impossible in the n-th subframe or when the (n+4)-th UL subframe is not scheduled to be an UL grant from the n-th subframe, SRS transmission may not be performed. Therefore, a method may be considered, in which the base station transmits the UL grant or the DL grant including only SRS trigger, or a grant for triggering only the SRS including the resource allocation information associated to the SRS trigger in addition to the SRS trigger to the user equipment. In other words, the grant or a DCI including the trigger information of the corresponding SRS may be transferred to the user equipment as the user equipment-specific information through a user equipment-specific search space, and as a method of notifying the user equipment group of the SRS triggering information, information for configuring plurality of user equipments to perform group triggering may be transmitted in the grant or the DCI.

By transmitting the SRS trigger information to the user equipment through the common search space, the user equipment may perform the SRS transmission in the user equipment group based on the decoded DCI information through the common search space. Also, by transmitting the SRS trigger information to the user equipment through the user equipment-specific search space, the user equipment may perform the SRS transmission in the user equipment group that has completed decoding based on the decoded DCI information.

Figure 29:
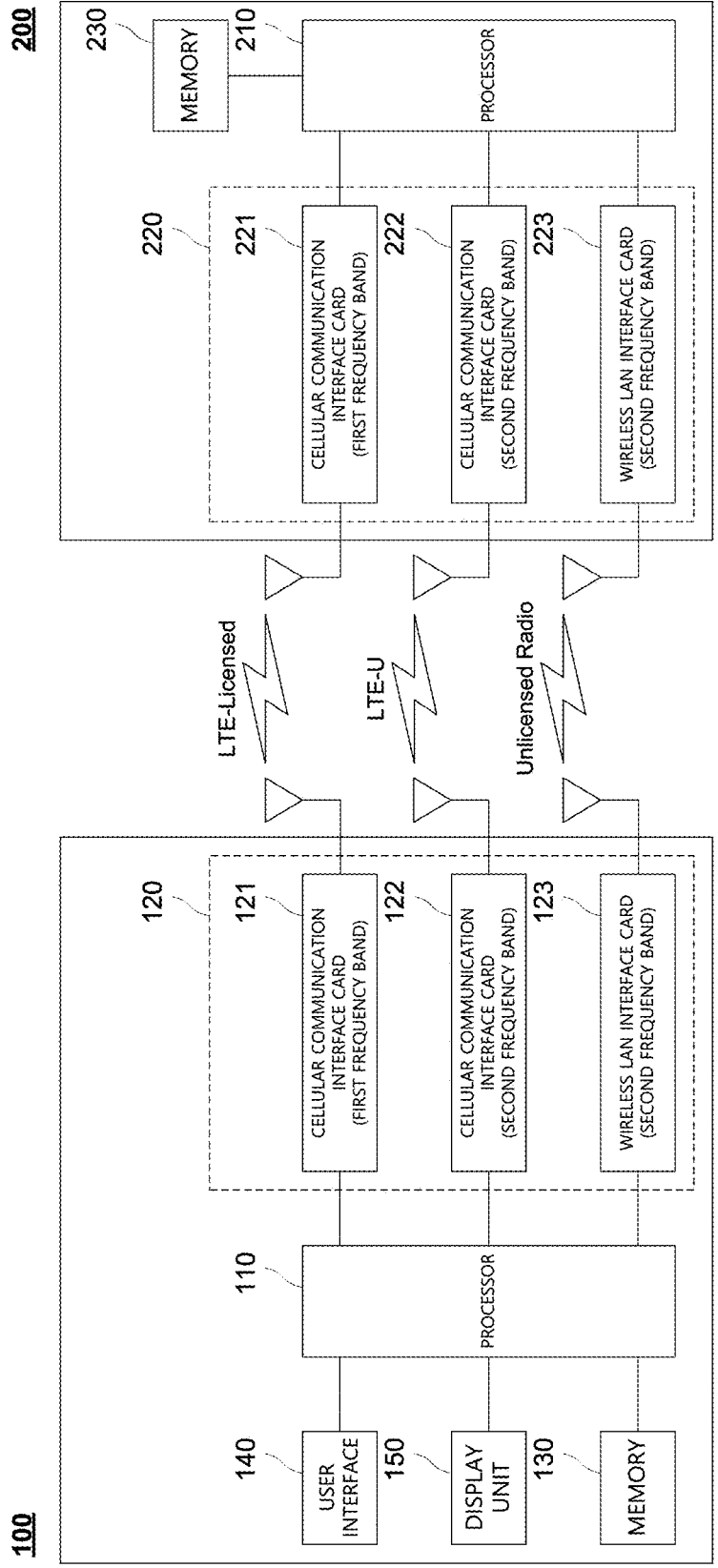
FIG. 29 illustrates a configuration of a user equipment and a base station according to an embodiment of the present invention.

FIG. 29 illustrates a configuration of a user equipment and a base station according to an embodiment of the present invention. The embodiment of the present invention, the user equipment may be implemented by various types of wireless communication devices or computing devices that are guaranteed to be portable and mobility. The user equipment may be referred to as a station (STA), an Mobile Subscriber (MS), or the like. In the embodiment of present invention, the base station may control and manage a cell (e.g., macrocell, femtocell, picosell, etc.) corresponding to a service area and perform function such as transmitting signal, designating channel, monitoring channel, self-diagnosis, relay. The base station may be referred to as an evolved NodeB (eNB), an access point (AP), or the like.

Referring to FIG. 29, the user equipment 100 may include a processor 110, a communication module 120, a memory 130, a user interface unit 140, and a display unit 150.

The processor 110 may execute various commands or programs according to the present invention and process data in the user equipment 100. Further, the processor 100 may control all operations of the respective units of the user equipment 100 and control data transmission/reception among the units. For example, the processor 110 may perform DL/UL transmission/reception in an LTE-U cell in the LAA environment. Specifically, the processor 110 may perform various operations as described above, such as DL/UL transmission/reception, HARQ-ACK feedback set confirmation, CWS adjustment, SRS transmission, and the like.

The communication module 120 may be an integrated module that performs mobile communication using a mobile communication network and wireless LAN access using a wireless LAN. To this end, the communication module 120 may include a plurality of network interface cards such as cellular communication interface cards 121 and 122 and a wireless LAN interface card 123 in an internal or external type. In FIG. 29, the communication module 120 is illustrated as the integrated module, but the respective network interface cards may be independently disposed according to a circuit configuration or a purpose unlike FIG. 29.

The cellular communication interface card 121 transmits/receives a radio signal to/from at least one of a base station 200, an external device, and a server by using the mobile communication network and provides a cellular communication service at a first frequency band based on a command of the processor 110. The cellular communication interface card 121 may include at least one NIC module using an LTE-licensed frequency band. The cellular communication interface card 122 transmits/receives the radio signal to/from at least one of the base station 200, the external device, and the server by using the mobile communication network and provides the cellular communication service at a second frequency band based on the command of the processor 110. The cellular communication interface card 122 may include at least one NIC module using an LTE-unlicensed frequency band. For example, the LTE-unlicensed frequency band may be a band of 2.4 GHz or 5 GHz.

The wireless LAN interface card 123 transmits/receives the radio signal to/from at least one of the base station 200, the external device, and the server through wireless LAN access and provides a wireless LAN service at the second frequency band based on the command of the processor 110. The wireless LAN interface card 123 may include at least one NIC module using a wireless LAN frequency band. For example, the wireless LAN frequency band may be an unlicensed radio band such as the band of 2.4 GHz or 5 GHz.

The memory 130 stores a control program used in the user equipment 100 and various resulting data. The control program may include a program required for the user equipment 100 to perform wireless communication with at least one of the base station 200, the external device, and the server. The user interface 140 includes various types of input/output means provided in the user equipment 100. The display unit 150 outputs various images on a display screen.

Further, the base station 200 according to the exemplary embodiment of the present invention may include a processor 210, a communication module 220, and a memory 230.

The processor 210 may execute various commands or programs according to the present invention and process data in the base station 200. Further, the processor 210 may control all operations of the respective units of the base station 200 and control data transmission/reception among the units. For example, the processor 210 may perform DL/UL transmission/reception based on the LBT in LAA environment. Specifically, the processor 210 may perform various operations as described above, such as DL/UL transmission/reception, HARQ-ACK feedback set confirmation, CWS adjustment, SRS reception, and the like.

The communication module 220 may be an integrated module that performs the mobile communication using the mobile communication network and the wireless LAN access using the wireless LAN like the communication module 120 of the user equipment 100. To this end, the communication module 120 may include a plurality of network interface cards such as cellular communication interface cards 221 and 222 and a wireless LAN interface card 223 in the internal or external type. In FIG. 29, the communication module 220 is illustrated as the integrated module, but the respective network interface cards may be independently disposed according to the circuit configuration or the purpose unlike FIG. 29.

The cellular communication interface card 221 transmits/receives the radio signal to/from at least one of the user equipment 100, the external device, and the server by using the mobile communication network and provides the cellular communication service at the first frequency band based on a command of the processor 210. The cellular communication interface card 221 may include at least one NIC module using the LTE-licensed frequency band. The cellular communication interface card 222 transmits/receives the radio signal to/from at least one of the user equipment 100, the external device, and the server by using the mobile communication network and provides the cellular communication service at the second frequency band based on the command of the processor 210. The cellular communication interface card 222 may include at least one NIC module using the LTE-unlicensed frequency band. The LTE-unlicensed frequency band may be the band of 2.4 GHz or 5 GHz.

The wireless LAN interface card 223 transmits/receives the radio signal to/from at least one of the user equipment 100, the external device, and the server through the wireless LAN access and provides the wireless LAN service at the second frequency band based on the command of the processor 210. The wireless LAN interface card 223 may include at least one NIC module using the wireless LAN frequency band. For example, the wireless LAN frequency band may be the unlicensed radio band such as the band of 2.4 GHz or 5 GHz.

In FIG. 29, blocks of the user equipment and the base station logically divide and illustrate elements of the device. The elements of the device may be mounted as one chip or a plurality of chips according to design of the device. Further, some components of the user equipment 100, that is to say, the user interface 140 and the display unit 150 may be selectively provided in the user equipment 100. Further, some components of the base station 200, that is to say, the wireless LAN interface 223, and the like may be selectively provided in the base station 200. The user interface 140 and the display unit 150 may be additionally provided in the base station 200 as necessary.

The method and the system of the present invention are described in association with the specific embodiments, but some or all of the components and operations of the present invention may be implemented by using a computer system having a universal hardware architecture.

The description of the present invention is used for illustration and those skilled in the art will understand that the present invention can be easily modified to other detailed forms without changing the technical spirit or an essential feature thereof. Therefore, the aforementioned exemplary embodiments are all illustrative in all aspects and are not limited. For example, each component described as a single type may be implemented to be distributed and similarly, components described to be distributed may also be implemented in a combined form.

The scope of the present invention is represented by the claims to be described below rather than the detailed description, and it is to be interpreted that the meaning and scope of the claims and all the changes or modified forms derived from the equivalents thereof come within the scope of the present invention.

INDUSTRIAL APPLICABILITY

The present invention is applicable to various communication devices used in a wireless communication system (e.g., a station using an unlicensed band communication, an access point, or a station using a cellular communication, a base station, etc.).

What is claimed is:

1. A wireless communication terminal, the terminal comprising:
a processor; and
a communication unit,
wherein the processor is configured to:
receive UL(uplink) grant for uplink transmission,
wherein the UL grant includes NDI(New Data Indicator) indicating a new data transmission or a data retransmission according to whether the NDI is toggled, and
wherein the NDI is related to a specific subframe in a first uplink transmission burst, and
perform the uplink transmission on a specific cell after sensing a channel on the specific cell at least for N slots while the channel on the specific cell is idle,
wherein the N(N≥0) is a random number within a contention window size determined based on the NDI,
wherein each of the contention window size for every channel access priority class is increased to a next higher allowed value for each of the every channel access priority class or is reset to a minimum value for each of the every channel access priority class according to whether the NDI is toggled, and
when the NDI is toggled,
the NDI indicates the new data transmission, and
each of the contention window size for the every channel access priority class is reset to the minimum value for each of the every channel access priority class.

2. The user equipment of claim 1,
when the NDI is not toggled,
the NDI indicates the data retransmission, and
each of the contention window size for the every channel access priority class is increased to a next higher allowed value for each of the every channel access priority class.

3. The user equipment of claim 1,
when a hybrid automatic repeat request (HARQ)-process Identity (ID) corresponding to the specific subframe and a HARQ-process ID included in the UL grant are not same, each of the contention window size for the every channel access priority class is increased to a next higher allowed value for each of the every channel access priority class.

4. The method of claim 1,
wherein the first uplink transmission burst comprises one or more subframes, and the specific subframe is a starting subframe in the first uplink transmission burst.

5. The method of claim 1,
wherein the first uplink transmission burst is an uplink transmission burst that is the most recently transmitted after performing a channel access using a contention window size and before receiving the UL grant.

6. The method of claim 1,
wherein the specific subframe corresponds to a subframe transmitted before at least three subframes than a subframe in which the UL grant is received.

7. A method for a user equipment to perform uplink transmission on a specific cell in a cellular wireless communication system, the method comprising:
receiving UL(uplink) grant for uplink transmission,
wherein the UL grant includes NDI(New Data Indicator) indicating a new data transmission or a data retransmission according to whether the NDI is toggled, and
wherein the NDI is related to a specific subframe in a first uplink transmission burst; and
performing the uplink transmission on the specific cell after sensing a channel on the specific cell at least for N slots while the channel on the specific cell is idle,
wherein the N(N≥0) is a random number within a contention window size determined based on the NDI,
wherein each of the contention window size for every channel access priority class is increased to a next higher allowed value for each of the every channel access priority class or is reset to a minimum value for each of the every channel access priority class according to whether the NDI is toggled, and
when the NDI is toggled,
the NDI indicates the new data transmission, and
each of the contention window size for the every channel access priority class is reset to the minimum value for each of the every channel access priority class.

8. The user equipment of claim 7,
when the NDI is not toggled,
the NDI indicates the data retransmission, and
each of the contention window size for the every channel access priority class is increased to a next higher allowed value for each of the every channel access priority class.

9. The user equipment of claim 7,
when a hybrid automatic repeat request (HARQ)-process Identity (ID) corresponding to the specific subframe and a HARQ-process ID included in the UL grant are not same, each of the contention window size for the every channel access priority class is increased to a next higher allowed value for each of the every channel access priority class.

10. The method of claim 7,
wherein the first uplink transmission burst comprises one or more subframes, and the specific subframe is a starting subframe in the first uplink transmission burst.

11. The method of claim 7,
wherein the first uplink transmission burst is an uplink transmission burst that is the most recently transmitted after performing a channel access using a contention window size and before receiving the UL grant.

12. The method of claim 7,
wherein the specific subframe corresponds to a subframe transmitted before at least three subframes than a subframe in which the UL grant is received.

* * * * *